(12) United States Patent
Laksono

(10) Patent No.: US 9,420,341 B2
(45) Date of Patent: Aug. 16, 2016

(54) METHOD AND STREAMING VIDEO SERVER FOR USE IN A MULTIMEDIA SYSTEM

(71) Applicant: ViXS Systems, Inc., Toronto (CA)

(72) Inventor: Indra Laksono, Richmond Hill (CA)

(73) Assignee: ViXS Systems, Inc., Toronto (CA)

( * ) Notice: Subject to any disclaimer, the term of this patent is extended or adjusted under 35 U.S.C. 154(b) by 0 days.

(21) Appl. No.: 14/514,688

(22) Filed: Oct. 15, 2014

(65) Prior Publication Data
US 2015/0089537 A1     Mar. 26, 2015

Related U.S. Application Data

(63) Continuation of application No. 12/246,375, filed on Oct. 6, 2008, which is a continuation of application No. 09/865,136, filed on May 24, 2001, now abandoned.

(51) Int. Cl.
*H04N 21/472*     (2011.01)
*H04N 21/21*      (2011.01)
(Continued)

(52) U.S. Cl.
CPC ......... *H04N 21/47202* (2013.01); *H04N 7/163* (2013.01); *H04N 21/21* (2013.01); *H04N 21/2143* (2013.01); *H04N 21/23* (2013.01); *H04N 21/2393* (2013.01); *H04N 21/234309* (2013.01); *H04N 21/234363* (2013.01); *H04N 21/25816* (2013.01); *H04N 21/25875* (2013.01); *H04N 21/4126* (2013.01); *H04N 21/41407* (2013.01); *H04N 21/4363* (2013.01); *H04N 21/43615* (2013.01); *H04N 21/43637* (2013.01); *H04N 21/440263* (2013.01);
(Continued)

(58) Field of Classification Search
None
See application file for complete search history.

(56) References Cited

U.S. PATENT DOCUMENTS 4,598,288 A   7/1986   Yarbrough et al.
4,890,322 A   12/1989  Russell, Jr.
(Continued)

FOREIGN PATENT DOCUMENTS

CA   2215075 A1   3/1999
EP   0806852 A2   11/1997
(Continued)

OTHER PUBLICATIONS

VTST-Series NTSC/PAL Electronic Television Tuners; Product Information; Sharp Microelectronics of the Americas; 1997.
(Continued)

*Primary Examiner* — Omar S Parra
(74) *Attorney, Agent, or Firm* — Garlick & Markison; Bruce E. Stuckman

(57) ABSTRACT

A multimedia server receives a plurality of programs of a multimedia source. The multimedia server includes a tuning module to receive the plurality of programs and to select a set of programs from the plurality of programs based on a set of program select commands that is derived from select requests. A program mixer mixes the set of programs into a stream of program data. One or more transceiving modules transmit the stream of program data on to corresponding communication paths and receive the select requests. A client module produces the select requests for one or more clients. The client module includes a selection module to produce at least one of the select requests. A network interface controller transmits at least one of select requests to the multimedia server and receives the stream of program data via the communication path or paths in response.

15 Claims, 51 Drawing Sheets

(51) Int. Cl.

| | | |
|---|---|---|
| *H04N 21/23* | (2011.01) | |
| *H04N 7/18* | (2006.01) | |
| *H04N 7/16* | (2011.01) | |
| *H04N 21/436* | (2011.01) | |
| *H04N 21/4363* | (2011.01) | |
| *H04N 21/258* | (2011.01) | |
| *H04N 21/61* | (2011.01) | |
| *H04N 21/643* | (2011.01) | |
| *H04N 21/6587* | (2011.01) | |
| *H04N 21/454* | (2011.01) | |
| *H04N 21/2343* | (2011.01) | |
| *H04N 21/239* | (2011.01) | |
| *H04N 21/414* | (2011.01) | |
| *H04N 21/4402* | (2011.01) | |
| *H04N 21/41* | (2011.01) | |
| *H04N 21/482* | (2011.01) | |
| *H04N 21/214* | (2011.01) | |

(52) U.S. Cl.
CPC ...... *H04N 21/4542* (2013.01); *H04N 21/4826* (2013.01); *H04N 21/6168* (2013.01); *H04N 21/6175* (2013.01); *H04N 21/6181* (2013.01); *H04N 21/64322* (2013.01); *H04N 21/6587* (2013.01)

(56) References Cited

U.S. PATENT DOCUMENTS

| | | |
|---|---|---|
| 4,947,244 A | 8/1990 | Fenwick et al. |
| 5,132,988 A | 7/1992 | Fisher et al. |
| 5,132,992 A | 7/1992 | Yurt et al. |
| 5,134,486 A | 7/1992 | Suzuki et al. |
| 5,148,765 A | 9/1992 | Hung et al. |
| 5,220,570 A | 6/1993 | Lou et al. |
| 5,285,474 A | 2/1994 | Chow et al. |
| RE34,611 E | 5/1994 | Fenwick et al. |
| 5,311,423 A | 5/1994 | Clark |
| 5,317,596 A | 5/1994 | Ho et al. |
| 5,319,707 A | 6/1994 | Wasilewski et al. |
| 5,321,846 A | 6/1994 | Yokota et al. |
| 5,400,322 A | 3/1995 | Hunt et al. |
| 5,400,401 A | 3/1995 | Wasilewski et al. |
| 5,430,661 A | 7/1995 | Fisher et al. |
| 5,432,789 A | 7/1995 | Armstrong et al. |
| 5,479,447 A | 12/1995 | Chow et al. |
| 5,481,542 A | 1/1996 | Logston et al. |
| 5,512,935 A | 4/1996 | Majeti et al. |
| 5,519,731 A | 5/1996 | Cioffi |
| 5,539,880 A | 7/1996 | Lakhani |
| 5,557,612 A | 9/1996 | Bingham |
| 5,561,456 A | 10/1996 | Yu |
| 5,574,964 A | 11/1996 | Hamlin |
| 5,596,604 A | 1/1997 | Cioffi et al. |
| 5,623,513 A | 4/1997 | Chow et al. |
| 5,625,651 A | 4/1997 | Cioffi |
| 5,627,863 A | 5/1997 | Aslanis et al. |
| 5,644,573 A | 7/1997 | Bingham et al. |
| 5,654,774 A | 8/1997 | Pugel et al. |
| 5,673,290 A | 9/1997 | Cioffi |
| 5,680,394 A | 10/1997 | Bingham et al. |
| 5,694,349 A | 12/1997 | Pal |
| 5,708,961 A | 1/1998 | Hylton et al. |
| 5,745,846 A | 4/1998 | Myer et al. |
| 5,751,282 A | 5/1998 | Girard et al. |
| 5,754,592 A | 5/1998 | Flowers et al. |
| 5,757,416 A | 5/1998 | Birch et al. |
| 5,764,649 A | 6/1998 | Tong |
| 5,768,681 A | 6/1998 | Dan et al. |
| 5,774,500 A | 6/1998 | Zogakis et al. |
| 5,787,113 A | 7/1998 | Chow et al. |
| 5,801,776 A | 9/1998 | Tamura et al. |
| 5,805,591 A | 9/1998 | Naboulsi et al. |
| 5,812,786 A | 9/1998 | Seazholtz et al. |
| 5,818,511 A | 10/1998 | Farry et al. |
| 5,838,383 A | 11/1998 | Chimoto et al. |
| 5,838,667 A | 11/1998 | Bingham et al. |
| 5,838,799 A | 11/1998 | Cioffi et al. |
| 5,870,513 A | 2/1999 | Williams |
| 5,883,661 A | 3/1999 | Hoarty |
| 5,883,677 A | 3/1999 | Hofmann |
| 5,886,995 A | 3/1999 | Arsenault et al. |
| 5,887,032 A | 3/1999 | Cioffi |
| 5,889,765 A | 3/1999 | Gibbs |
| 5,901,180 A | 5/1999 | Aslanis et al. |
| 5,905,942 A | 5/1999 | Stoel et al. |
| 5,917,781 A | 6/1999 | Kim |
| 5,928,331 A | 7/1999 | Bushmitch |
| 5,933,454 A | 8/1999 | Cioffi |
| 5,935,206 A | 8/1999 | Dixon et al. |
| 5,936,660 A | 8/1999 | Gurantz |
| 5,940,387 A | 8/1999 | Humpleman |
| 5,951,664 A | 9/1999 | Lambrecht et al. |
| 5,970,386 A | 10/1999 | Williams |
| 5,977,960 A | 11/1999 | Nally et al. |
| 5,995,567 A | 11/1999 | Cioffi et al. |
| 5,995,709 A | 11/1999 | Tsuge |
| 6,005,861 A | 12/1999 | Humpleman |
| 6,008,368 A | 12/1999 | Bovy et al. |
| 6,014,412 A | 1/2000 | Wiese et al. |
| 6,023,731 A | 2/2000 | Chawla |
| 6,035,000 A | 3/2000 | Bingham |
| 6,064,692 A | 5/2000 | Chow |
| 6,067,440 A | 5/2000 | Diefes |
| 6,069,621 A | 5/2000 | Schupak |
| 6,091,932 A | 7/2000 | Langlais |
| 6,104,908 A | 8/2000 | Schaffner et al. |
| 6,122,703 A | 9/2000 | Nasserbakht |
| 6,124,878 A | 9/2000 | Adams et al. |
| 6,125,150 A | 9/2000 | Wesel et al. |
| 6,133,910 A | 10/2000 | Stinebruner |
| 6,134,283 A | 10/2000 | Sands et al. |
| 6,137,793 A | 10/2000 | Gorman et al. |
| 6,148,006 A | 11/2000 | Dyke et al. |
| 6,157,673 A | 12/2000 | Cuccia |
| 6,163,272 A | 12/2000 | Goode et al. |
| 6,178,446 B1 | 1/2001 | Gerszberg et al. |
| 6,182,094 B1 | 1/2001 | Humpleman et al. |
| 6,202,210 B1 | 3/2001 | Ludtke |
| 6,249,543 B1 | 6/2001 | Chow |
| 6,295,319 B1 | 9/2001 | Sueyoshi et al. |
| 6,304,576 B1 | 10/2001 | Corley et al. |
| 6,311,204 B1 | 10/2001 | Mills |
| 6,314,146 B1 | 11/2001 | Tellado et al. |
| 6,317,884 B1 | 11/2001 | Eames et al. |
| 6,343,315 B1 | 1/2002 | Stoel et al. |
| 6,366,566 B1 | 4/2002 | Scott |
| 6,370,191 B1 | 4/2002 | Mahant-Shetti et al. |
| 6,381,745 B1 | 4/2002 | Paul |
| 6,389,062 B1 | 5/2002 | Wu |
| 6,397,368 B1 | 5/2002 | Yonge, III et al. |
| 6,401,162 B1 | 6/2002 | Nasserbakht |
| 6,414,952 B2 | 7/2002 | Foley |
| 6,424,681 B1 | 7/2002 | Tellado et al. |
| 6,434,593 B1 | 8/2002 | Mikata et al. |
| 6,442,129 B1 | 8/2002 | Yonge, III et al. |
| 6,456,673 B1 | 9/2002 | Wiese et al. |
| 6,473,414 B1 | 10/2002 | Hartley et al. |
| 6,473,438 B1 | 10/2002 | Cioffi et al. |
| 6,473,467 B1 | 10/2002 | Wallace et al. |
| 6,480,551 B1 | 11/2002 | Ohishi et al. |
| 6,481,013 B1 | 11/2002 | Dinwiddie et al. |
| 6,493,873 B1 | 12/2002 | Williams |
| 6,493,874 B2 | 12/2002 | Humpleman |
| 6,505,348 B1 * | 1/2003 | Knowles ............ H04N 5/44543 348/E5.103 |
| 6,507,585 B1 | 1/2003 | Dobson |
| 6,510,152 B1 * | 1/2003 | Gerszberg ............ H04M 1/2478 348/E7.078 |
| 6,510,553 B1 | 1/2003 | Hazra |
| 6,512,797 B1 | 1/2003 | Tellado et al. |
| 6,522,342 B1 | 2/2003 | Gagnon et al. |
| 6,532,593 B1 | 3/2003 | Moroney |

(56) References Cited

U.S. PATENT DOCUMENTS

| | | | |
|---|---|---|---|
| 6,534,996 B1 | 3/2003 | Amrany et al. |
| 6,542,739 B1 | 4/2003 | Garner |
| 6,553,534 B2 | 4/2003 | Yonge, III et al. |
| 6,560,234 B1 | 5/2003 | Ben-Michael et al. |
| 6,567,981 B1 | 5/2003 | Jeffrey |
| 6,587,480 B1 | 7/2003 | Higgins et al. |
| 6,594,826 B1 | 7/2003 | Rao et al. |
| 6,598,231 B1 | 7/2003 | Basawapatna et al. |
| 6,607,136 B1 | 8/2003 | Atsmon et al. |
| 6,611,537 B1 | 8/2003 | Edens et al. |
| 6,622,304 B1 | 9/2003 | Carhart |
| 6,637,030 B1 | 10/2003 | Klein |
| 6,668,328 B1 | 12/2003 | Bell |
| 6,683,858 B1 | 1/2004 | Chu et al. |
| 6,704,024 B2 | 3/2004 | Robotham et al. |
| 6,710,815 B1 | 3/2004 | Billmaier et al. |
| 6,718,552 B1 | 4/2004 | Goode |
| 6,732,281 B1 | 5/2004 | Mantri et al. |
| 6,732,323 B1 | 5/2004 | Mitlin et al. |
| 6,741,551 B1 | 5/2004 | Cherubini |
| 6,747,998 B1 | 6/2004 | Enari |
| 6,760,342 B1 | 7/2004 | Skones et al. |
| 6,762,690 B1 | 7/2004 | Diehl et al. |
| 6,769,127 B1 | 7/2004 | Bonomi et al. |
| 6,791,993 B2 | 9/2004 | Foley |
| 6,804,226 B1 | 10/2004 | Durant et al. |
| 6,829,307 B1 | 12/2004 | Hoo et al. |
| 6,832,224 B2 | 12/2004 | Gilmour |
| 6,865,232 B1 | 3/2005 | Isaksson et al. |
| 6,879,579 B1 | 4/2005 | Myles et al. |
| 6,898,210 B1 | 5/2005 | Cheng et al. |
| 6,898,418 B2 | 5/2005 | Rauschmayer |
| 6,901,153 B1 | 5/2005 | Leone |
| 6,922,397 B1 | 7/2005 | Chen |
| 6,922,399 B1 | 7/2005 | Dirkmann et al. |
| 6,925,500 B1 | 8/2005 | Mizutani et al. |
| 6,937,623 B2 | 8/2005 | Cioffi et al. |
| 6,941,576 B2 | 9/2005 | Amit |
| 6,963,590 B1 | 11/2005 | Mann et al. |
| 6,966,034 B2 | 11/2005 | Narin |
| 6,970,879 B1 | 11/2005 | Gilmour |
| 6,978,474 B1 | 12/2005 | Sheppard et al. |
| 6,981,274 B2 | 12/2005 | Tripathy |
| 6,986,156 B1 | 1/2006 | Rodriguez et al. |
| 6,990,196 B2 | 1/2006 | Zeng et al. |
| 7,012,953 B2 | 3/2006 | Matthews |
| 7,027,537 B1 | 4/2006 | Cheong et al. |
| 7,028,329 B1 | 4/2006 | Mizutani |
| 7,046,649 B2 | 5/2006 | Awater et al. |
| 7,068,592 B1 | 6/2006 | Duvaut et al. |
| 7,068,677 B1 | 6/2006 | Arai et al. |
| 7,068,678 B2 | 6/2006 | Cioffi et al. |
| 7,079,549 B2 | 7/2006 | Cioffi et al. |
| 7,086,077 B2 | 8/2006 | Giammaressi |
| 7,099,316 B1 | 8/2006 | Tomich et al. |
| 7,099,398 B1 | 8/2006 | Girardeau et al. |
| 7,099,512 B2 | 8/2006 | Rovati et al. |
| 7,106,715 B1 | 9/2006 | Kelton et al. |
| 7,110,370 B2 | 9/2006 | Cioffi et al. |
| 7,110,467 B2 | 9/2006 | Mitlin et al. |
| 7,127,734 B1 | 10/2006 | Amit |
| 7,158,563 B2 | 1/2007 | Ginis et al. |
| 7,184,490 B1 | 2/2007 | Rybicki et al. |
| 7,187,696 B2 | 3/2007 | Chen |
| 7,257,106 B2 * | 8/2007 | Chen ................. H04L 12/2803 370/338 |
| 7,301,900 B1 | 11/2007 | Laksono |
| 7,366,195 B2 | 4/2008 | Hwang |
| 7,369,838 B1 | 5/2008 | Murray et al. |
| 7,388,925 B2 | 6/2008 | Peeters et al. |
| 7,397,859 B2 | 7/2008 | McFarland |
| 7,406,106 B2 | 7/2008 | Mallory |
| 7,421,046 B2 | 9/2008 | Wallace et al. |
| 7,460,514 B2 | 12/2008 | Ganz et al. |
| 7,489,621 B2 | 2/2009 | Maltsev et al. |
| 7,522,514 B2 | 4/2009 | Tzannes et al. |
| 7,529,309 B2 | 5/2009 | McFarland |
| 7,675,876 B2 | 3/2010 | Foster et al. |
| 7,684,568 B2 | 3/2010 | Yonge, III et al. |
| 7,698,723 B2 | 4/2010 | Hicks, III et al. |
| 7,827,581 B1 | 11/2010 | Eiger et al. |
| 7,984,473 B1 | 7/2011 | Casile et al. |
| 8,081,704 B2 | 12/2011 | Ginis et al. |
| 8,174,999 B2 | 5/2012 | Kliger et al. |
| 8,291,457 B2 | 10/2012 | Laksono |
| 8,601,519 B1 * | 12/2013 | Hicks, III ............... H04H 20/63 725/74 |
| 8,681,897 B2 | 3/2014 | Ginis et al. |
| 2001/0005908 A1 | 6/2001 | Hodge et al. |
| 2001/0013131 A1 | 8/2001 | Wang |
| 2001/0021884 A1 | 9/2001 | Shinyagaito |
| 2002/0007494 A1 | 1/2002 | Hodge |
| 2002/0009061 A1 | 1/2002 | Willenegger |
| 2002/0047899 A1 | 4/2002 | Son et al. |
| 2002/0054206 A1 | 5/2002 | Allen |
| 2002/0059626 A1 | 5/2002 | Lemmons |
| 2002/0104099 A1 | 8/2002 | Novak |
| 2002/0160737 A1 | 10/2002 | Crawford |
| 2002/0164968 A1 | 11/2002 | Crawford |
| 2002/0178271 A1 | 11/2002 | Graham et al. |
| 2003/0002518 A1 | 1/2003 | Shibutani |
| 2003/0156218 A1 | 8/2003 | Laksono |
| 2004/0172656 A1 | 9/2004 | Kim et al. |
| 2004/0172658 A1 * | 9/2004 | Rakib ............... G08B 13/19656 725/120 |
| 2004/0255326 A1 | 12/2004 | Hicks, III et al. |
| 2006/0253883 A1 | 11/2006 | Giammaressi |
| 2008/0005760 A1 | 1/2008 | Kay et al. |
| 2008/0271094 A1 | 10/2008 | Kliger et al. |
| 2009/0279498 A1 | 11/2009 | Li et al. |
| 2009/0323851 A1 | 12/2009 | Ling et al. |
| 2012/0063531 A1 | 3/2012 | Ginis et al. |

FOREIGN PATENT DOCUMENTS

| | | |
|---|---|---|
| EP | 0952734 A2 | 10/1999 |
| EP | 1087586 A2 | 3/2001 |
| WO | WO9510917 A1 | 4/1995 |
| WO | WO9732434 A1 | 9/1997 |
| WO | WO0045561 A2 | 8/2000 |
| WO | WO0059230 A1 | 10/2000 |
| WO | WO0105097 A1 | 1/2001 |
| WO | WO0117143 A1 | 3/2001 |
| WO | WO0130009 A2 | 4/2001 |

OTHER PUBLICATIONS

TDC Components for Modems & Digital—Set top boxes; http://www.tdc.co.uk/modmulti/settop/index.htm; retrieved from the internet Apr. 20, 2001.

Conexant—CX22702; 2001.

Conexant—CX24108; 2001.

Muriel, Chris; "What is Digital Satellite Television;" http://www.netcentral.co.uk/satcure/digifaq.htm; Apr. 21, 1999.

Definition of "mixer." http://www.inf.infn.it/computing/doc/aixcss/html/glossary/m.htm. IBM Corporation, 1998. p. 1-2.

Definition of "mixer" from 1985. The Authoritative Dictionary of IEEE Standards Terms, Seventh Edition. Standards Information network, IEEE Press. 2000. p. 1-2.

Newton's Telecom Dictionary, Harry Newton, 1999, p. 610.

Fred Halsail; Data Communications, Computer Networks and Open Systems; c. 1996; Addison-Wesley' 4th Edition; various pages.

Stephen A. Grzelak, Harrison Miles. Jr., Edward S. Szurkowski, William P. Weber, Jr; Residential data services via hybrid fiber-coax local access networks. Bell Labs Technical Journal. pp. 88-99. Summer 1996.

Kenneth J. Kerpez. Thomas E. Chapuran, Ronald C. Menendez, Stuart S. Wagner: Digital transmission over in-home coaxial wiring. IEEE Trans. Broadcasting, vol. 43, No. 2, pp. 136-144. Jun. 1997.

Paul F. Gagen, William E. Pugh: Hybrid fiber-max access networks. Bell Labs Technical Journal. pp. 28-35, Summer 1996.

(56) References Cited

OTHER PUBLICATIONS

Bharat T. Doshi, Subrahmanyam Dravida, Peter D. Magill, Curtis A. Shier. Jr., Kotikalapudi Sriram: A broadband multiple access protocol for STM, ATM, and variable length data services on hybrid fiber-coax networks. Bell Labs Technical Journal, pp. 36-65. Summer 1996.
Ying-Dar Lin, Chen-Yu Huang, Wei-Ming Yin: Allocation and scheduling algorithms for IEEE 802.14 and MCNS in hybrid fiber coaxial networks. IEEE Trans. Broadcasting, vol. 44, No. 4, pp. 427-435. Dec. 1998.
N. Golmie, F. Mouveaux, D. Su: A comparison of MAC protocols for hybrid fiber/coax networks: IEEE 802.14 vs. MCNS. ICC '99, Vancouver, Canada, pp. 266-271, Jun. 1999.
ITU-T Recommendation J.112 Annex B: Data-over-cable service interface specifications: Radio frequency interface specification, Mar. 2001.
ITU-T; Series G: Transmission Systems and Media, Digital Systems and Networks; Telecommunication Standardization Sector of ITU; 256 pages, Jun. 1999.
IEEE 802.11a standard; Nov. 1999.
Bararia et al, Evaluation of 802.11a for streaming data in ad-hoc networks; 2004.
Kerpez et al, Digital transmission over in-home coaxial wiring; Jun. 1997.
Lacage et al, IEEE 802.11 rate adaptation: a practical approach; Institut National de Recherche en Informatique et en Automatique; No. 5208; 28 pages; May 2004.
Tzannes et al, Extended Data Rate 802.11a; Mar. 2002.
Sari et al, Transmission Techniques for Digital Terrestrial TV Broadcasting; IEEE Communications Magazine; 10 pages; Feb. 1995.
Bingham, Multicarrier Modulation for Data Transmission: An Idea Whose Time has come; IEEE Communications Magazine; pp. 5-14; May 1990.
Biglieri et al, Coding and Modulation for a Horrible Channel; IEEE Communications Magazine, pp. 92-98; May 2003.
Hunziker, Multicarrier modulation techniques for bandwidth efficient fixed wireless access systems; Dissertation; Swiss Federal Institute of Technology, Zurich; 65 pages; 2002.
Hwang et al; An Adaptive modulation method for multicast communications of hierarchical data in wireless networks;—networking Lab., Samsung Advanced Institute of Technology; 5 pages; 2002.
Hoo et al.; FDMA-based Multiuser Transmit Optimization for Broadcast Channels; STAR Lab., Standford University, CA; 6 pages; 2000.
Grilo et al.; Link-adaptation and Transmit Power Control for Unicast and Multicast in IEEE 802.11a/h/e WLANs; Proceedings of the 28th Annual International Conference on Local Computer Networks (LCN'03)l 12 pages; 2003.
Donnelly et al.; A tutorial on the Digital Audio-Visual Council (DAVIC) standardisation activity; Electronics & Communication Engineering Journal; 11 pages; Feb. 1997.
Minn et al.; On Timing Offset Estimation for OFDM Systems; IEEE Communications Letters, vol. 4, No. 7; 13 pages; Jul. 2000.
Hoo et al.: Multiuser Transmit Optimization for Multicarrier Broadcast Channels: Asymptotic FDMA Capacity Region and algorithms; IEEE Transactions, vol. 52, No. 6; 9 pages; Jun. 2004.
Schmidl et al.; Robust Frequency and Timing Synchronization for OFDM; IEEE Transactions on Communications, vol. 45, No. 12; 9 pages; Dec. 1997.
Extended European Search Report; EP Application No. 15173483.7; Feb. 9, 2016; 10 pages.
European Patent Office; Extended European Search Report; EP Application No. 15173483.7; Feb. 9, 2016; 10 pgs.

* cited by examiner

FIG. 5    130

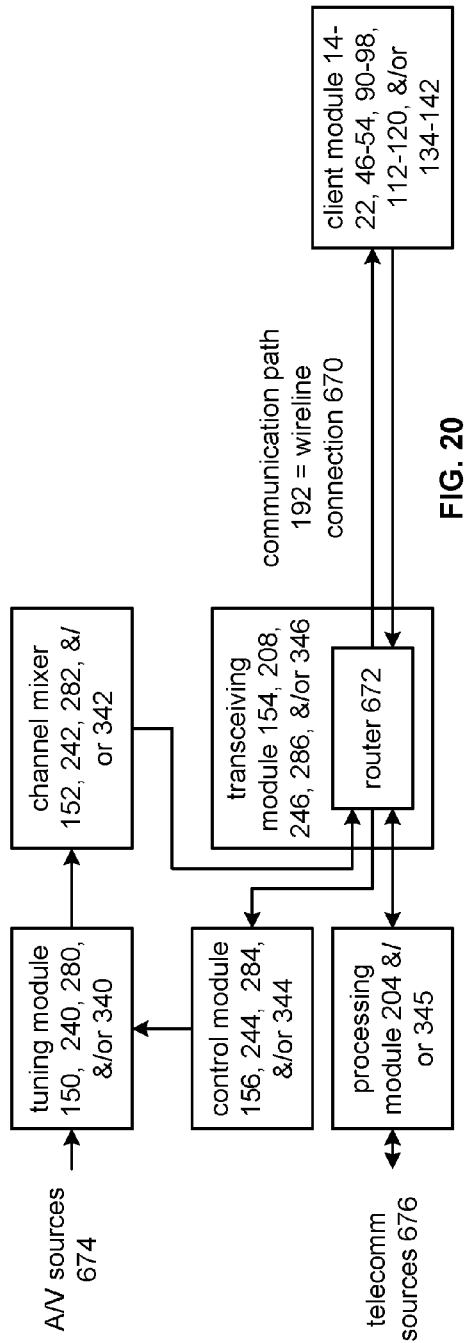
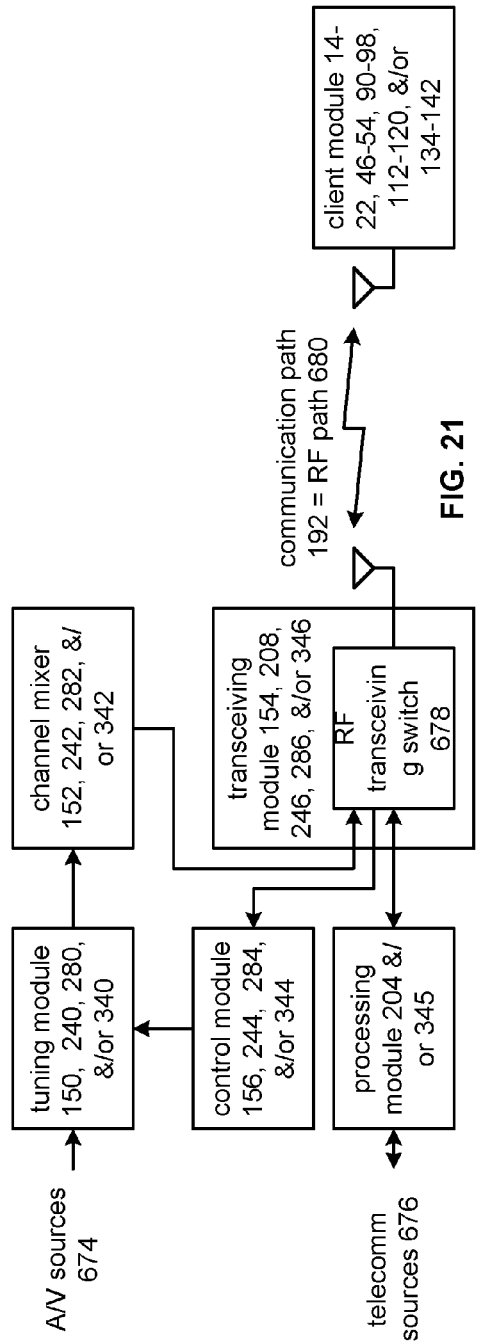

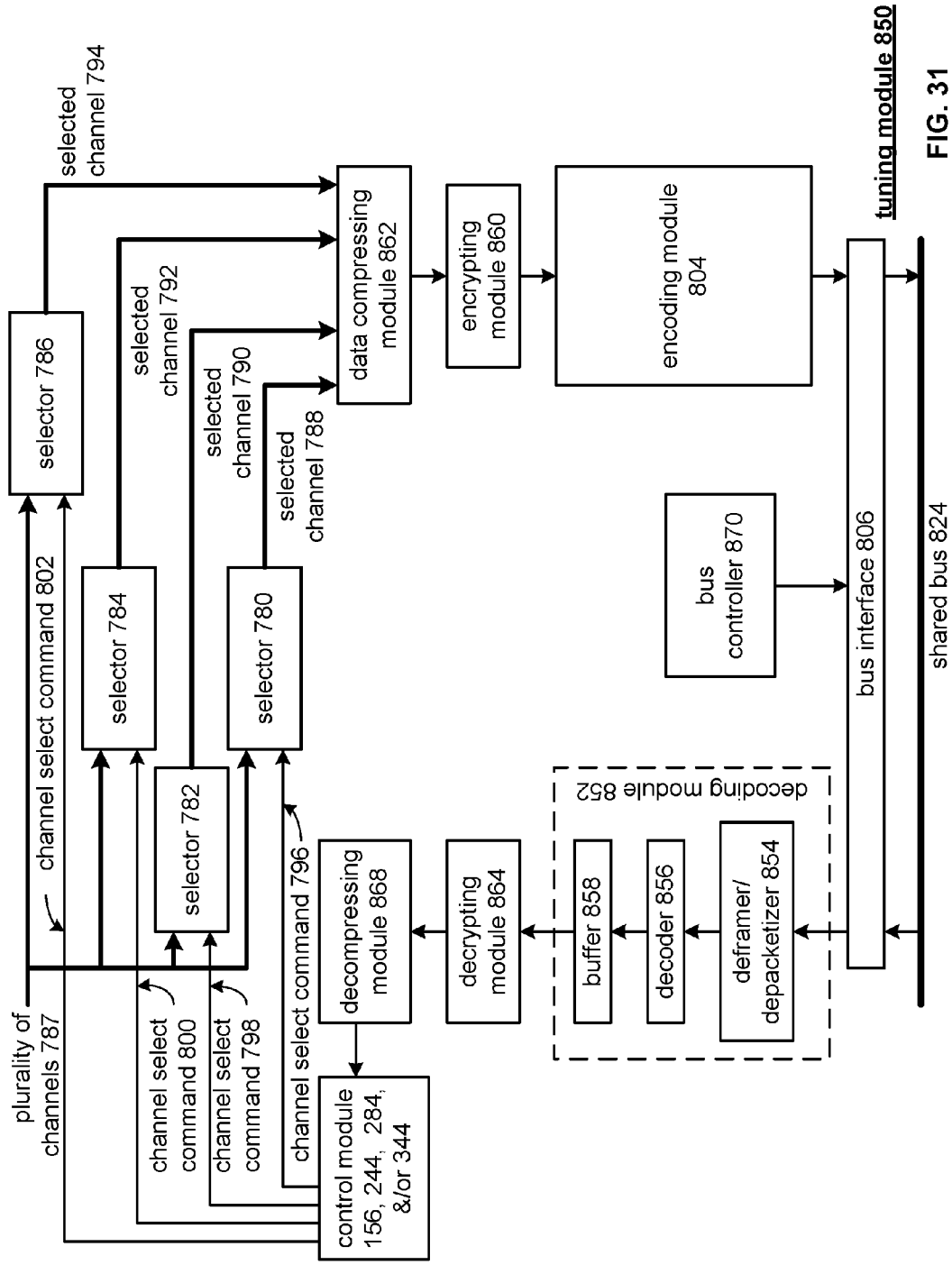

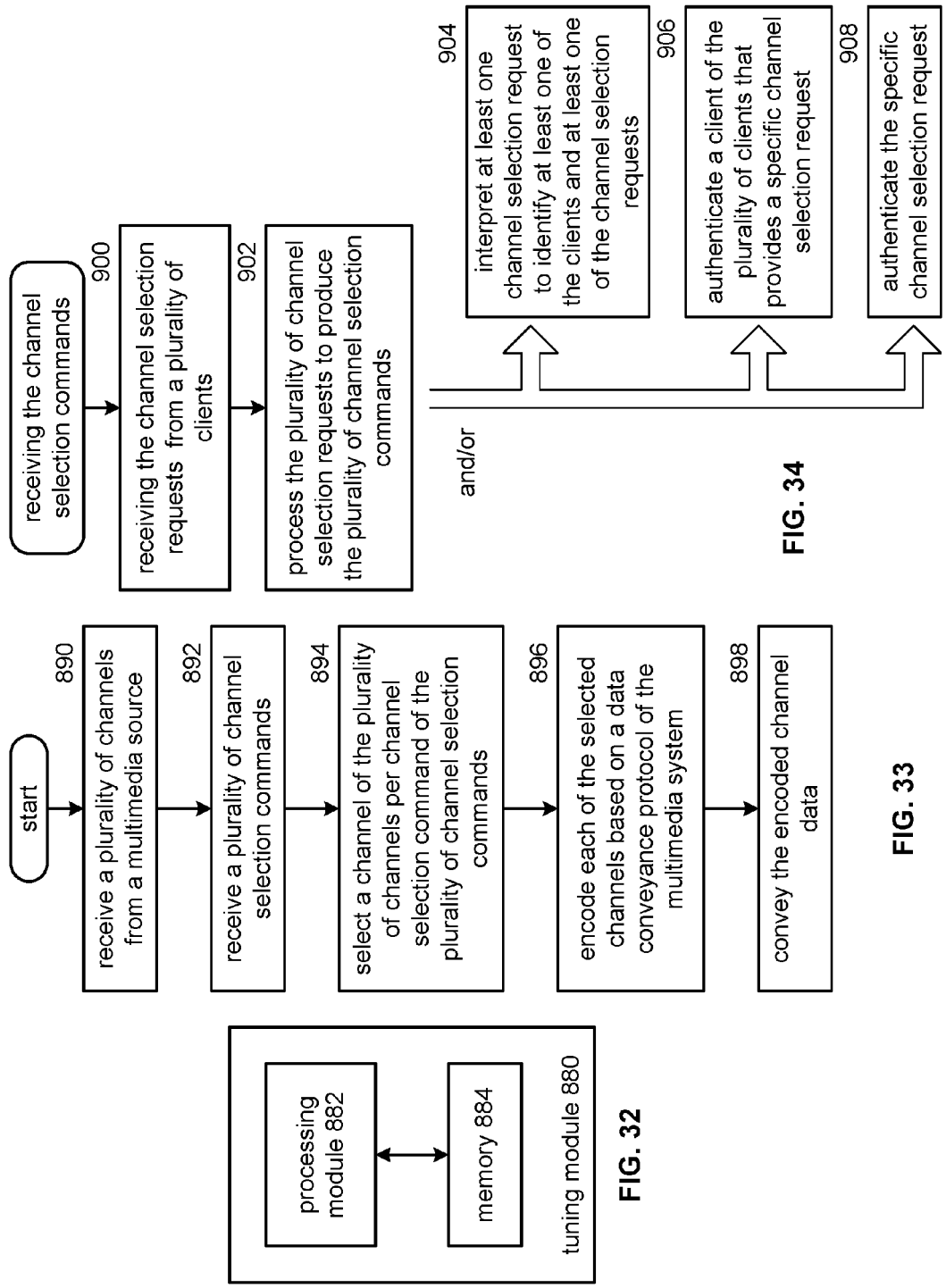

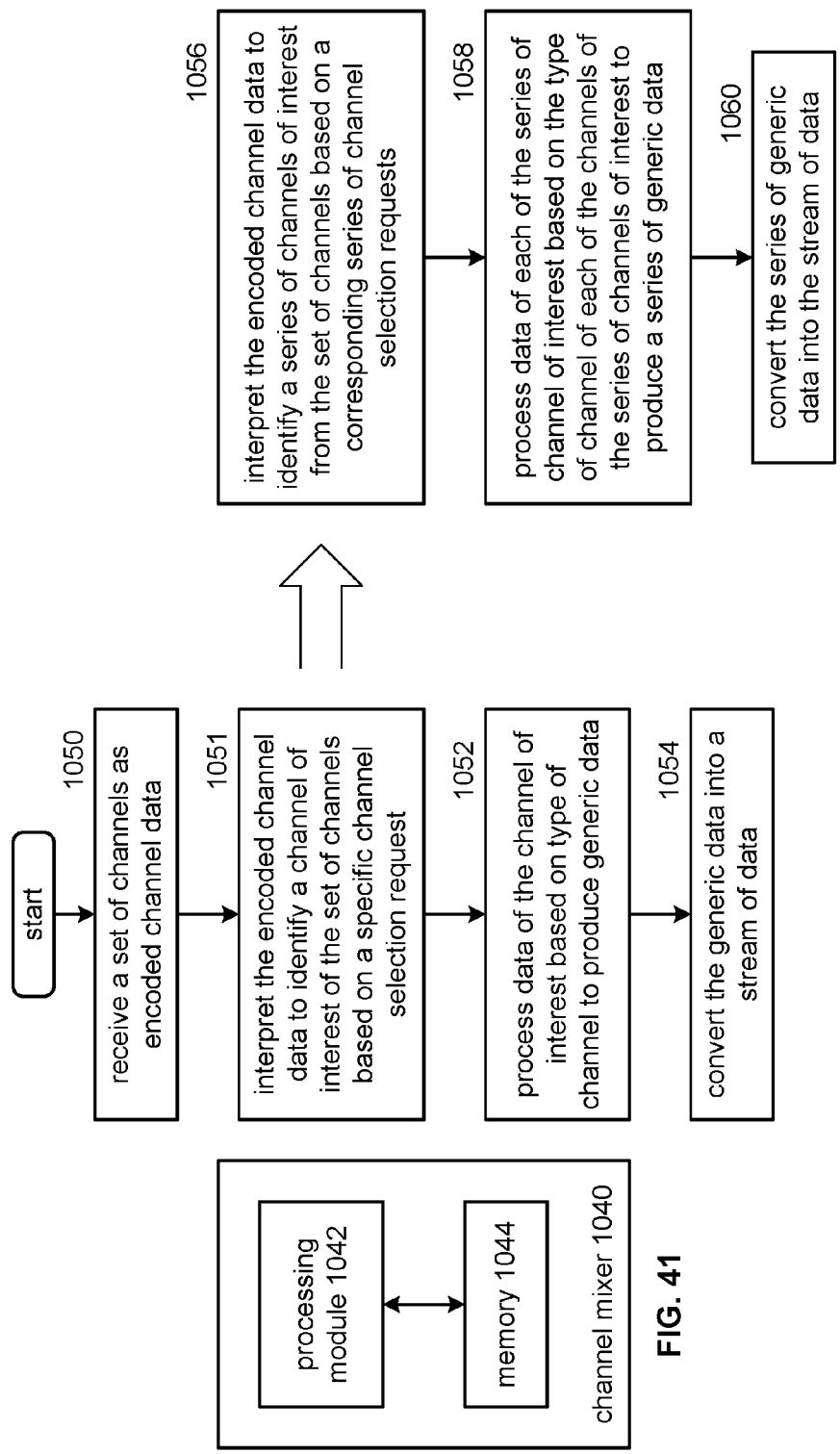

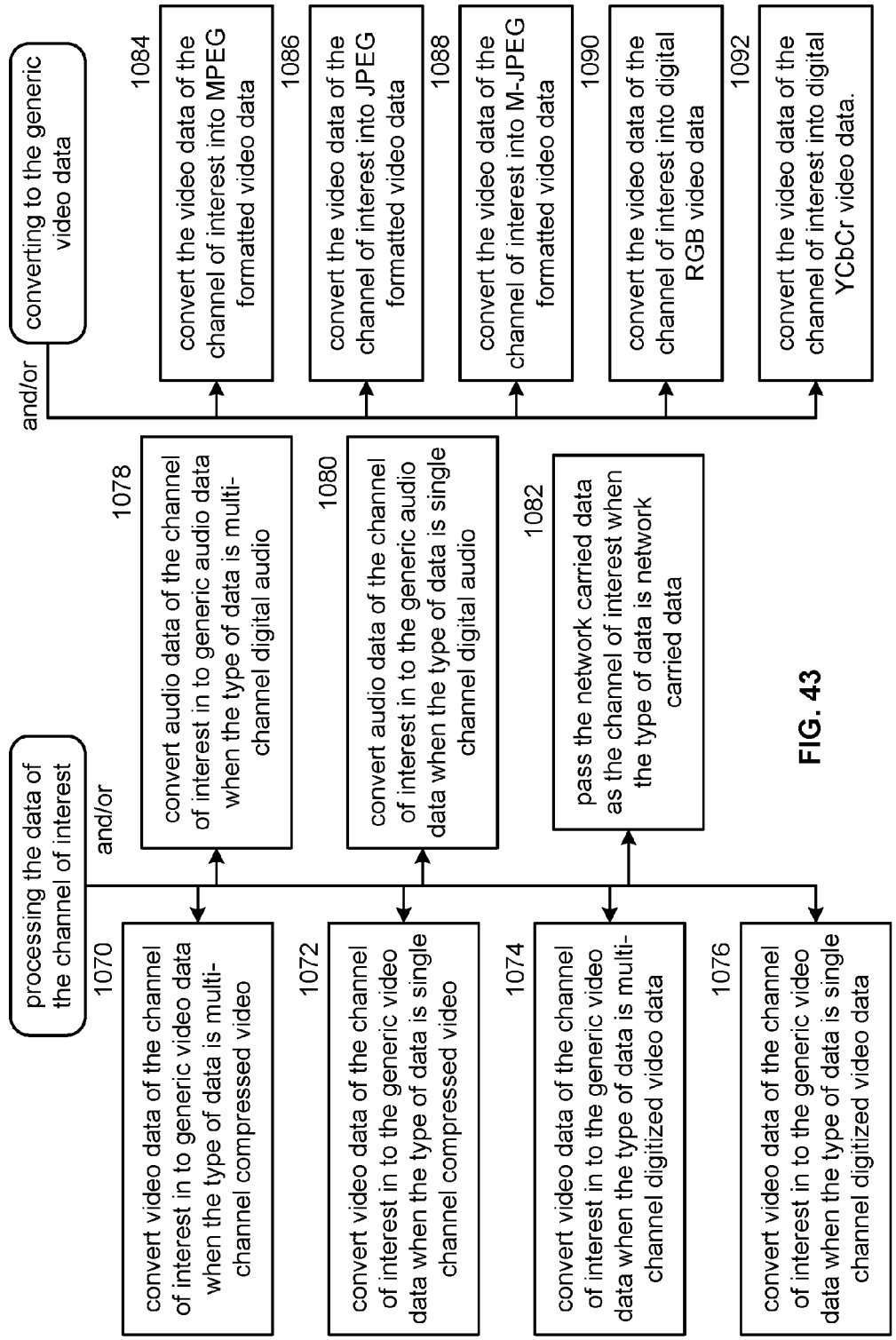

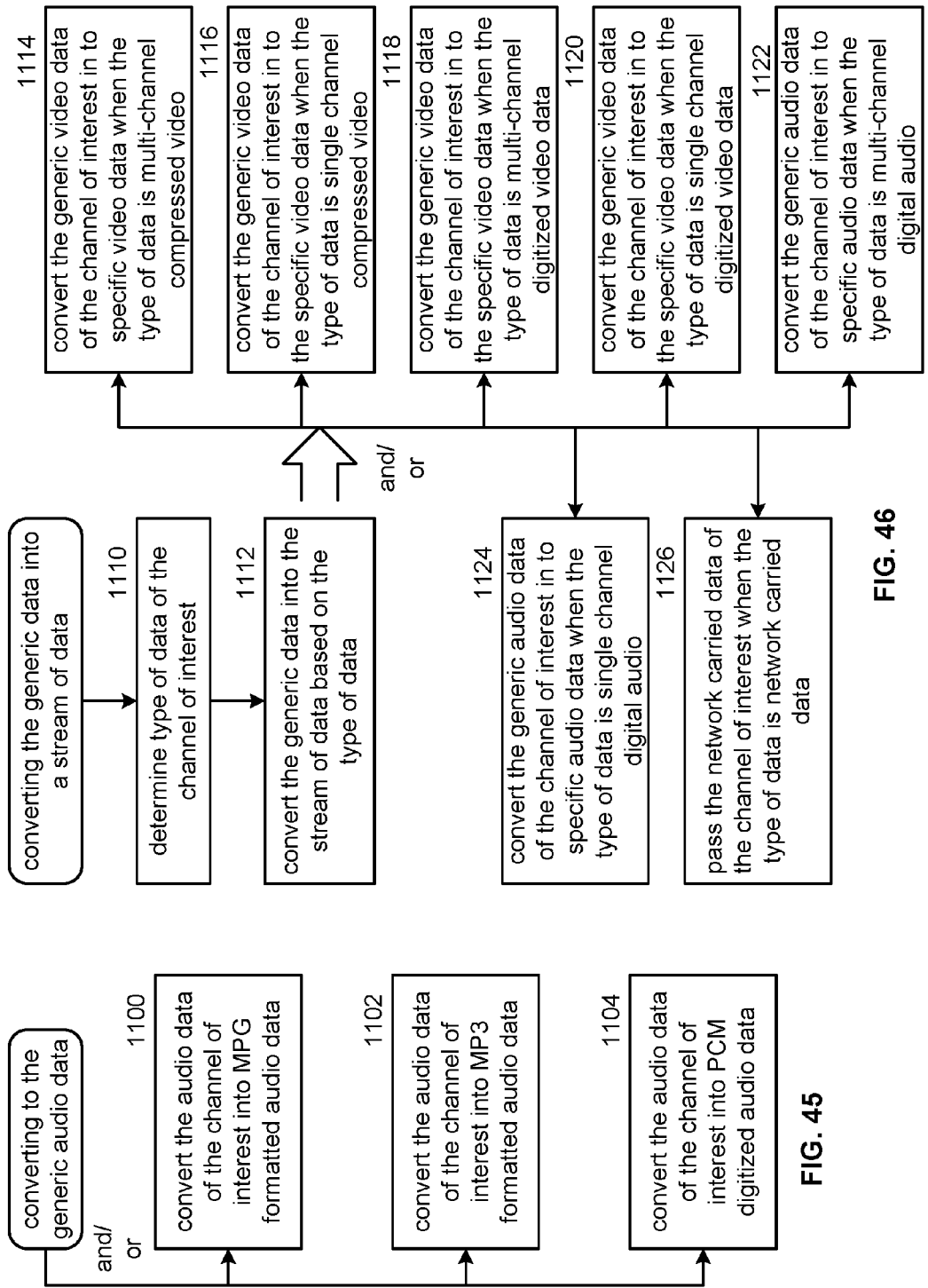

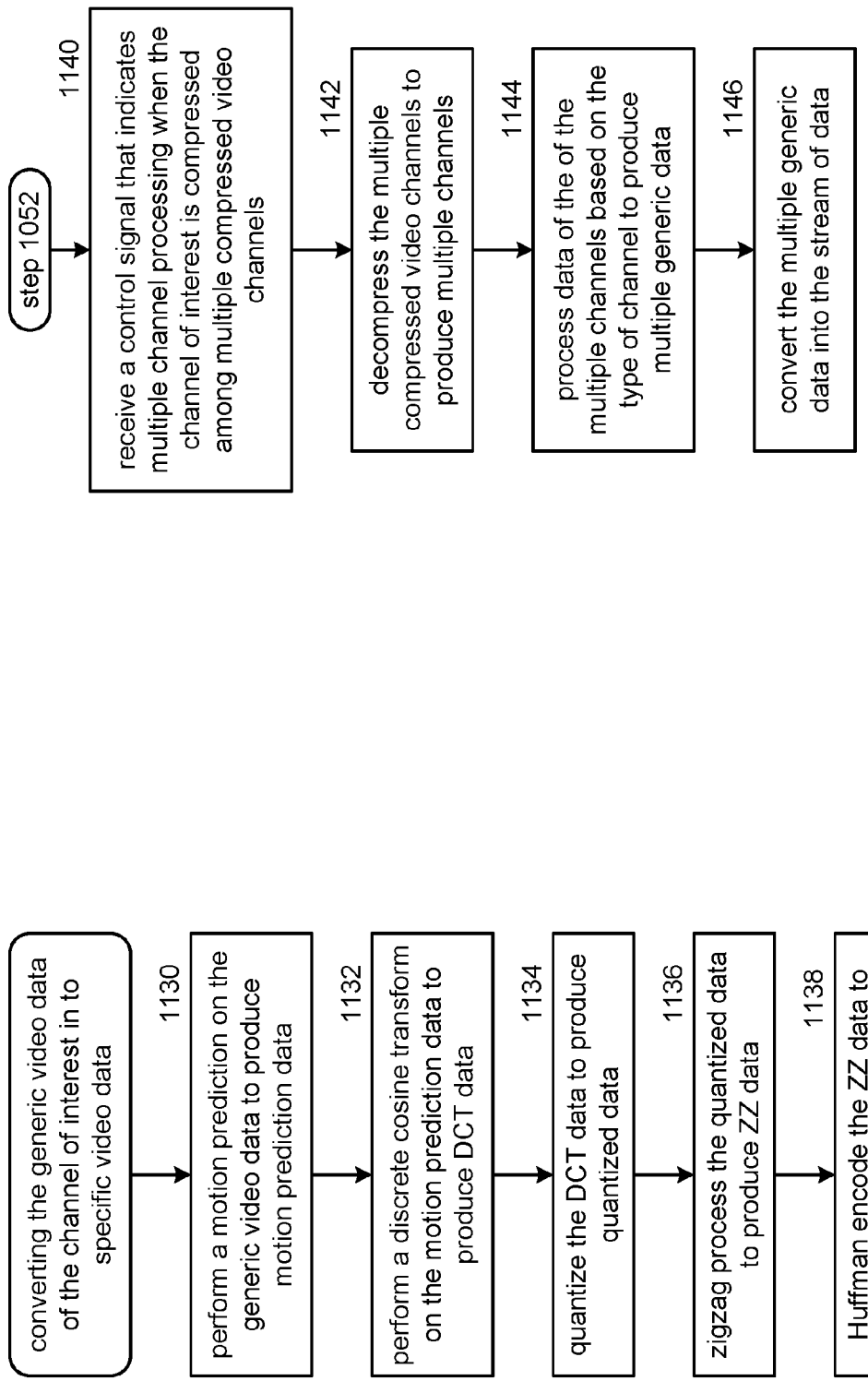

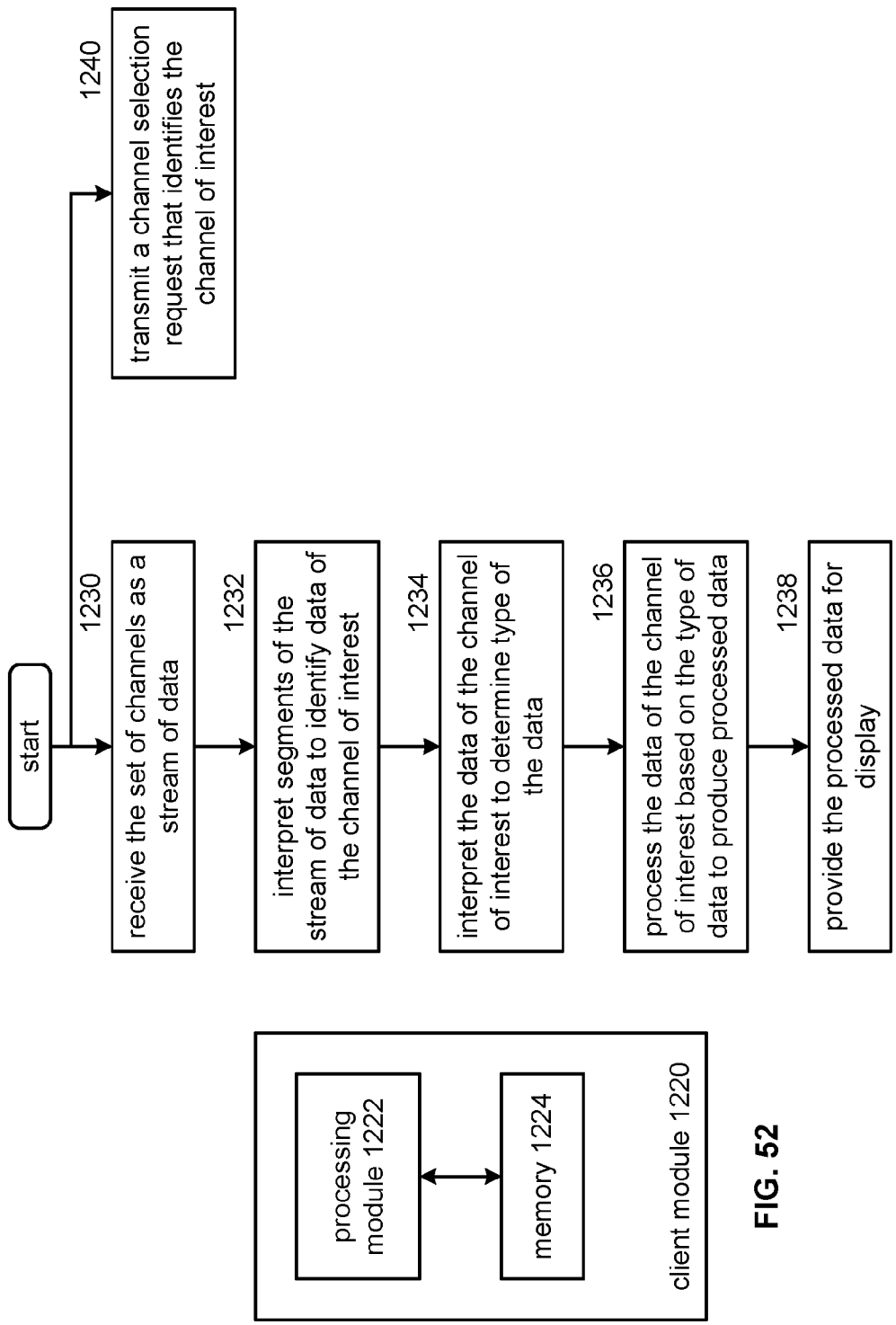

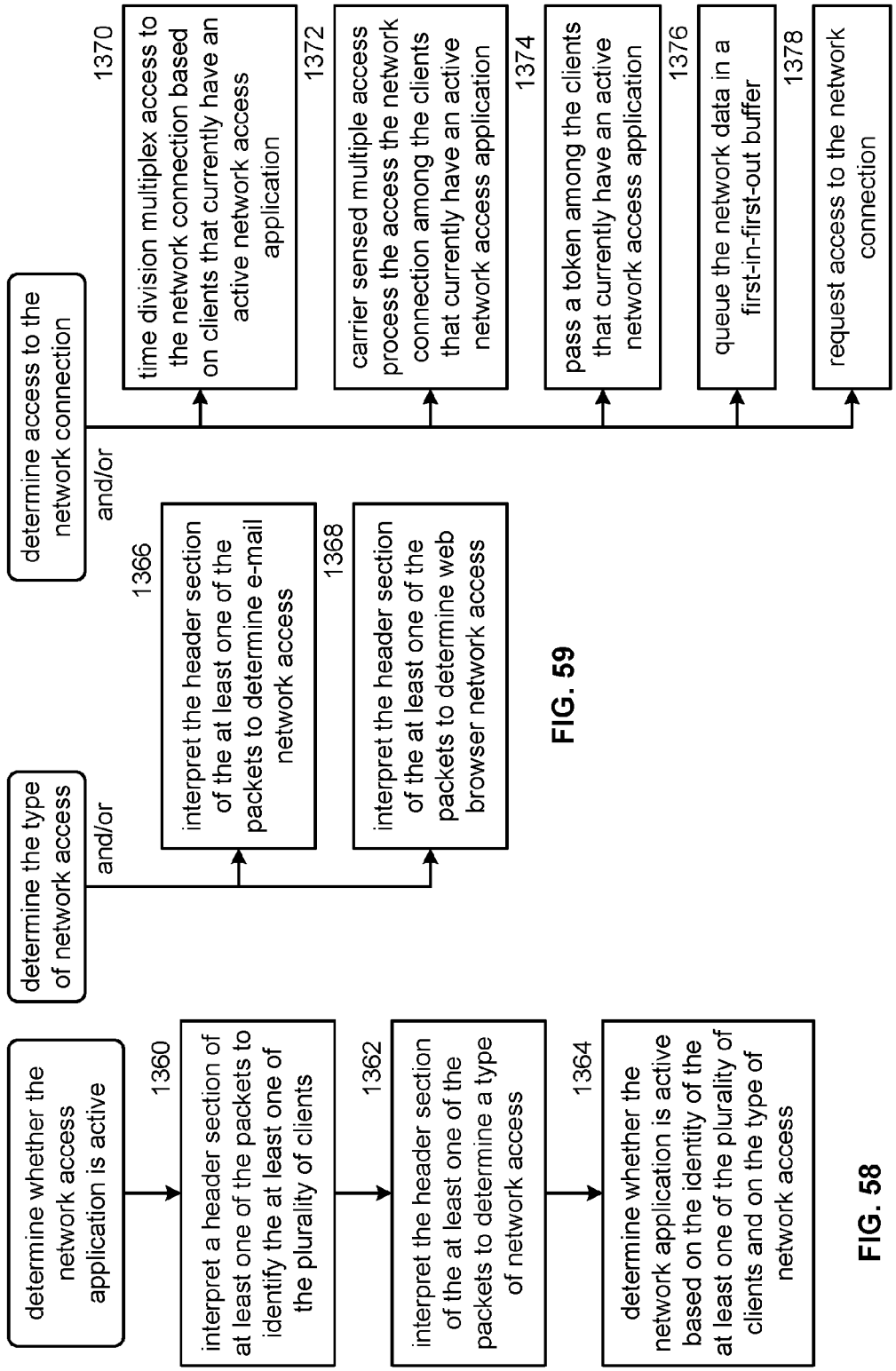

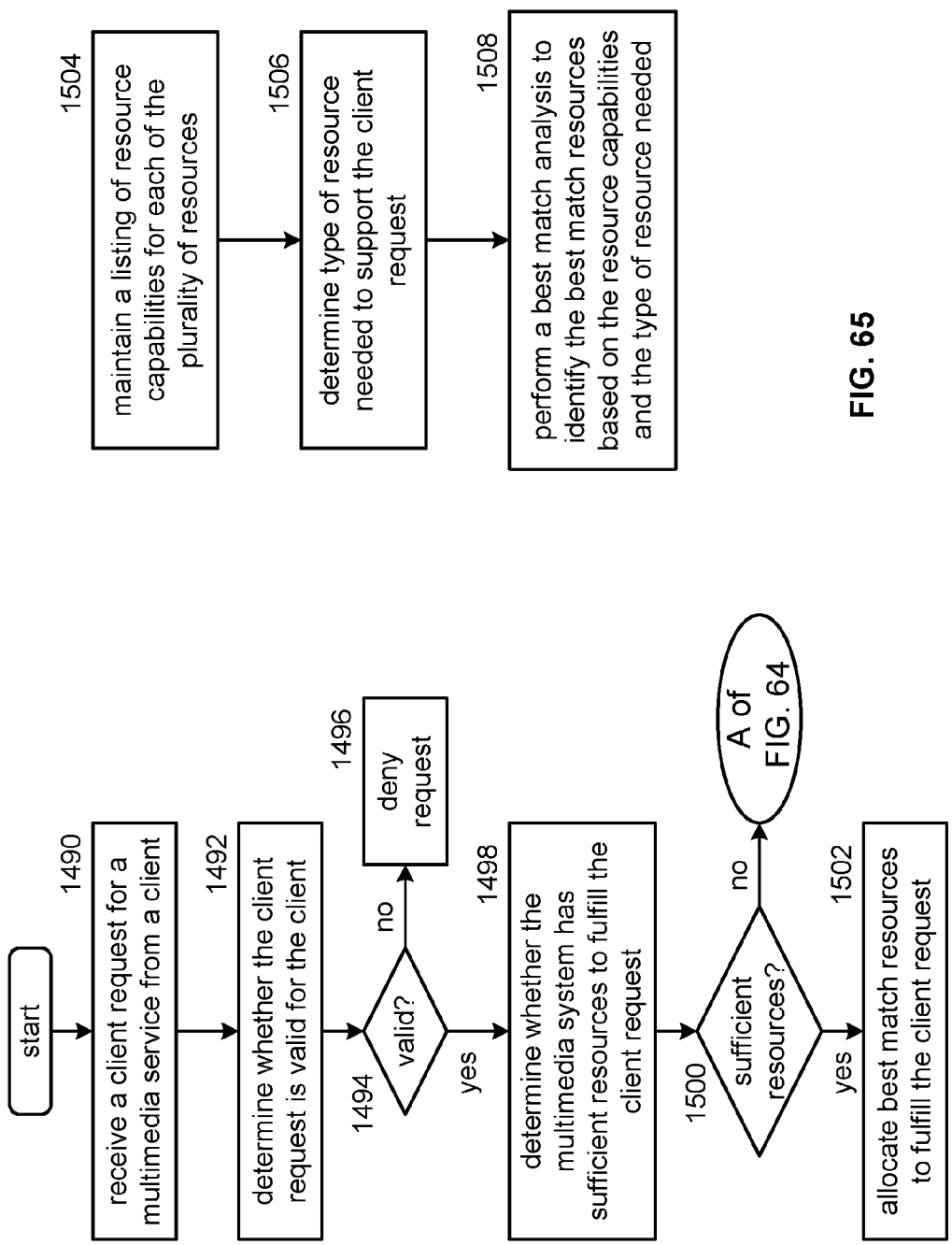

METHOD AND STREAMING VIDEO SERVER FOR USE IN A MULTIMEDIA SYSTEM

CROSS REFERENCE TO RELATED APPLICATIONS

The present U.S. Utility patent application claims priority pursuant to 35 U.S.C. §120 as a continuation of U.S. Utility application Ser. No. 12/246,375, entitled "MULTIMEDIA SYSTEM AND SERVER AND METHODS FOR USE THEREWITH", filed Oct. 6, 2008, which is a continuation of U.S. Utility application Ser. No. 09/865,136, entitled "METHOD AND APPARATUS FOR CHANNEL MIXING IN A MULTIMEDIA SYSTEM", filed May 24, 2001, both of which are hereby incorporated herein by reference in their entirety and made part of the present U.S. Utility patent application for all purposes.

The present application is further related to the following: U.S. Utility application Ser. No. 09/864,524, entitled, "METHOD AND APPARATUS FOR A MULTIMEDIA SYSTEM", filed on May 24, 2001, issued as U.S. Pat. No. 7,099,951 on Aug. 29, 2006;

U.S. Utility application Ser. No. 09/864,602, entitled "METHOD AND APPARATUS OF MULTIPLEXING A PLURALITY OF CHANNELS IN A MULTIMEDIA SYSTEM", filed on May 24, 2001, issued as U.S. Pat. No. 7,200,855 on Apr. 3, 2007;

U.S. Utility application Ser. No. 09/864,783, entitled "METHOD AND APPARATUS FOR ISOLATING A CHANNEL OF INTEREST FROM A SET OF CHANNELS IN A MULTIMEDIA SYSTEM", filed May 24, 2001, abandoned;

U.S. Utility application Ser. No. 11/270,281, entitled "CHANNEL SELECTION IN A MULTIMEDIA SYSTEM", filed Nov. 9, 2005, issued as U.S. Pat. No. 8,291,457 on Oct. 16, 2012;

U.S. Utility application Ser. No. 13/606,249, entitled "CHANNEL SELECTION IN A MULTIMEDIA SYSTEM", filed Sep. 7, 2012, issued as U.S. Pat. No. 9,197,435 on Nov. 24, 2015;

U.S. Utility application Ser. No. 09/864,115, entitled "METHOD AND APPARATUS FOR HUB-BASED NETWORK ACCESS VIA A MULTIMEDIA SYSTEM", filed May 24, 2001, issued as U.S. Pat. No. 7,301,900 on Nov. 27, 2007; and U.S. Utility application Ser. No. 09/864,476, entitled "METHOD AND APPARATUS FOR MANAGING RESOURCES IN A MULTIMEDIA SYSTEM", filed May 24, 2001, issued as U.S. Pat. No. 7,617,515 on Nov. 10, 2009.

TECHNICAL FIELD OF THE INVENTION

This invention relates generally to communication systems and more particularly to in-home local area networking.

BACKGROUND OF THE INVENTION

Communication systems are known to convey data from one entity to another. The data may be audio data, video data and/or text data. In such communication systems, the data is transmitted via one or more transmission mediums (e.g., radio frequencies, coaxial cable, twisted pair copper wire, fiber optic cabling, et cetera) in accordance with one or more data transmission protocols. The distance over which the data traverses within a communication system may be inches, feet, miles, tens of miles, hundreds of miles, thousands of miles, et cetera.

As is also known, communication systems have two basic configurations: wide area networks (WAN) and local area networks (LAN). In addition, WAN and/or LAN communication systems may use a variety of transmission types including broadcast transmissions, asymmetrical transmissions, and symmetrical transmissions. In a broadcast communication system, a network hub transmits data to a plurality of users with little or no data being transmitted from the users to the network hub. Examples of broadcast communication systems include radio systems, NTSC (national television standards committee) television systems (e.g., regular TV), high definition television systems, cable systems, and satellite systems. In each of these broadcast communication systems, a network hub (e.g., radio station, television station, et cetera) transmits a broadcast signal. Any user within range of the broadcast signal and who has an appropriate receiver (e.g., radio, television, et cetera) can receive the broadcast signal. Such broadcast systems employ a particular data transmission protocol such as amplitude modulation, frequency modulation, ultra-high frequency, very high frequency, et cetera.

Asymmetrical communication systems transmit more data in one direction than in another (i.e., one entity transmits to others more than it receives data from each of the other entities). An example of an asymmetrical communication system is the Internet, where web servers transmit substantially more data than they receive from any one user. The Internet uses TCP/IP as its data transmission protocol, while a variety of physical layer data transmission protocols may be used to access the Internet. Such physical layer data transmission protocols include asynchronous transfer mode (ATM), frame relay, integrated services digital network (ISDN), digital subscriber loop (DSL) and all derivatives thereof, and multiple packet label switching (MPLS). Such asymmetrical communication systems may be wide area networks (e.g., the Internet), or local area networks (e.g., local server based system).

Symmetrical communication systems include a plurality of users where the data flow between any of the users could be equal. Examples of symmetrical communication systems include public switch telephone network (PSTN), local computer networks, cellular telephone systems, intercom systems, private branch exchanges (PBX), et cetera. Such symmetrical communication systems use at least one data transmission protocol. For example, a computer network may utilize any one of the Ethernet standards.

In any type of communication system, a user must have the appropriate receiving and possibly transmitting equipment to independently access the communication system. For example, a user of a satellite television system must have a satellite receiver and a television to receive satellite broadcast. If another television is to independently access the satellite broadcast, it needs its own satellite receiver. The same is true for NTSC broadcast, cable broadcast, et cetera, although currently most televisions include an NTSC tuner and/or some form of cable tuner.

With the number of households having multiple television sets increasing, and many users wanting the latest and greatest video viewing services. As such, many households have multiple satellite receivers, cable set-top boxes, modems, et cetera. As is further known, dependent multiple access to satellite broadcasts may be achieved by linking slave televisions to a master television. The master television has full control of, and independent access to, the satellite receiver while the slave televisions receive whatever channel has been selected by the master.

For in-home Internet access, each computer or Internet device has its own Internet connection. As such, each computer or Internet device includes a modem. As an alternative to each computer having its modem, an in-home local area network may be used to provide Internet access. In such an in-home local area network, each computer or Internet device includes a network card to access a server. The server provides the coupling to the Internet. Currently, the cost of a network card is at least as expensive as a 56 K modem thus, there is no cost savings with such an in-home local area network.

As is further known, in-home local area networks use one or more of telephone lines, radio frequencies, power lines, and/or infrared connections as the communication medium. Such in-home local area networks are typically used to facilitate an in-home computer network that couples a plurality of computers with one or more printers, facsimile machine, etc. As such, entertainment type data transmissions (e.g., from VCRs, DVDs, et cetera) are not supported by the in-home local area network without having the home specially wired to support an in-home LAN that transceives entertainment type data.

Therefore, a need exists for a method and apparatus for a communication system to overcome the above-mentioned issues and to offer additional services within homes.

BRIEF DESCRIPTION OF THE DRAWINGS

FIG. 20 illustrates a schematic block diagram of a multimedia server operably coupled to one or more client modules via a wire line connection in accordance with the present invention;

FIG. 21 illustrates a schematic block diagram of a multimedia server being operably coupled to one or more client modules via an RF communication path in accordance with the present invention;

FIG. 31 illustrates a schematic block diagram of another tuning module, which may be incorporated in a multimedia server in accordance with the present invention;

FIG. 32 illustrates schematic block diagram of yet another tuning module, which may be incorporated in a multimedia server in accordance with the present invention;

FIG. 33 illustrates a logic diagram of a method for selecting channels within a multimedia system in accordance with the present invention;

FIG. 34 illustrates a logic diagram further illustrating the receiving the channel selection commands of the logic diagram of FIG. 33;

FIG. 41 illustrates a schematic block diagram of another channel mixer that may be used in a multimedia communication system in accordance with the present invention;

FIG. 42 illustrates a logic diagram of mixing signals within a multimedia communication system in accordance with the present invention;

FIG. 43 illustrates a logic diagram that further defines the processing step of FIG. 42;

FIG. 44 illustrates a logic diagram of a method that further describes the converting step of FIG. 42;

FIG. 45 illustrates a logic diagram of another method that further defines the converting step of FIG. 42;

FIG. 46 illustrates a logic diagram of yet another method that further defines the converting step of FIG. 42;

FIG. 47 illustrates a logic diagram of a still further method that further defines the converting step of FIG. 42;

FIG. 48 illustrates a logic diagram of a method that further defines Step 1052 of FIG. 42;

FIG. 52 illustrates a schematic block diagram of an alternate client module in accordance with the present invention;

FIG. 53 illustrates a logic diagram of a method for processing data within a client module in accordance with the present invention;

FIG. 58 illustrates a logic diagram of a method that further defines Step 1342 of FIG. 57;

FIG. 59 illustrates a logic diagram of a method that further defines Step 1362 of FIG. 58;

FIG. 60 illustrates a logic diagram of a method that further describes Step 1348 of FIG. 57;

FIG. 65 illustrates a logic diagram of an alternate method for managing resources within a multimedia communication system in accordance with the present invention.

DETAILED DISCUSSION OF A PREFERRED EMBODIMENT

Generally, the present invention provides a method and apparatus for channel mixing within a multimedia system. Such a method and apparatus includes processing that begins by receiving a set of channels as encoded channel data. The set of channels corresponds to the channels that have been selected by a plurality of clients via selection requests. The processing continues by interpreting the encoded data to identify a channel of interest for at least one client based on the client's channel selection request. This is typically done for each client that has provided a channel selection request to a multimedia server. The processing then continues by processing the data of the channel of interest based on a type of channel to produce generic data. For example, if the incoming data corresponds to a channel of a satellite transmission, the incoming data will be in a MPEG format. The MPEG data is converted into a generic video data such as digital RGB, digital YCBCR, et cetera. The processing continues by converting the generic data into a stream of data for transmission. With such a method and apparatus, an in-home communication network is established that allows multiple client devices to have independent access to multimedia sources without requiring traditional receiving and/or transmitting equipment associated with independent access to such multimedia sources.

Figure 1:
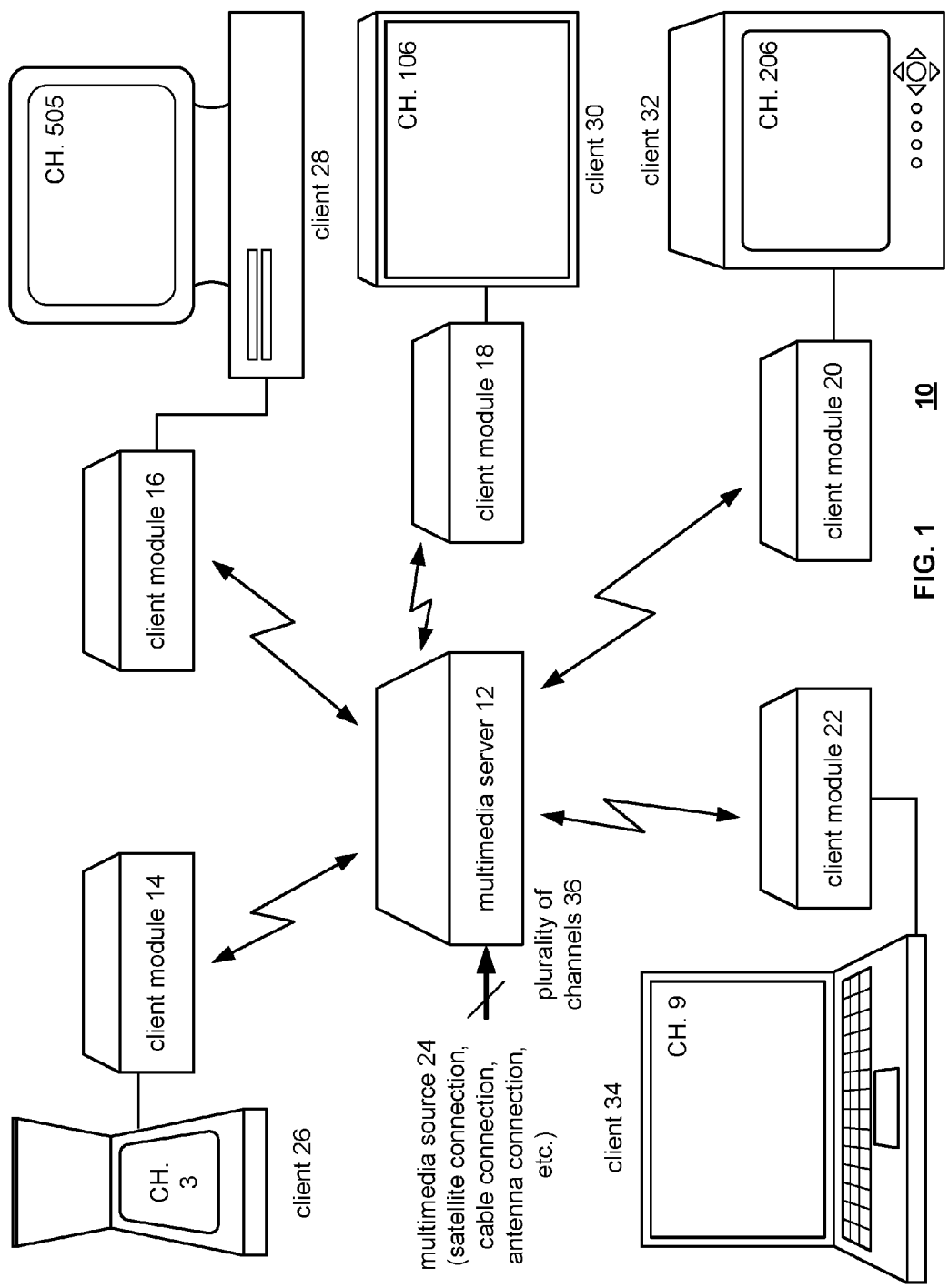
FIG. 1 illustrates a schematic block diagram of a multimedia system in accordance with the present invention.

The present invention can be more fully described with reference to FIGS. 1 through 65. FIG. 1 illustrates a multimedia system 10 that includes a multimedia server 12, a plurality of client modules 14-22 operably coupled to a plurality of clients 26-34. The multimedia server 12 is operably coupled to receive a plurality of channels 36 from a multimedia source 24. The multimedia source 24 may be a satellite connection, cable connection, antenna connection for NTSC television broadcast, HDTV broadcast, PAL broadcast, et cetera. As one of average skill in the art will appreciate, the multimedia server 12 may be a stand-alone device, may be incorporated in a satellite receiver, set-top box, cable box, HDTV tuner, home entertainment receiver, et cetera. In addition, the multimedia server 12 may be implemented using discrete components, integrated circuits, and/or a combination thereof.

The multimedia server 12 communicates with the plurality of client modules 14-22 via a communication path, which may be a radio frequency communication path, a wire line connection, an infrared connection, and/or any other means for conveying data. As such, the multimedia server 12 and each of the client modules 14-22 include a receiver and/or transmitter operable to convey data via the given type of communication path.

As shown, each client module is operably coupled to one of the clients. For example, client module 14 is operably coupled to client 26, which is representative of a personal digital assistant. Client module 16 is operably coupled to client 28, which is representative of a personal computer. Client module 18 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 20 is operably coupled to client 32, which may be a television set, high definition television (HDTV), standard definition television (SDTV), a home theatre system, et cetera. Client module 22 is operably coupled to client 34, which is representative of a laptop computer.

As one of average skill in the art will appreciate, the client module 22 may be a separate device from its associated client or embedded within the client. In addition, one of average skill in the art will further appreciate that the client modules 14-22 may be implemented utilizing discrete components and/or integrated circuits.

Each of the clients 26-34, via its associated client module 14-22, selects one or more channels from the plurality of channels 36. As shown, client 26 has selected channel 3 of the plurality of channels for viewing. Accordingly, client module 14 relays the channel selection of channel 3 to the multimedia server 12. The multimedia server 12 selects channel 3 from the plurality of channels 36. The data corresponding to channel 3 is then multiplexed with the data for the other channels and transmitted from the multimedia server 12 to each of the client modules 14-22. Client module 14 monitors the transmission from the multimedia server 12 and extracts the data corresponding to channel 3. The extracted data for channel 3 is then provided to the client 26 for display.

Client module 16, 18, 20 and 22 perform a similar function for their associated clients 28, 32 and 34, respectively. As shown, client 28 has selected channel 505, client 30 has selected channel 106, client 32 has selected channel 206 and client 34 has selected channel 9. The client modules 16-22 provide the channel selection of its respective client 28-34 to the multimedia server 12. Multimedia server 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 16 monitors the transmitted data for data related to channel 505, client module 18 monitors for data related to channel 106, client module 20 monitors the transmission for data related to channel 206 and client module 22 monitors the transmission for data related to channel 9.

From each client's prospective, the client 26-34 has independent access to the multimedia source 24. Accordingly, client 26 may at any time change its channel selection from, for example, channel 3 to channel 120. The client module 14 provides the channel selection request to the multimedia server 12, which now retrieves data related to channel 120 for client 26 as opposed to channel 3. Similarly, client 28-34 could also change their channel selection from the illustrated selection to another channel. Note that if two clients have selected the same channel, for example, client 26 and 28 both have selected channel 3, the multimedia server 12 would only extract data for channel 3 once and place in the header information of the data relating to channel 3 the identity of both client module 14 and 16. As such, client module 14 and 16 would extract the same data from the transmission by the multimedia server 12 and provide it to its respective clients.

As one of average skill in the art will appreciate, the multimedia system of FIG. 1 provides each client with independent access to the multimedia source 24. As an alternate embodiment, the functionality of client modules 14-22 may vary. For example, client module 14 may not provide all the independent functionality that client module 16 does. For example, client module 14 may not have independent channel selection capabilities but only selecting channels that one of the other clients have selected. Alternatively, one client module may service a plurality of clients.

Figure 2:
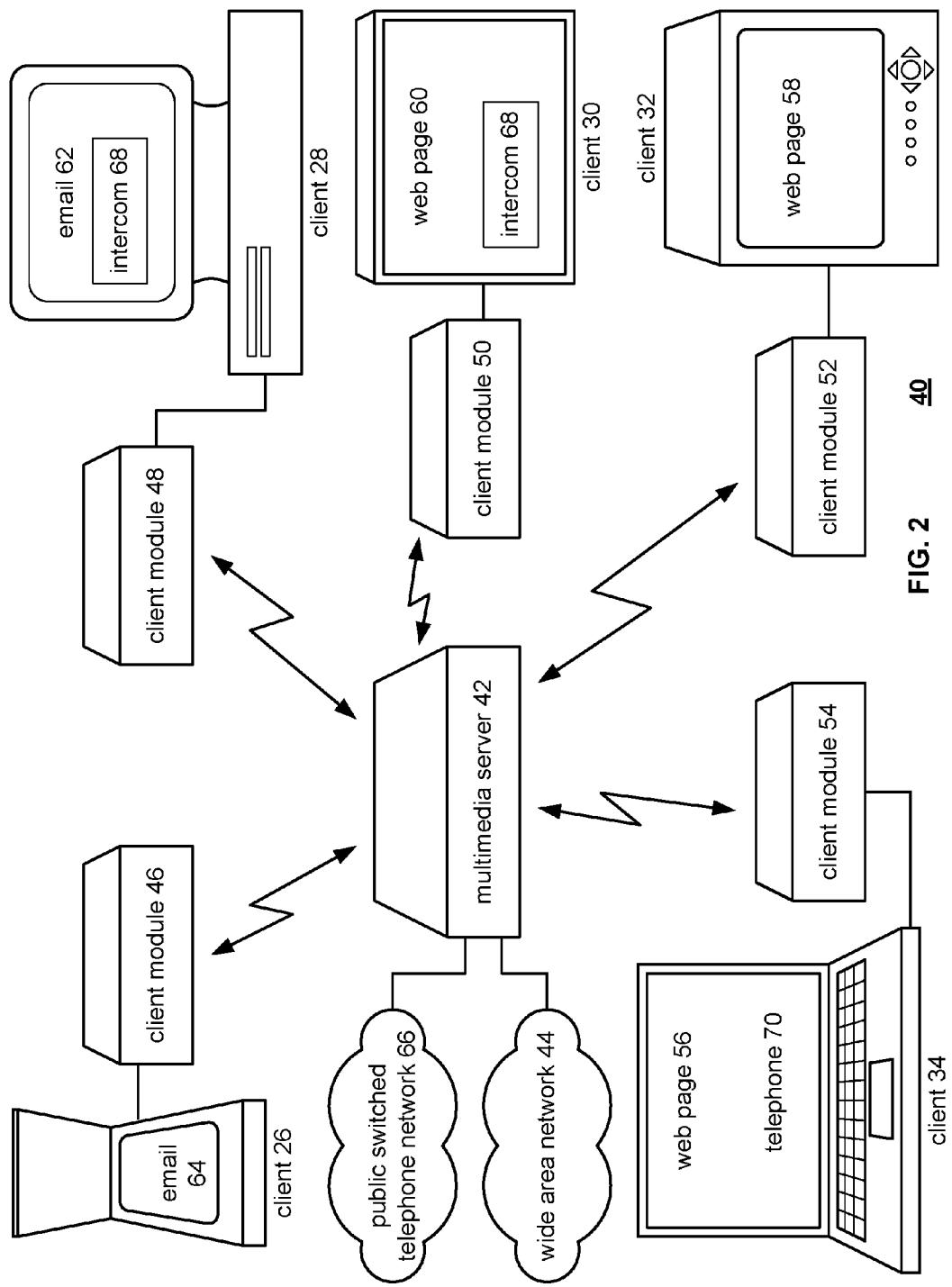
FIG. 2 illustrates a schematic block diagram of another multimedia communication system in accordance with the present invention.

FIG. 2 illustrates a schematic block diagram of a multimedia system 40 that includes a multimedia server 42, a plurality of client modules 46-54, and a plurality of clients 26-34. The multimedia server 42 is operably coupled to a wide area network (WAN) 44 and/or to a public switch telephone network (PSTN) 66. The wide area network 44 may be, for example, the Internet. The multimedia server 42 may be a stand-alone device or incorporated within a modem or within one of the clients 26-34. The functionality of multimedia server 42 may be implemented utilizing discrete components and/or integrated circuits with accompanying software.

The plurality of client modules 46-54 communicates with the multimedia server 42 via a communication path. The communication path may be a radio frequency communication path, infrared communication path, and/or wire line communication path. In this system 40, the multimedia server 42 is providing independent access for each of the clients 26-34 to the public switch telephone network 66 and/or to the wide area network 44.

For access to the public switch telephone network 66, each client 26-34 includes an identification code (e.g., a telephone number). The multimedia server 42 includes cordless telephone functionality such that the multimedia server 42 acts as a base station while each of the client modules 46-54 in conjunction with its respective client 26-34 functions as a handset. As such, for typical telephone communications, the multimedia server 42 is a single base station that includes a plurality of handsets, i.e., the clients 26-34 and their associated client modules 46-54 such as client 34 that operates as telephone 70. Note that if the multimedia server 42 has multiple connections to the public switch telephone network 66, multiple clients may have simultaneous telephone conversations ongoing. In addition, the multimedia server 42 may include private branch exchange (PBX) functionality such that communications between each client may occur within the system. For example, client 26 may communicate with client 34 via the multimedia server 42.

For accessing the wide area network 44, multimedia server 42 includes a network connection, which may be a DSL modem, cable modem, 56K modem, ISDN modem, etc. In addition, the multimedia server 42 includes a plurality of network access applications (e.g., web browser applications, email applications, et cetera) to facilitate each client's access to the wide area network 44. In operation, the client modules 46-54, for their respective clients 26-34, provide an indication that its client desires access to the wide area network 44. Upon receiving the wide area network request, the multimedia server 42 opens a network access application (email or web browser) for the respective client based on the request. The multimedia server 42 may have multiple network access applications open for each client 26-34. When this occurs, the multimedia server 42 allocates access to the network connection amongst the clients in a predetermined manner. For example, the multimedia server 42 may utilize a token passing concept to provide access to the network connection for each of the clients.

The multimedia server 42 receives data from the wide area network 44, which is destined for one or more of the clients 26-34. The multimedia server 42 multiplexes the data and provides a single transmission stream to the plurality of client modules 46-54. Each of the client modules monitors the transmission from the multimedia server 42 to extract data for its respective client 26-34. Upon detecting data for its client, the client module 46 extracts the data and subsequently provides it to its client.

In this illustration, clients 30-34 are accessing the Internet thus are using a web application. For instance, client 34 has web page 56 open, client 32 has web page 58 open, and client 30 has web page 60 open. Each of these web pages appear to the respective client as if the client has direct and independent access to the wide area network. As is also shown, clients 26 and 28 have opened an email application 64 and 62, respectively. As such, client 26 and 28 may process their email via the multimedia server 42.

Figure 3:
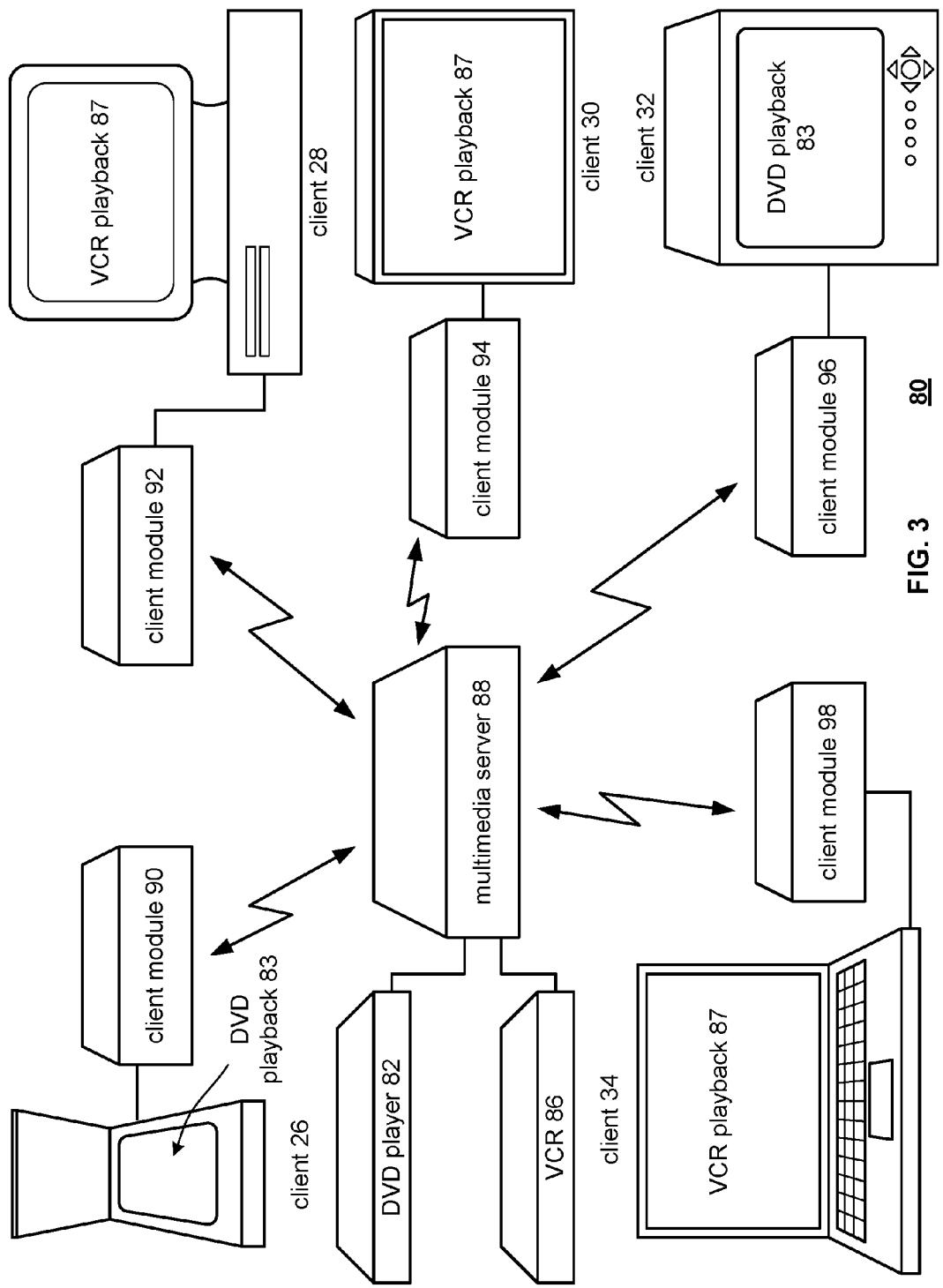
FIG. 3 illustrates a schematic block diagram of a further multimedia communication system in accordance with the present invention.

FIG. 3 illustrates a schematic block diagram of a multimedia system 80 that includes a multimedia server 88, a plurality of client modules 90-98, a plurality of clients 26-34, a DVD player 82, a VCR 86, and other such playback devices. Other such playback devices include laser-disk players, digital VCRs, close circuit televisions, camcorders, et cetera. In this system 80, the multimedia server 88 provides access to the playback equipment devices, e.g., DVD player 82 and VCR 86, for each of the plurality of clients. Each client may select to receive a DVD playback, a VCR playback, or playback from any one of the other video sources.

In this illustration, client 26 has selected DVD playback 83. Accordingly, client 26 provides an indication of its selection to client module 90. Client module 90 communicates client 26's selection to the multimedia server 88. The multimedia server 88 processes the selection to provide the playback data to client module 90. As further shown in FIG. 3, client 32 has also selected DVD playback 83, while clients 28, 30 and 34 have selected VCR playback 87. As such, each of the associated client modules 92-98 will provide its clients' selection to the multimedia server 88. The multimedia server 88 processes the selections to produce a stream of outgoing data. In this example, the stream of outgoing data includes a multiplexing of the DVD playback 83 data and the VCR playback 87 data. Accordingly, the transmission provided by multimedia server 88 to the client modules 90-98 identifies which packets and/or frames contain DVD playback data and which frames and/or packets contain VCR playback data. For example, the multimedia server 88 may tag packets as containing DVD playback data or VCR playback data. Alternatively, the multimedia server 88 may tag the packets by including the identity of the particular client module associated with the client that provided the specific VCR or DVD playback request. In either case, the client modules 90-98 interpret the data transmitted from the multimedia server 88 to extract the appropriate data for its client. The extracted data is then provided to its client for playback.

As one of average skill in the art will appreciate, the multimedia server 88 may be operably coupled to the client modules 90-98 via an RF connection, infrared connection and/or a wire line connection. In addition, each of the client modules 90-98 may be separate devices and/or included within its respective client. As one of average skill in the art will further appreciate, the client modules 90-92 may be implemented in discrete circuit components and/or integrated circuits and further includes associated programming operations. Similarly, multimedia server 88 may be a stand-alone device or incorporated within the DVD player 82, VCR 86, and/or any other video source. The multimedia server 88 may be implemented utilizing discrete components, integrated circuits and associated programming operations.

Figure 4:
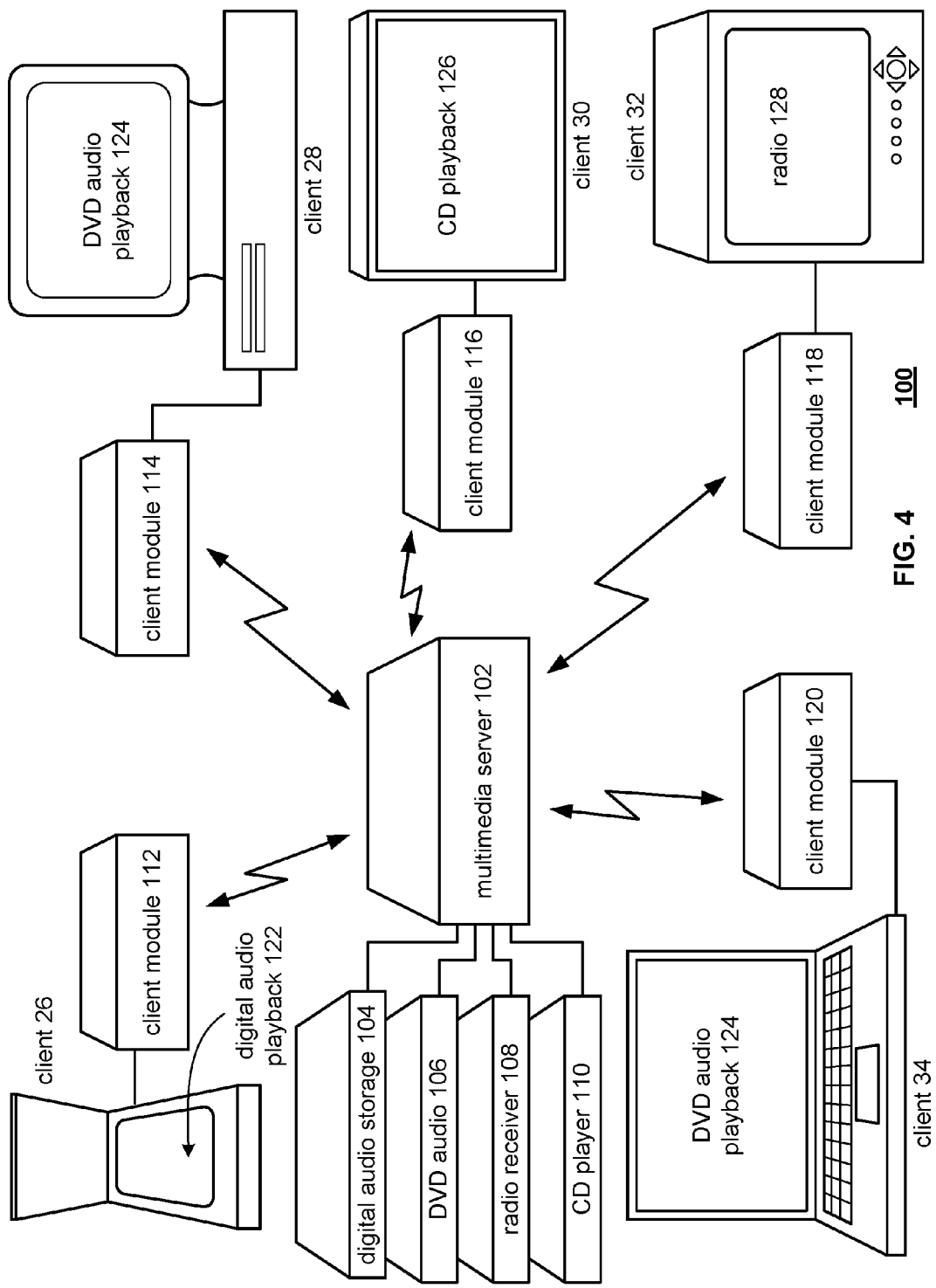
FIG. 4 illustrates a schematic block diagram of yet another multimedia communication system in accordance with the present invention.

FIG. 4 illustrates a schematic block diagram of a multimedia system 100 that includes a multimedia server 102, a plurality of client modules 112-120, a plurality of clients 26-34, a digital audio storage device 104, a DVD audio device 106, a radio receiver 108, and a CD player 110. In this illustration, the multimedia system 100 provides a selection of multiple audio sources to a plurality of clients without requiring an independent and direct connection to each of the audio devices.

In operation, the client modules 112-120 receive a selection request from its respective clients. The selection request is selecting audio playback from the digital audio storage device 104, which may be storing MP3 files, digitized audio, et cetera, the DVD audio player 106, the radio receiver 108, the CD player 110, and/or any other type of audio source.

Upon receiving the selection request, the multimedia server 102 processes the request to authenticate it and once authenticated, retrieves data from the appropriate audio source 104-110. The multimedia server 102 multiplexes the audio data from the audio sources 104-110 into a single transmission. Each of the client modules 112-120 receives the transmission and extract the relevant portions for its client.

As shown in FIG. 4, client 26 has selected to display audio from the digital audio storage device 104. Accordingly, the client 26 provides the selection request to client module 112, which is subsequently provided to the multimedia server 102. The multimedia server 102 processes the request and initiates the playback from the digital audio storage device 104. The audio playback data from the storage device 104 is received by the multimedia server 102, which multiplexes it with other audio playback data from other audio sources and provides the single transmission to the client modules. The transmission from the multimedia server 102 may be in packets and/or frames. Each packet and/or frame includes a header section that identifies the source of the data and/or the destination of the data. Accordingly, client module 112 monitors the transmission for data addressing it and/or identifying the digital audio storage device 104. Upon detecting such data within the transmission, the client module 112 extracts the data and provides it to the client 26 for digital audio playback 122.

Client 28 has selected DVD audio playback 124. Accordingly, client module 114 provides the selection request to multimedia server 102. Multimedia server 102 initiates the DVD audio playback via the DVD audio device 106. The DVD audio playback is multiplexed with other audio playback data and provides the multiplexed data in the single transmission to the client modules. Client module 114 extracts the DVD audio playback data and provides it to client 28. Client module 120 provides the same function for client 34.

Client module 116 provides a similar function for client 30 but with respect to CD playback 126. Accordingly, client module 116 provides the CD playback request of client 30 to the multimedia server 102. The multimedia server 102 initiates the CD playback via CD player 110 and multiplexes the CD playback data into the transmission stream. Client module 116 extracts the CD playback data from the transmission stream and provides it to client 30.

Client module 118 provides radio playback 128 connectivity to the multimedia server 102 for client 32. In this example, client 32 provides an indication for radio playback and the desired radio station. Client module 118 provides the request to multimedia server 102, which interprets the request and selects one of the plurality of channels received via radio receiver 108. The data from the selected radio channel is multiplexed with the other audio data being processed by the multimedia server 102. The client module 118 extracts the appropriate radio data from the transmission and provides it to client 32.

Figure 5:
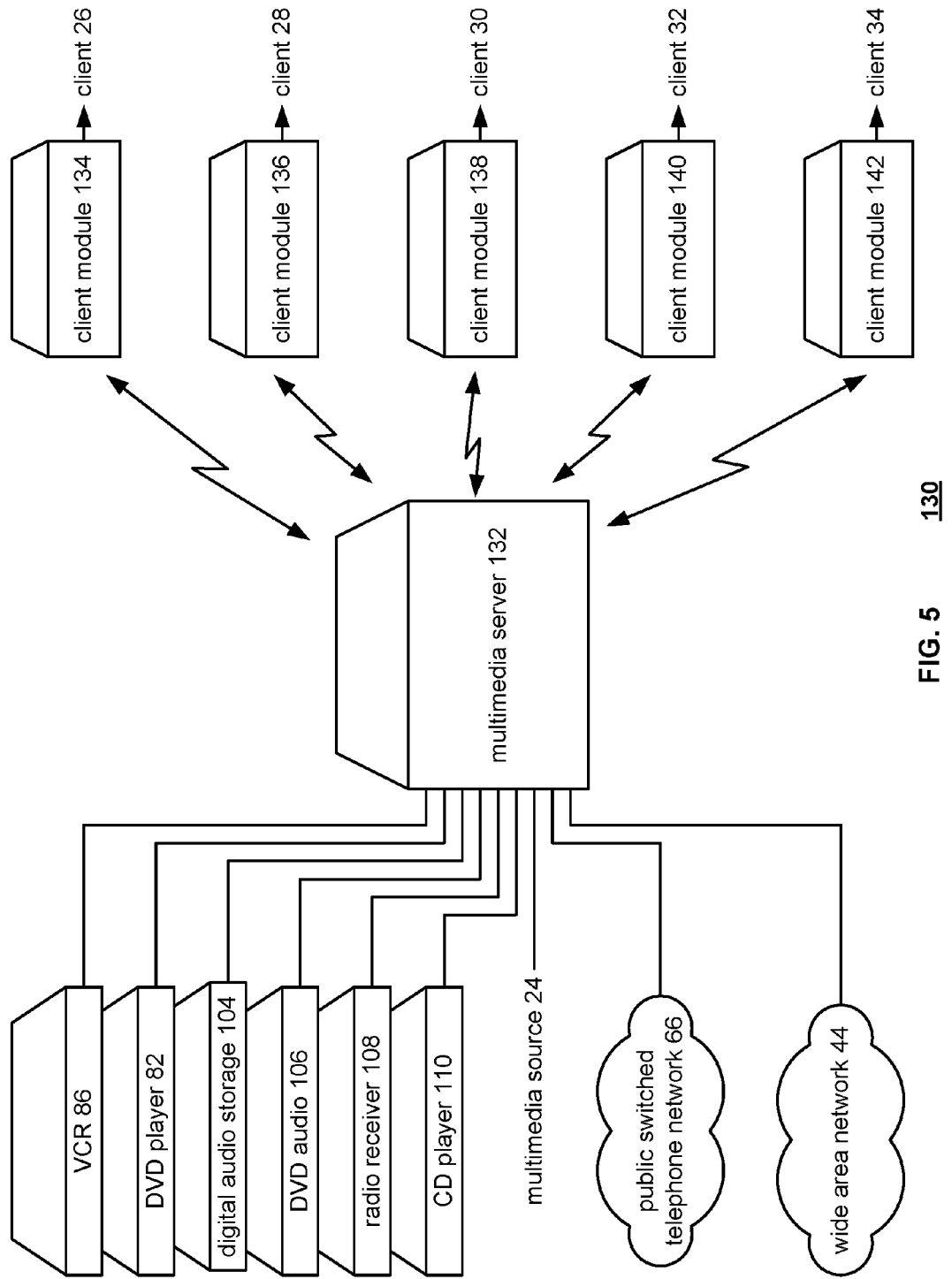
FIG. 5 illustrates a schematic block diagram of a still further multimedia communication system in accordance with the present invention.

FIG. 5 illustrates a schematic block diagram of a multimedia system 130 that includes multimedia server 132, client modules 134-142, clients 26-34, and a plurality of multimedia sources. The multimedia sources include VCR 86, DVD player 82, digital audio storage device 104, DVD audio 106, radio receiver 108, CD player 110, multimedia source 24, public switch telephone network 66, wide area network 44, and/or any other type of audio and/or video source. In this system 130, the clients 26-34 may select playback from, and/or connection to, any one of the multimedia sources. The selection request from each client module would identify the desired multimedia source, the client, the desired service and any other information to assist the multimedia server 132 in processing the request. As such, one client may be accessing the Internet, while another client is watching a satellite broadcast channel, while another is listening to a CD playback, while another is talking on the telephone, and yet another is watching a DVD playback. This is all done via the multimedia server 132 without requiring the clients to have direct access to the multimedia sources and without the requirement that each client have its own multimedia source and/or multimedia source connection. In essence, multimedia server 132 provides the functionality of one or more of multimedia server 12, 42, 88 and 102 of FIGS. 1-4. While client modules 134-142 provide the functionality of one or more of the client modules described generally with reference to FIGS. 1-4.

As one of average skill in the art will appreciate, the multimedia server 12, 42, 88, 102, and/or 132 may be incorporated in a home theatre receiver, television set, modem, set-top box, cable receiver, satellite receiver, VCR, DVD player, et cetera to provide the networking functionality as generally described in FIGS. 1-5. As one of average skill in the art will further appreciate, the clients 26-34 of FIGS. 1-5 may be any one of a personal computer, a laptop computer, a personal digital system, a video telephone, a digital telephone, a cellular telephone, a monitor, a television, a high definition television, a printer, a facsimile machine, and/or any devices that includes an audio and/or video display.

Figure 6:
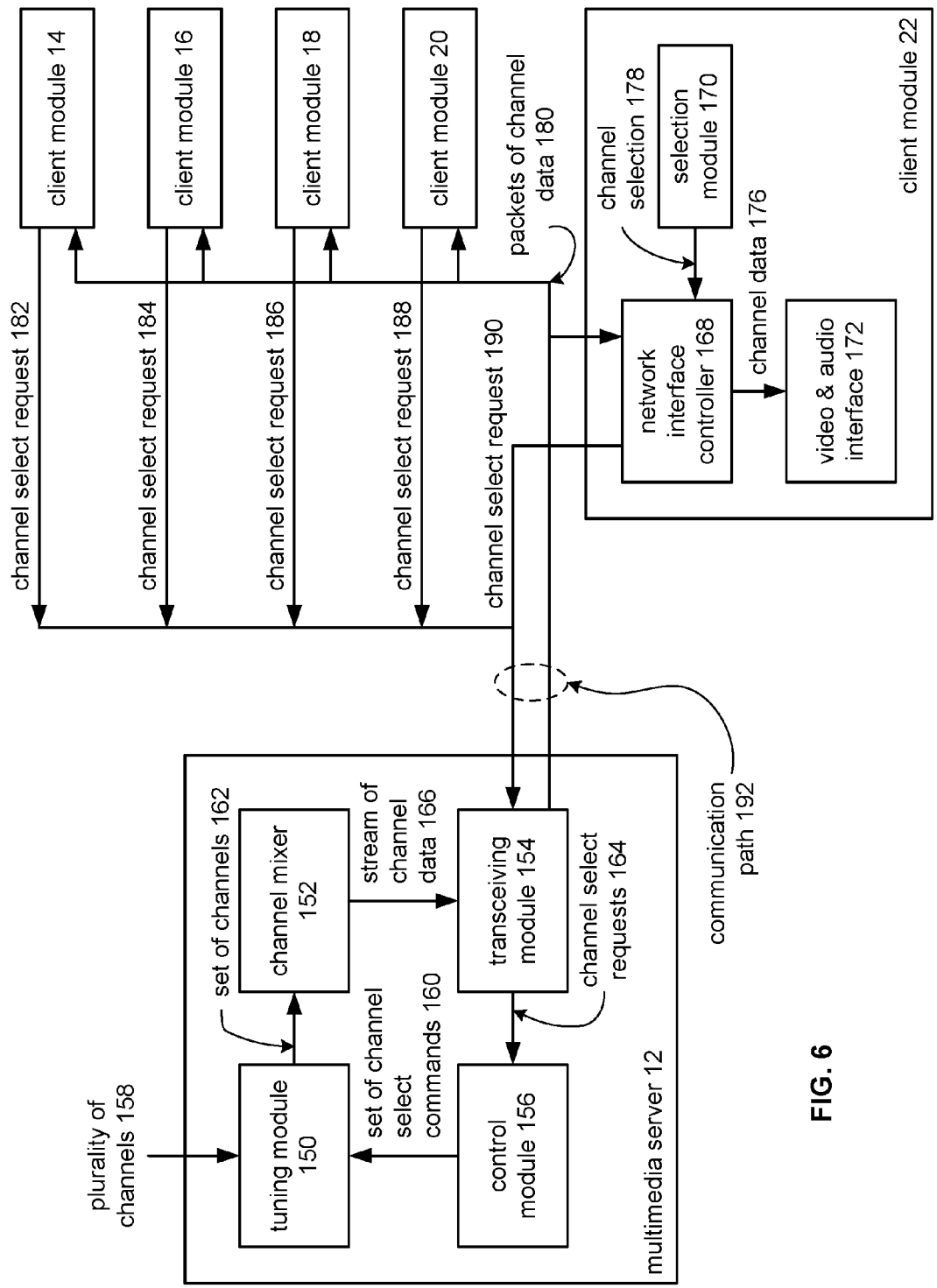
FIG. 6 illustrates a schematic block diagram of a multimedia server and client modules of the multimedia communication system illustrated in FIG. 1.

FIG. 6 illustrates a schematic block diagram of the multimedia server 12 and client modules 14-22 of the system 10 of FIG. 1. The multimedia server 12 includes a tuning module 150, a channel mixer 152, a transceiving module 154, and a control module 156. The multimedia server 12 is operably coupled to each of the client modules 14-22 via a communication path 192. The communication path 192 may be a wire line connection, a transmit wire line connection, a receive wire line connection, a transceiving radio frequency path, a transmit radio frequency path, a receive radio frequency path, a transceiving infrared path, a transmitting infrared path, and/or a receiving infrared path.

Each of the channel modules 14-22 includes a network interface controller 168, a selection module 170, and a video and/or audio interface 172. The selection module 170 is operably coupled to receive an input from the client to produce a channel selection 178. Accordingly, if the client is a television set, the television set provides a signal to the selection module 170 indicating the channel selected. Alternately, the channel selection module 170 may include a remote control receiver such that when the remote control of the television is used to change the channel on the television set, the selection module 170 receives the control signal, interprets it, and produces the channel selection 178 therefrom.

The network interface controller 168 receives the channel selection 178 and prepares it for transmission via the communication path 192 to the multimedia server 12. The processing performed by the network interface controller 168 is dependent on the type of communication path 192. For example, if the communication path is a wire line connection, the channel selection 178 may be processed in accordance with a type of transceiving that includes time division multiplexing (TDM), frequency division multiplexing (FDM), pulse code modulation (PCM), amplitude shift keying (ASK), phase shift keying (PSK), quadrature phase shift keying (QPSK), quadrature amplitude modulation (QAM), carrier sense multiple access (CSMA), CSMA with collision avoidance and/or CSMA with collision detection.

The network interface controller 168 provides the process channel selection 178 as a channel select request 190 to the transceiving module 154 of multimedia server 12. As one of average skill in the art will appreciate, client modules 14-20 perform a similar function as client module 22 in producing their respective channel select request 182-188. As one of average skill in the art will appreciate, the channel selection 178 may include selecting an audio channel, video channel, a particular audio source (e.g., CD playback), a particular video source (e.g., DVD player), etc. In addition, the channel select request 182-190 may further include volume adjust, picture quality settings and adjustments, displaying restrictions, purchase request, picture-in-picture activation and deactivation, picture-in-picture channel select, video pausing, reverse play, fast forward, and/or audio muting.

The transceiving module 154 receives the channel select requests 182-190 from the plurality of client modules 14-22 via the communication path 192. The transceiving module 154 extracts the physical layer information from the requests 182-190 to retrieve the respective channel select requests 164. The transceiving module 154 provides the channel select request 164 to control module 156. As an analogy, note that the channel selections 178 may correspond to network layer data while the channel selection request 182-190 may correspond to physical layer data of a ISO standardized communication system. As such, channel selection request utilize physical layer type identification within its header and include in its data section the channel selections 178. The channel selections include a header section and data section corresponding to the particular channel selected.

The control module 156 processes the channel select request 164. The processing of the channel select request includes authenticating the request and preparing a set of channel selection commands 160 therefrom. The tuning module 150 receives the set of channel selection commands 160 and extracts a set of channels 162 from a plurality of channels 158 based on the set of channel selection commands 160. The plurality of channels corresponds to channels provided via a satellite connection, a cable connection, an NTSC broadcast, an HDTV broadcast, a PAL broadcast, et cetera. The tuning module 150 provides data for each of the channels of the set of channels 162 to the channel mixer 152.

The channel mixer 152 mixes (i.e., multiplexes) the set of channels 162 to produce a stream of channel data 166. The mixing of the set of channels includes converting the data of each channel into a generic data type and then converting the generic data into a specific data format for transmission as the stream of channel data 166.

The transceiving module 154 transmits the stream of channel data 166 in packets of channel data 180. Alternatively, the stream of channel data 166 may be transmitted in frames of channel data. Each of the client modules 14-22 receives the packets, or frames, of channel data 180 via its network interface controller 168.

The network interface controller 168 of each client module interprets the header of each packet of channel data 180 to determine whether it addresses its corresponding client module. If so, the network interface controller 168 removes the physical layer portion of the packets of channel data 180 to retrieve channel data 176. The channel data 176 is provided to the video and/or audio interface 172. For example, if the channel data 176 is video data, the interface 172 is a video interface to a display input of the associated client. Alternatively, if the channel data 176 is audio data, the interface 172 is an audio interface that couples to an audio input of the associated client.

Figure 7:
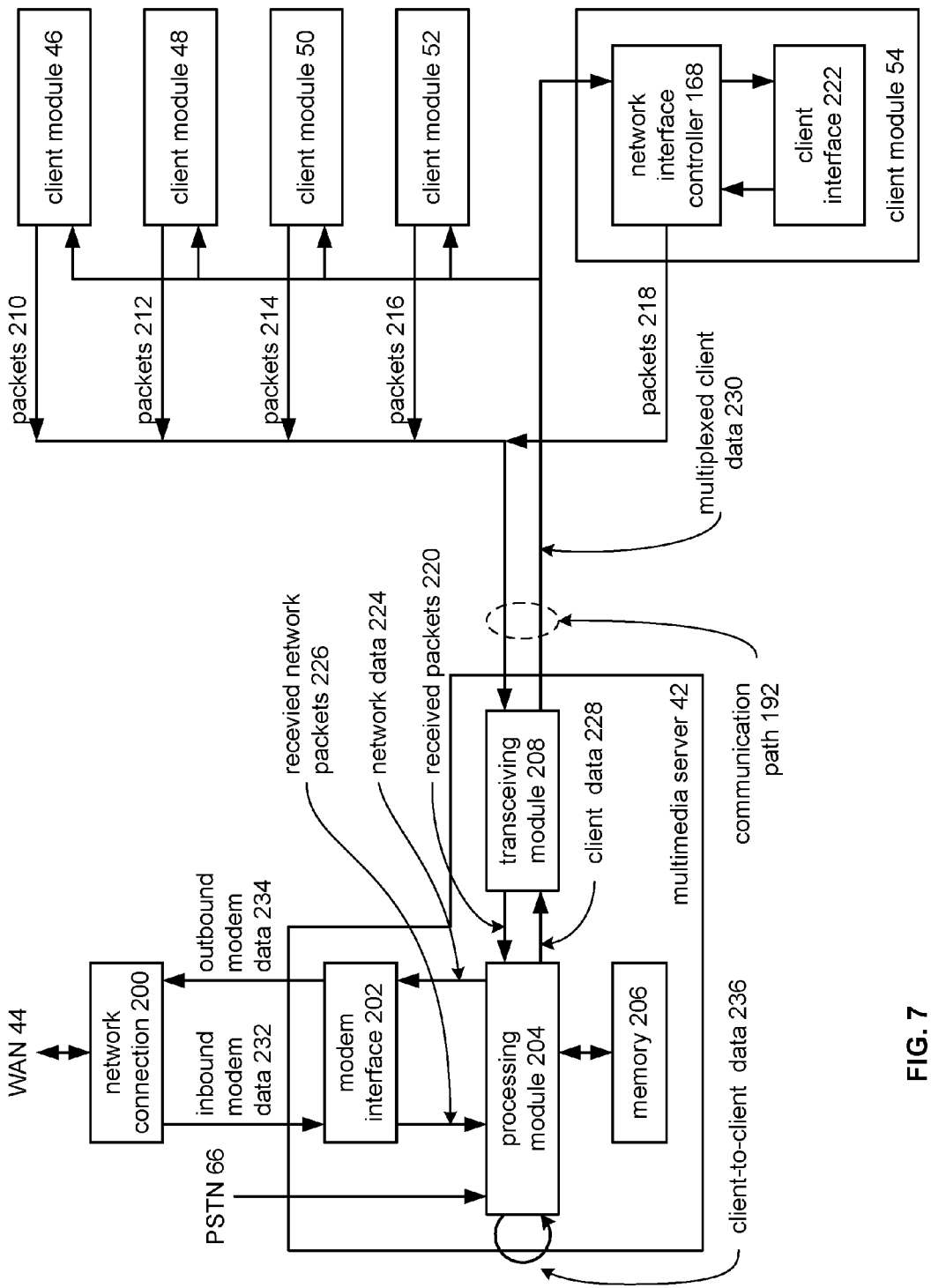
FIG. 7 illustrates a schematic block diagram of a multimedia server and client modules of the multimedia communication system of FIG. 2.

FIG. 7 illustrates a schematic block diagram of multimedia server 42 and client modules 46-54 of the multimedia system 40 of FIG. 2. The multimedia server 42 includes a modem interface 202, a processing module 204, memory 206 and a transceiving module 208. The modem interface 202 is operably coupled to a network connection 200, which in turn is operably coupled to a wide area network 44. The processing module 204 is also coupled to the public switch telephone network 66.

Each of the client modules 46-54 includes a network interface controller 168 and a client interface 222. In operation, the client module, via its client interface 222, receives a request that indicates the client's desire for either Internet connection via wide area network 44, to place a telephone call via the PSTN 66, or for client-to-client communication. The client interface 222 provides connectivity to the client via a PCI bus interface, an AC 97 bus interface, a parallel input, a serial input, et cetera. The network interface controller 168 processes the request from its client to produce a request packet(s), which is/are transmitted to the transceiving module 208 of the multimedia server 42.

The transceiving module 208 retrieves the request from the packet(s) in accordance with the data conveyance protocol used by the multimedia system. The transceiving module provides the retrieved requests to the processing module 204. The processing module 204 determines whether the request is valid. If so, the processing module 204 sets up the appropriate interface with the PSTN 66 and/or the WAN 44. The appropriate interfacing to the PSTN for a telephone connection includes the processing module 204 performing base station like functions of a cordless telephone, while the client module and/or client functions as a cordless handset. As a base station, the processing module 204 initiates a connection with the PSTN 66 to enable a telephone communication for the requesting client.

If the request was for Internet access via wide area network 44, the appropriate interfacing includes the processing module activating a network access application for the requesting client. The network access application may be a web browser application, email application, et cetera. The particular network access application will be dependent upon the request provided by the client. Upon activating the network access application, the processing module determines whether the network connection 200 is actively coupled to the wide area network 44. If not, the processing module 204 establishes, via the modem interface 202, a connection to wide area network 44 through the network connection 200. At this point, the respective client has access to the Internet.

With the Internet access established, the client interface 222 receives Internet data from the client and provides it to the network interface controller 168. The Internet data includes inputs from the client in response to the particular network access application (e.g., web browser, email, etc.). For example, the inputs for an email application include send a message, read a message, compose a message, etc. The corresponding processing of these inputs by multimedia server, via the network access application, is provided back to the client for display by the client. As such, from the client's prospective, the client has direct access to the Internet.

The client generates the inputs via a keyboard, touchscreen, and/or other input device and provides them to the client module via the client interface 222. The client interface 222 provides the inputs to the network interface controller 168, which packetizes them to produce packets 218. The packets 218 include a header section and data section. The header section includes identity of the client module and/or client, the destination address, and other physical layer-type header information. The data section includes the input data provided by the client. Each client module 46-54 produces packets 210-218 in a similar manner.

The network interface controller 168 provides the packets 210-218 to the transceiving module 208 of the multimedia server 42 via the communication path 192. Since Internet access is typically a bi-directional communication, the communication path 192 may include a separate transmit path and a separate receive path. The transmit path may be used for transmitting packets 210-218 to the multimedia server while the receiving path may be used to receive multiplexed client data 230 from the multimedia server 42.

The transceiving module 208 receives packets 210-218 and removes the physical layer header information to produce retrieved requests 220. The retrieved requests 220 are provided to processing module 204, which converts them into network data 224 by executing the network access application thereon. Note that the network data 224 includes separate data for each of the clients accessing the WAN. The processing module 204 provides the network data 224 to the network connection 200, via the modem interface 202, as outbound modem data 234. Responses to the outbound modem data 234 are received via the network connection 200 as inbound modem data 232. The processing module 204 receives the inbound modem data 232 as received network packets 226 via the modem interface 202.

The processing module 204 interprets the received network packets 224 to identify the source and/or destination of the network packets. For each network packet that is destined for a particular client, the processing module adds header information to address the particular client thereby producing client data 228. The transceiving module 208 performs the physical layer interfacing on the client data 228 producing multiplex client data 230.

Each of the client modules 46-54 receives the multiplex client data 232 via the communication path 192. The network interface controller 168 monitors the multiplex client data 230 to identify packets destined for its client module and its respective client. For each packet the network interface controller 168 identifies for the corresponding client module, it strips off the physical layer information and provides the respective client data to the client interface 222. The client interface 222 provides the respective client data to the client thereby facilitating Internet access for the particular client.

The multimedia server 42 may also provide intercom, or client-to-client, communications between the clients of the system 40. In this instance, the client interface 222 would receive a request for intercom communications from its client. The network interface controller 168 would packetize this request and provide it to the transceiving module 208 of multimedia server 42. The processing module 204 processes the request and determines whether the request can be fulfilled. Whether the request can be fulfilled is based on resource availability of the multimedia server, bandwidth availability of the communication path 192, and functionality capabilities of the clients involved in the intercom communication. If the request can be fulfilled, the processing module 204 provides a response to the initiating client module.

Once the intercom communication has been established, the initiating client provides data to the multimedia server via the network interface controller 168 in packets. The packets include a header section and a data section, wherein the header section indicates that the data section includes client-to-client data. Once the processing module 204 receives the packetized intercom data, the processing module 204 detects that this is a client-to-client communication and processes the client-to-client data 236. The processing module 204 provides the client-to-client data 236 as part of the client data 228. The client data 228 includes header information that identifies it as a client-to-client communication data, telecom data, and/or Internet communication data.

The transceiving module 208 performs the physical layer packetizing of the client data 228 to produce the multiplex client data 230. The targeted client module identifies the packets containing the client-to-client communication via the network interface controller 168, which strips off the physical layer portion of the packets and provides the client-to-client data to the client interface 222. The client interface 222 provides the intercom data to the respective client.

Figure 8:
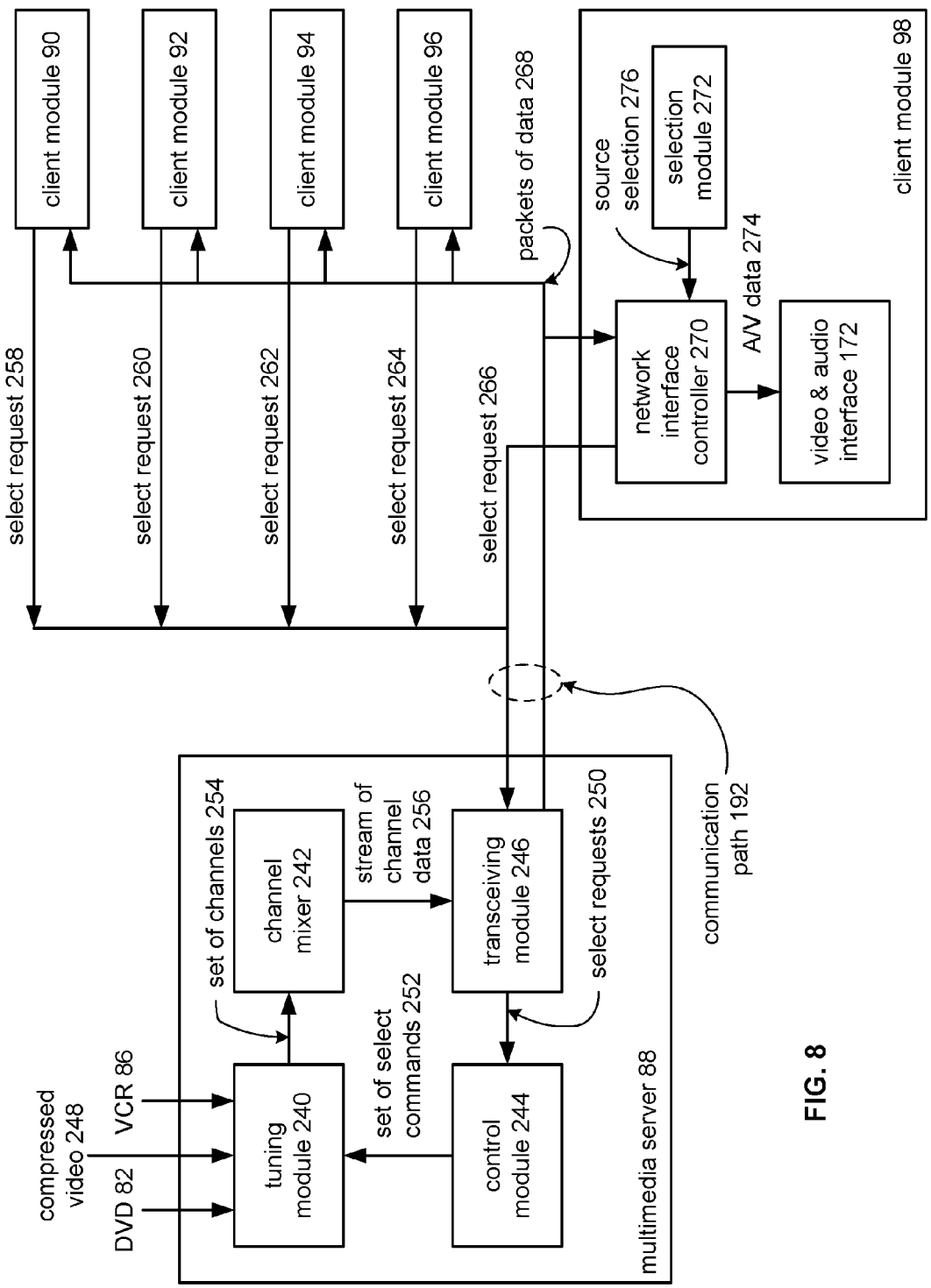
FIG. 8 illustrates a schematic block diagram of a multimedia server and client modules of the multimedia communication system of FIG. 3.

FIG. 8 illustrates a schematic block diagram of multimedia server 88 and client modules 90-98 of the multimedia communication system 80 of FIG. 3. The multimedia server 88 includes a tuning module 240, a channel mixer 242, a transceiving module 246 and a control module 244. Each of the client modules 90-98 includes a network interface controller 270, a video and/or audio interface 172, and a selection module 272.

In operation, the selection module 272 receives an input from a client to produce a source selection 276. The input from the client indicates the particular multimedia source that is to be accessed. In this example, the multimedia source may be a DVD player 82, a VCR 86, a compressed video source 248, closed circuit television system, and/or any other type of video source. The selection module 272 may receive the input directly from the client and/or include circuitry to receive the communication from the remote control device of the client. As such, the selection module 272 interprets the remote control transmission of the client to produce the source selection 276. The source selection 276 includes a header section and a data section. The header section includes the identity of the client module and indicates that the data section including a request as opposed to actual data.

The source selection 276 is provided to the network interface controller 270, which adds physical layer overhead onto the source selection 276 and provides it as a select requests 258-266 to the multimedia server 88.

The transceiving module 246 receives the select requests 258-266 and removes the physical layer overhead. The transceiving module 246 provides the select request 250, which includes the source selections 276 of the client modules, to the control module 244. The control module processes the select request 250 to authenticate the request, determine whether the server can support the request, and, if so, produces a set of selection commands 252.

The tuning module 240 receives the set of selection commands 252 and selects data from one or more of the multimedia sources 82, 86, and 248 based on the corresponding selection commands 252. The tuning module 240 provides the data from the selected multimedia sources as a set of channels 254 to the channel mixer 242.

The channel mixer 242 processes the set of channels 254 by converting the data of each multimedia source into generic data. The generic data is converted into a specific format video data, which is then combined into a stream of channel data 256. The transceiving module 246 receives the stream of channel data 256 and packetizes it for transmission as packets of data 268.

Each of the network interface controllers 270 of the client modules 90-98 receives the packets of data 268. The network interface controller 270 strips off the physical layer overhead and interprets it to determine whether the packet is destined for its respective client module. If so, the network interface controller provides the audio and/or video data 274 contained in the packet to the video and audio interface 172. The video and audio interface 172 provides the data to an audio input and/or video input of the client.

Figure 9:
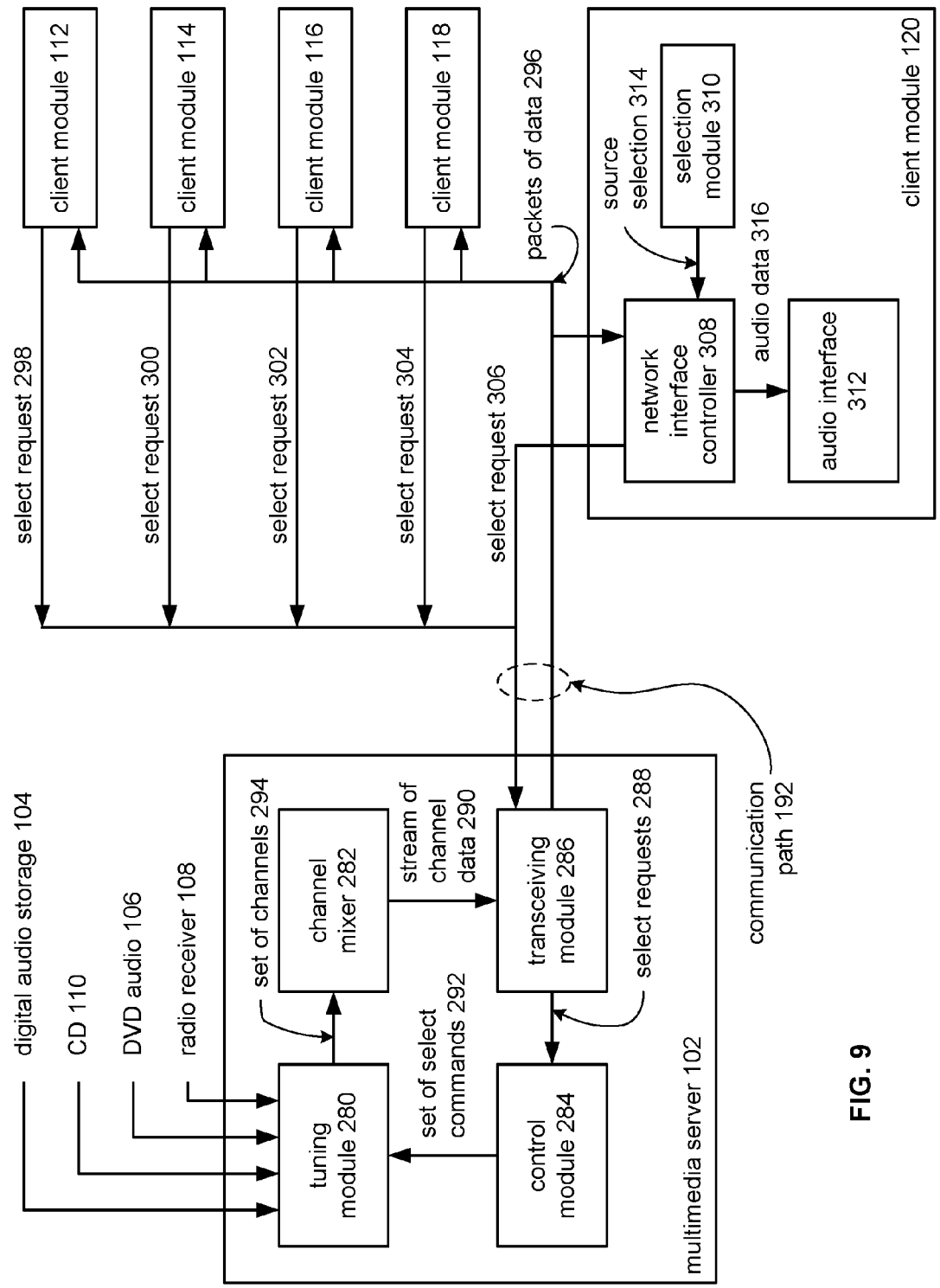
FIG. 9 illustrates a schematic block diagram of a multimedia server and client modules of the multimedia communication system of FIG. 4.

FIG. 9 illustrates a schematic block diagram of multimedia server 102 and client modules 112-120 of multimedia system 100 of FIG. 4. In this illustration, multimedia server 102 includes a transceiving module 286, a control module 284, a tuning module 280, and a channel mixer 282. Each of the client modules 120 includes a network interface controller 308, a selection module 310 and an audio interface 312.

In operation, the selection module 310 receives an input from its respective client. The input identifies a particular audio source, such as digital audio storage 104, CD 110, DVD audio 106, radio receiver 108. The input is processed by the selection module 310 to produce a source selection 314. The source selection 314 identifies the particular source and the corresponding client. The network interface controller 308 packetizes the source selection 314 and provides it as a select request 298-306 to the multimedia server 102.

The transceiving module 286 receives the select request 298-306 via the communication path 192 and reconstructs the source selection 314 as selection request 288. The control module 284 receives the select request 288 and determines whether they can be fulfilled. The determination is based on resources available within the multimedia server 102, bandwidth availability of communication path 192, authenticity of the particular client, and privilege access for the particular client. If the selection request for the client can be processed, the control module produces a selection command 292 for each corresponding select request.

The tuning module 280 receives the set of selection commands 292 and accesses the playback data from the identified audio source. The audio sources include the digital audio storage 104, which may be storing digitized audio, MP3 files, CD player, DVD audio player 106 and/or a radio receiver 108. The tuning module 280 outputs the selected playback of the corresponding audio services as a set of channels 294.

The channel mixer 282 receives the set of channels 294 and converts them into generic audio data. The generic audio data is then converted into a specific audio data format, which is combined into a stream of channel data 290. The channel mixer 282 provides the stream of channel data 290 to the transceiving module 286. The transceiving module 286 packetizes the stream of channel data 290 and provides it as packets of data 296 to the plurality of client modules 112-120.

The network interface controller 308 of the client module 112-120 receives the packets of data 296. The network interface controller 308 interprets each packet to determine whether the packet is for its respective client module 120. For each packet that is for its client module, network interface controller 308 extracts audio data 316 and provides it to the audio interface 312. The audio interface 312 provides the audio data 316 for playback to its respective client device.

Figure 10:
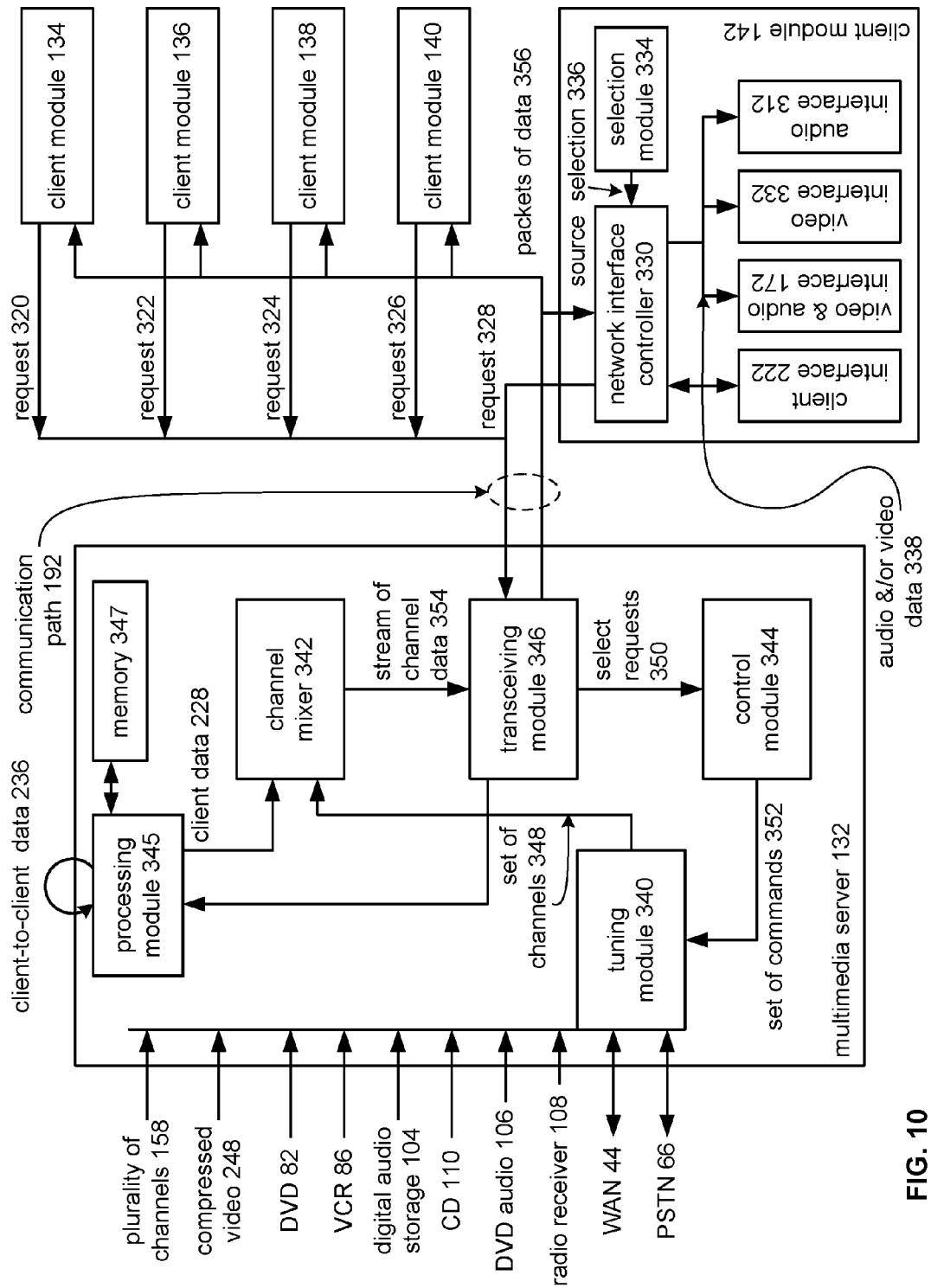
FIG. 10 illustrates a schematic block diagram of a multimedia server and client modules of the multimedia communication system of FIG. 5.

FIG. 10 illustrates a schematic block diagram of multimedia server 132 and client modules 134-142 of the multimedia communication system 130 of FIG. 5. The multimedia server 132 includes processing module 345, memory 347, channel mixer 342, transceiving module 346, control module 344, and tuning module 340. Each of the client modules 142 includes a selection module 334, network interface controller 330, client interface 222, video and audio interface 172, video interface 332, and an audio interface 312.

In this multimedia communication system, a client may select any one of a variety of multimedia services including client-to-client communications, viewing a channel from a satellite connection, cable connection, etc., viewing closed circuit television, viewing compressed video stored in memory, viewing a DVD, viewing a cassette from a VCR, listening to digital audio, listening to a compact disk, listening to DVD audio, listening to a radio station, accessing the Internet, and/or participating in a telephone call.

To initiate one or more of these multimedia services, the selection module 334 of a client module receives an input either from the client device or a remote control device associated with the client device. The input identifies the particular client as well as identifying the particular service desired. The selection module 334 interprets the input to produce a source selection 336. The selection module 334 provides the source selection 336 to the network interface controller 330.

The network interface controller 330 prepares the source selection 336 for transmission to the multimedia server 132. The preparation may be done by packetizing the source selection 336 for a physical layer type transmission, placing at least a portion of the source selection 336 in an allocated timeslot in a TDM transmission scheme, responding to a polling request from the multimedia server 132, requesting and/or receiving a token ring, et cetera. Regardless of the type of access scheme used, the network interface controller 330 produces a request 320-328, which is transmitted to the transceiving module 346 of multimedia server 132.

The transceiving module 346 receives the request 320-328 from the client modules 134-142. The transceiving module 346 processes the request in accordance with the transmission scheme utilized. For example, if the transmission scheme is carrier sense multiple access, the transceiving module 346 interprets the header to identify the particular client such that it may isolate the individual request 320-328. As a further example, if TDM access is utilized, the transceiving module 346 identifies the particular timeslot allocated to each client module to identify the corresponding request 320-328. Regardless of the type of transmission scheme utilized, the transceiving module 346 removes the physical layer type overhead from the requests 320-328 to recapture the source selections 336. The source selections 336 are provided as select requests 350 to the control module 344.

The transceiving module 346 processes requests 320-328 to identify the particular type of selection being requested. If the selection is to access one of the multimedia sources, it processes that as described above. If, however, the transceiving module 346 detects one or more of the requests 320-328 requesting client-to-client communication, the transceiving module 346 generates a client-to-client request, which is provided to processing module 345.

The control module 334 interprets each of the select requests 350 in accordance with the access privileges and authentication processes for each of the client modules 134-142. If the selection request is valid and the client module has been authenticated, the control module 334 generates a select command for each corresponding request 320-328. The control module 334 provides the select commands as a set of commands 352 to the tuning module 340.

The tuning module 340 processes each of the select commands of the set of commands 352 to identify the multimedia source to be accessed. For each command received, the tuning module 340 selects the appropriate channel of the multimedia sources. For multimedia sources that include a plurality of channels, such as a satellite connection, cable connection, radio receiver, et cetera, the tuning module 340 selects the particular source and also further selects one of the plurality of channels from such multimedia sources. The resulting isolated channels are provided to the channel mixer 342 as a set of channels 348.

The processing module 345 receives client-to-client communication requests and processes the request to produce client-to-client data 236. The processing module 345 provides the client-to-client data 236 as client data 228 to the channel mixer 342.

The channel mixer 342 processes the set of channels 348 and, when included, the client data 228. The channel mixer 342 converts the data of each channel of the set of channels 348 into generic data. The client data 228 is multiplexed with the generic data of the set of channels 348 to produce the stream of channel data 354. The channel mixer 342 provides the stream of channel data 354 to the transceiving module 346.

The transceiving module transmits the stream of channel data 354 in accordance with the data transmission protocol incorporated by the multimedia communication system. As such, the stream of channel data 354 is framed, packetized, et cetera to produce packets of data 356 that are provided via a communication path to each of the client modules 134-142.

The network interface controller 330 of each of the client modules receives the packets of data 356 and interprets overhead information within the header to determine whether this particular packet is for the corresponding client module. If so, the network interface controller strips off the overhead information and further interprets the particular type of data contained in the packet. This may be done by reading additional overhead information to identify the particular sources of information and/or accessing memory, which corresponds the anticipated packets with the source selection 336. If the packets correspond to data received from one of the multimedia sources, the network interface controller 330 provides audio and/or video data 338 to one or more of the interfaces 172, 332 or 312. If, however, the data relates to a client-to-client communication, telephone call or accessing the Internet, the network interface controller 330 provides the received data to the client interface 222.

Each of the interfaces 172, 222, 332, and 312 interfaces with the respective client devices either through external ports of the client device such as a serial port, parallel port, or internal access through a PCI bus, AC 97 bus, et cetera. Once the data is received by the client device, it is displayed visual and/or audibly as if the client device had direct access to the particular multimedia source being accessed.

As one of average skill in the art will appreciate, the mixing of data performed by channel mixer 342 may utilize a prioritization scheme depending on the type of data being mixed. For example, if the data being mixed includes real time audio and/or video data, such data may take priority over non-real time video and/or audio. Such real time video and/or audio include telephone communications, watching live broadcasts, et cetera while non-real time video and/or audio include viewing a DVD, VCR, listening to digital audio, CD, DVD audio, et cetera. The non-real time data may be transmitted in large bursts with greater time intervals between the bursts and still provide a continuous flow of display data. Conversely, real time data is transmitted in smaller bursts and more frequently.

As one of average skill in the art will further appreciate, the memory 347 of multimedia server 132, or other memories in any of the multimedia server shown, may enable the multimedia server to function as a digital VCR. As such, live broadcasts may be captured from a satellite connection, cable connection, NTSC broadcast, PAL broadcast, HDTV broadcast and stored in memory for subsequent playback.

As one of average skill in the art will further appreciate, the multimedia server 132 may couple to one or more of the multimedia sources shown. As such, multimedia server 132 may include the functionality of any one or all of the multimedia servers shown in FIGS. 1-4. Correspondingly, each client module 134-142 may include the functionality of one or more of the client modules shown in FIGS. 1-4.

Figure 11:
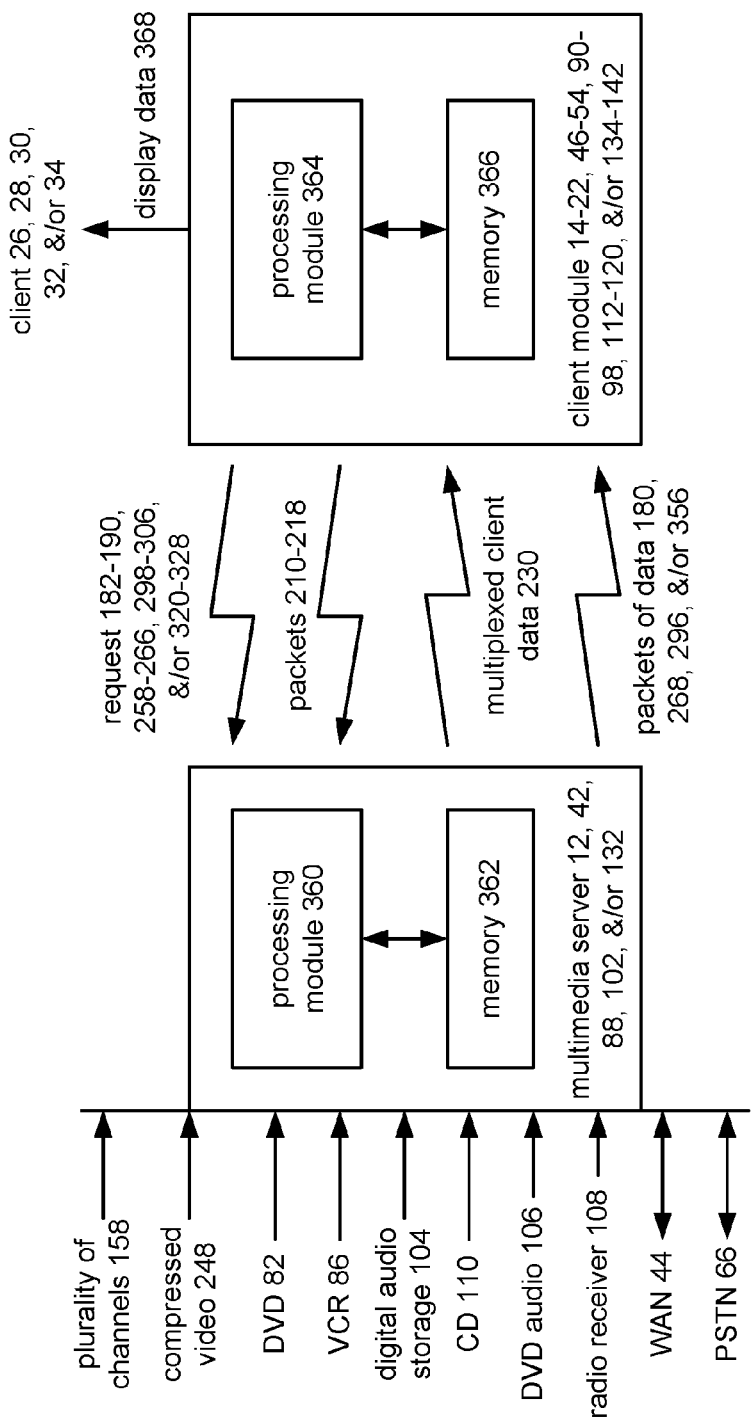
FIG. 11 illustrates a schematic block diagram of a multimedia server and a client module that may be used in any one of the multimedia communication systems of FIGS. 1 through 5.

FIG. 11 illustrates an alternate schematic block diagram of the multimedia communication systems shown in FIGS. 1-5. The multimedia server 12, 42, 88, 102 and/or 132 includes a processing module 360 and memory 362. The multimedia server is operably coupled to receive one or more of multimedia sources. Such multimedia sources include a plurality of channels 158 from a satellite connection, cable connection, NTSC broadcast, PAL broadcast, HDTV broadcast, compressed video 248 from a memory device, camcorder, et cetera, DVD playback 82, VCR playback 86, stored digital audio 104, CD playback 110, DCD audio playback 106, radio reception 108, wide area network 44, and/or connection to the public switch telephone network 66.

The processing module 360 may be a single processing device or plurality of processing devices. Such a processing device may be a microcontroller, microprocessor, microcomputer, central processing unit, digital signal processor, programmable gate array, state machine, logic circuitry, and/or any device that manipulates signals (analog and/or digital) based on operational instructions. The memory 362 may be a single memory device or a plurality of memory devices. Such a memory device may be a read-only memory, random access memory, system memory, flash memory, magnetic tape memory, programmable memory, erasable memory, and/or any device that stores digital information. Note that when the processing module 360 implements one or more of its functions via a state machine or logic circuitry, the memory storing the corresponding instructions is embedded within the circuitry comprising the state machine or logic circuitry. The functions performed by processing module 360 and stored in memory 362 are generally described in the logic diagrams of FIGS. 24-28, which will be discussed below.

In general, the multimedia server provides access for a plurality of clients to one or more of the multimedia services by receiving requests 182-190, 258-266, 298-306 and/or 320-328 from a client module. The multimedia server processes the request to produce packets of data 180, 268, 296 and/or 356 or multiplex client data 230 depending on the type of request. In addition, the client modules may provide packets of information 210-218, which contain data for Internet connections, telephone connections, and/or client-to-client communications. The multimedia server processes packets as described generally with reference to FIGS. 1-10.

Client module 14-22, 46-54, 90-98, 112-120 and/or 134-142 includes a processing module 364 and memory 366. The client module is operably coupled to a client 26, 28, 30, 32 and/or 34 to provide display data 368. The display data may include audio data, video data and/or text data. The type of display data 368 will depend on the particular multimedia source being accessed for the client. The processing module 364 may be a single processing device or a plurality of processing devices. Such a processing device may be a microprocessor, microcontroller, microcomputer, central processing unit, programmable gate array, state machine, logic circuitry, digital signal processor, and/or any device that manipulates signals (analog and/or digital) based on operational instructions. The memory 366 may be a single memory device or a plurality of memory devices. Such a memory device may be a read-only memory, random access memory, erasable memory, flash memory, magnetic tape memory, system memory, and/or any device that stores digital information. Note that when processing module 364 implements one or more of its functions via a state machine or logic circuitry, the memory storing the corresponding operational instructions is embedded within the circuitry comprising the state machine and/or logic circuit. The functions performed by processing module 364 and stored in memory 366 are described in greater detail with reference to FIGS. 52-62 and have been generally described with reference to FIGS. 1-10.

Figure 12:
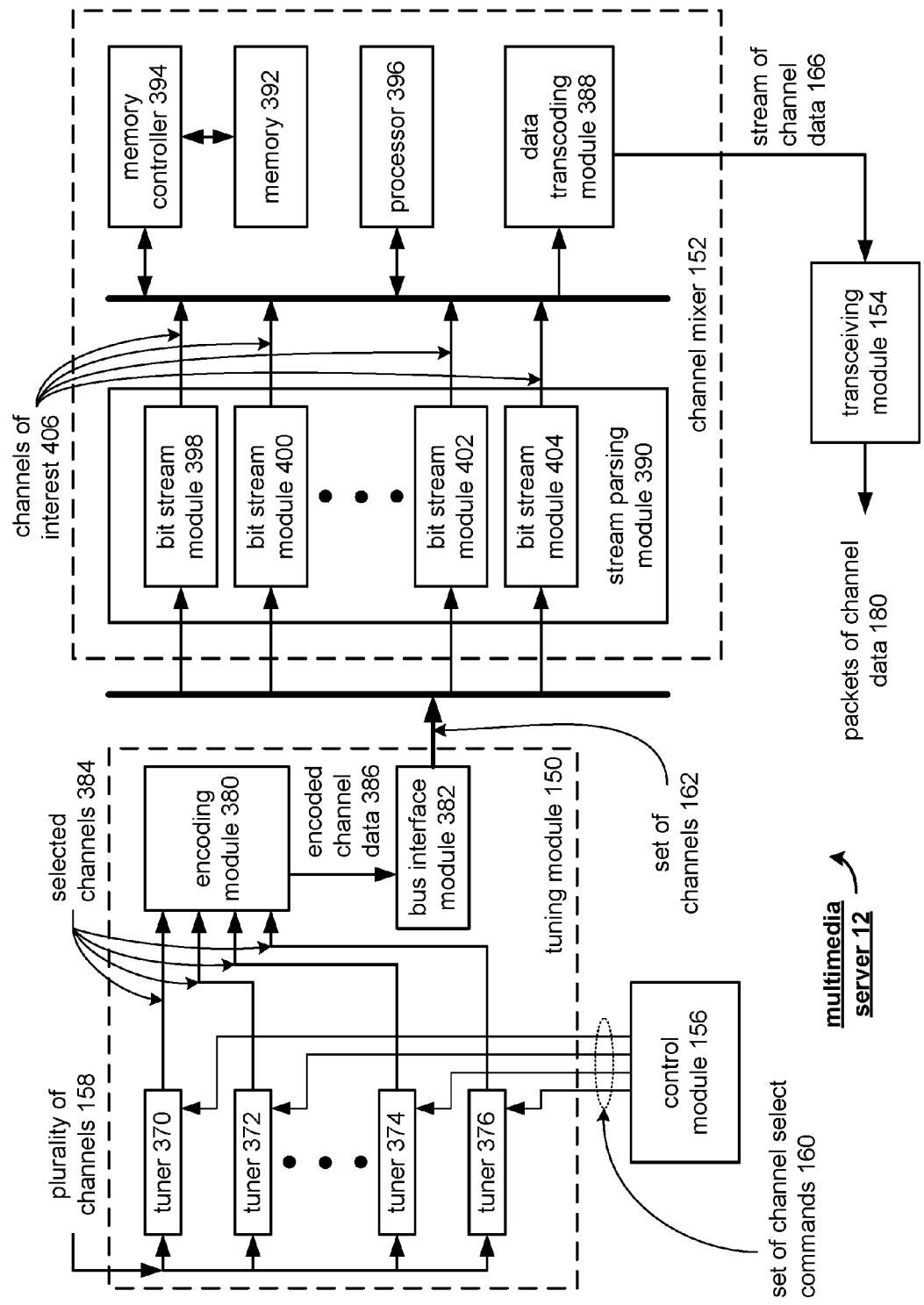
FIG. 12 illustrates a more detailed schematic block diagram of a multimedia server that may be used in the multimedia communication system of FIG. 1.

FIG. 12 illustrates a more detailed schematic block diagram of multimedia server 12 of the multimedia communication system of FIG. 1. The multimedia server 12 includes the tuning module 150, the channel mixer 152, the transceiving module 154, and the control module 156. The tuning module 150 includes a plurality of tuners 370-376, an encoding module 380, and a bus interface module 382. The channel mixer 152 includes at least one stream parsing module 390, a memory controller 394, memory 392, a processor 396, and a data transcoding module 388. The stream parsing module 390 includes a plurality of bit stream modules 398-404.

In operation, the control module 156 provides the set of channel select commands 160 to the tuning module 150. As shown, each tuner receives an individual channel select command from the control module 156. Alternatively, the control module 156 provides a stream of data containing the channel select commands 160 to the tuning module 150. The tuning module then would interpret the stream of data to identify the particular commands being received and then provide individual channel select commands to tuners 370-376. Each of the tuners 370-376 has its input coupled to receive the plurality of channels 158.

The plurality of channels may be received via a satellite connection, cable connection, NTSC broadcast, PAL broadcast, HDTV broadcast, et cetera. Accordingly, each of the tuners 370-376 would include a corresponding tuner functionality and construction. For example, if the plurality of channels 158 is being received via an NTSC broadcast, each of the tuners includes a television encoder to isolate one of the plurality of channels and produce digitized video as an output. Alternatively, if the plurality of channels 158 is received via a satellite connection, each of the tuners includes a satellite tuner as found in commercially available satellite receivers. The satellite tuner outputs, in MPEG 2 format, one or more channels of the plurality of channels. Similarly, for HDTV, cable TV, et cetera the tuners would be of a construct corresponding to the particular source of the plurality of channels. Since the construct of such tuners for each of the sources is known, no further discussion will be presented for the tuners except to further illustrate the concepts of the present invention.

Each tuner 370-376 outputs a selected channel 384 and provides it to the encoding module 380. The encoding module 380 encodes each of the selected channels 384 based on the encoding scheme used by the multimedia server 12 to produce encoded channel data 386. The encoding scheme may be one or more of multilevel encoding, non-return to zero encoding, Manchester encoding, block encoding and/or nB/mB encoding where in n>m. For example, the nB/mB may be 4B/5B encoding where 4 bits of actual data are converted into 5 bits of encoded data. In addition, the encoding attaches a header portion, which identifies the particular channel. The encoded channel data 386 is placed on a bus coupling the tuning module 150 to the channel mixer 152 by a bus interface module 382.

The bus interfacing module 382 places the encoded channel data 386 on the bus in accordance with the particular data transport scheme used within multimedia server 12. For example, the data conveyance protocol may be carrier sense multi-access, TDMA, et cetera.

The channel mixer 152 is operably coupled to receive the encoded channel data 386 from tuning module 150. The channel mixer 152 receives the encoded channel data 386 via the stream parsing module 390. The stream parsing module 390 includes a plurality of bit stream modules 398-404. Each of the bit stream modules 398-404 monitors the bus for data corresponding to a particular channel of interest. Accordingly, each of the bit stream modules 398-404 is allocated to process data related to a particular client module. For example, bit stream module 398 may be allocated to process data for client module 14 of FIG. 1, while bit stream module 400 is allocated to process data for client module 16 of FIG. 1, et cetera.

Each bit stream module 398-404 includes a bus interface module (not shown) to monitor the bus to detect the identity the relevant data. As one of average skill in the art will appreciate, alternatively, the channel mixer 152 may include a bus interface module that provides a single connection to receive all of the data, wherein the bus interface module interprets the data and provides it to the appropriate bit stream module 398-404. Each of the bit stream modules 398-404 isolates data of its corresponding channel of interest 406 and provides the data to memory 392 via memory controller 394.

As the data corresponding to each channel of interest 406 is stored in memory 392, the processing module 396 is converting the channel of interest 406 from its original format into generic data. The processor 396 causes the generic data to be stored in memory 392 via memory controller 394. For example, if the channel of interest corresponds to video data received from one of the multimedia sources, the processor converts the specific formatted video data (e.g., MPEG II) of the multimedia source into a generic video data. Such generic video data may be formatted as MPEG video data, JPEG data, M-JPEG video data, digital RGB data and/or digital YCBCR data.

If the data for the channel of interest is audio data, the processor 396 converts the formatted of audio data from its original format into generic audio data, such as MPEG formatted audio data, MP3 formatted data, and/or PCM digitized audio data.

The data transcoding module 388 retrieves the generic data from memory 392 via the memory controller 394 to produce a stream of channel data 166. If the generic data is generic video data, the transcoding module 388 converts the generic video data into a specific video data format, such as MPEG II, to produce the stream of channel data 166. If, however, the generic data includes generic audio data, the data transcoding module 388 converts it into a specific audio format, such as MP3. If the data is Internet data, telecommunication data, and/or client-to-client communication data, the transcoding module 388 provides the data unaltered as part of the stream of channel data 166.

The transceiving module 154 receives the stream of channel data 166 and processes it to produce packets of channel data 180. The processing performed by the transceiving module 154 is in accordance with the data conveyance protocol of the multimedia server. As such, the processing adds overhead information to identify the particular portions of the stream of channel data 166 that is destined for individual client modules.

Figure 13:
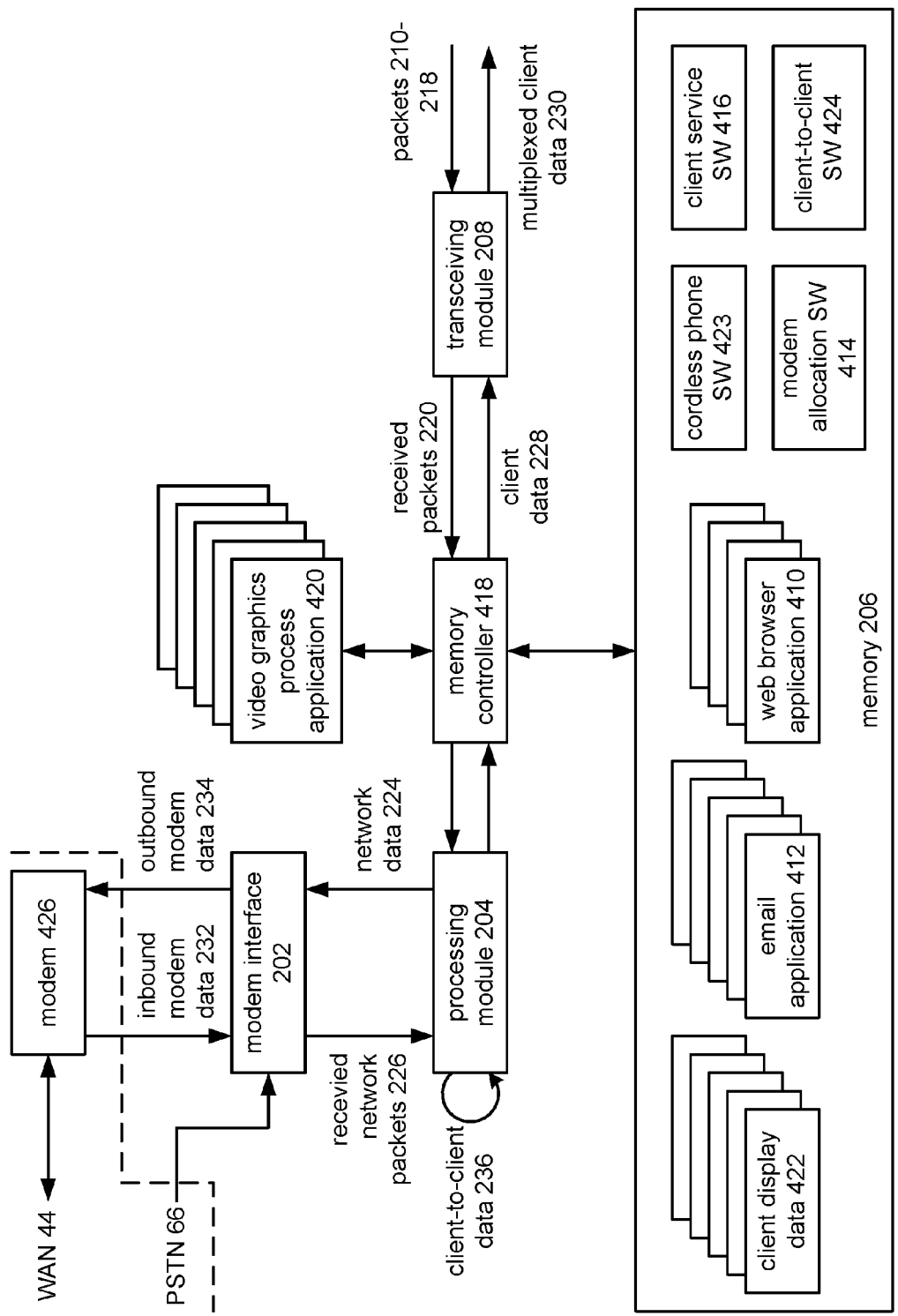
FIG. 13 illustrates a more detailed schematic block diagram of a multimedia server that may be used in the multimedia communication system of FIG. 2.

FIG. 13 illustrates a more detailed schematic block diagram of multimedia server 42 of the multimedia communication system of FIG. 2. As shown, the multimedia server 42 includes a modem interface 202, processing module 204, memory controller 418, transceiving module 208, memory 206, and video graphics processing applications 420. The modem interface 202 is operably coupled to a modem 426, which provides the network connection 200. Note that the modem 426 may be an xDSL modem, a wireless modem, a 56K modem, a cable modem, an ISDN modem, or a connection to a home network. In addition, the modem interface 202 provides coupling to the public switch telephone network 66. As one of average skill in the art will appreciate, the multimedia server 42 may provide one or more of the functions of an Internet connection, connection to the public switch telephone network, and client-to-client communications.

The video graphics processing applications 420 may be software applications stored in memory 206 and executed by processing module 204. Alternatively, the video graphics process applications 420 may be executed by a single or multiple video graphics processors operable coupled to memory controller 418. In any implementation, the video graphics process applications 420 prepare video data for display on a CRT, LCD panel, et cetera.

The memory 206 stores a plurality of software applications including client service software 416, cordless telephone software 423, client-to-client software 424, modem allocation software 414, a plurality of web browser applications 410, and a plurality of email applications 412. The memory 206 also stores client display data 422. The client display data 422 is processed by the video graphics process applications 420 to produce outgoing display data.

In operation, the transceiving module 208 receives packets 210-218 from the plurality of client modules. Initially, the packets 210-218 include header information that identifies the particular client, information indicating that this is a service request packet, and its payload includes identity of the particular service being requested. The particular service being requested may be accessed to the Internet, participating in a telephone conversation via the PSTN, and/or client-to-client communications.

When the packets are received by the multimedia server, the transceiving module 208 removes the physical layer overhead information from the packets and provides retrieved requests 220 to memory controller 418. Memory controller 418 causes the retrieved requests 220 to be stored in memory 206. The processing module 204 retrieves the retrieved requests 220 to initiate processing of the requests. For requests indicating a particular type of service, the processing module 204 interprets the request to identify the service being requested. As an alternative to routing received request packets through memory controller 418, the receive request packets may be placed in a buffer and directly accessed by processing module 204 from the buffer.

The processing module 204 evokes the client service software 416 to interpret the received packets to identify whether the packets are requesting a particular type of service, what that service is, and/or identifying the packets as data packets. If the processing module 204 determines, via the client software 416, that the request is for a telephone conversation via the PSTN 66, the processing module 204 evokes the cordless phone software 423. If, however, the request is for client-to-client communication, the processing module 204 evokes the client-to-client software 424. If, however, the request is for access to the Internet, the processing module 204 evokes either an email application 412 or a web browser application depending on the particular type of access being requested.

For client-to-client communications, the transceiving module 208 receives packets containing communication data. The packets will be processed by the transceiving module to remove the physical layer overhead and provide the receive packets 220 to memory controller 418. The receive packets will be stored in the memory 206. The processing module 204, via the client-to-client software 424, retrieves the client-to-client communication data from memory 206 and processes it to produce client-to-client data 236. The processing module 204 provides the client-to-client data 236 to the memory controller 418 for storage in memory 206. The transceiving module 208 causes the memory controller 418 to retrieve the client-to-client data 236 from memory 206 and provide it as client data 228. The transceiving module 208 multiplexes the client data 228 for the client-to-client communication with other services being supported for the client modules to produce multiplex client data 230. The multiplex client data also includes the physical layer overhead to identify the individual packets once received by the client modules.

If the service request is for a telephone conversation via the PSTN 66, the processing module 204 evokes the cordless phone software 423. Accordingly, as the processing module 204 retrieves receive packets 220 from memory 206, it performs the cordless phone software 423 upon the data. In essence, the cordless phone software 423 causes the multimedia server 42 to act as a base station while the client module and/or client acts as the cordless handset. The telephone functionality utilizes a dual tone multi-frequency (DTMF) signaling for keying in the numbers. The transmission rate between the multimedia server 42 and the handset may utilize traditional 900 Mhz cordless phone frequencies, 2.4 gigahertz frequencies, and/or CDMA (code division multiple access) technology.

The processing module 204, upon processing the receive packets 220, produces network data 224 which is provided to the modem interface 202. The modem interface provides the network data 224 to the PSTN 66. Accordingly, the processing module 204 includes an identifier within the network data 224 such that the modem interface 202 knows to provide it to the PSTN 66 as opposed to the modem 426.

For incoming telecommunication data, the modem interface 202 provides the data as received network packets 226 to the processing module 204. The processing module 204 while performing the cordless phone software 423 processes the receive network packets 226 to produce client data 228. The client data 228 is temporarily stored in memory 206 before being transmitted to the clients as part of the multiplex client data 230 by the transceiving module 208.

If the requested service is to access to the Internet, the packets 210-218 received by the transceiving module 208 are temporarily stored in memory 206 as received packets 220. The processing module 204 evokes either the email application 412 or the web browser application 410 depending on the particular type of Internet access requested. For web browsing access, the processing module 204 accesses the web browser application 410. For email Internet access, the processing module 204 evokes the email application 412. The email applications 412 and web browser applications 410 are known, thus no further discussion will be provided as to their functionality except to further illustrate the concepts of the present invention.

For web browser access, the processing module 204 evokes the web browsing application 410 to process the received packets 220. Such processing yields network data 224, which is provided to the modem interface 202. The modem interface provides the network data 224 as outbound modem data 234.

Responses from the Internet are received by modem 426 and provided to the modem interface 202 as inbound modem data 232. The modem interface 202 provides the inbound modem data 232 as received network packets 226 to the processing module 204, while executing the web browser application 410 produces processed packets which are stored in memory 206. The video graphics process application 420 retrieves the processed packets from memory 206, and performs its associated video graphics processing to produce client display data 422. The memory controller 418 retrieves the client display data 422 and provides it as client data 228 to transceiving module 208. The transceiving module processes the client data 228 to add physical layer overhead information and multiplexes it with other client data being processed, and transmits the multiplex client data to the client modules.

For email Internet access, the processing module 204 evokes the email application 412 to process the receive packets 220. The processing yields network data 224 that is provided to the modem 426 as outbound modem data 234 via the modem interface 202. Email responses are received by modem 426 and provided as inbound modem data 232 to the modem interface 202. The modem interface 202 provides the receive data as received network packets 226 to the processing module 204. The processing module 204 performs the email application 412 upon the received network packets 226 to yield the processed data. The processed data is stored in memory 206 and accessed by the video graphics processing application 420. The video graphics processing application 420 performs a video graphics processing function upon the processed data to produce client display data 422. The client display data 422 is subsequently retrieved by memory controller 418 and provided as client data 228 to the transceiving module 208.

When only one client is accessing the Internet, the client has exclusive access to modem 426, such that no allocation of the network connection is needed. In addition, when only one client is accessing the Internet, only one email application and/or one web browser application is open for the client. Once, however, two or more clients are accessing the Internet, the processing module evokes an email application and/or web browser application for each client. In addition, the processing module 204 may be executing multiple email applications and/or multiple web browser applications for multiple clients. When this is the case, allocation of the modem needs to be shared amongst the clients accessing the Internet. To do this, the processing module 204 evokes the modem allocation software 414.

The modem allocation software 414 allocates access to modem 426 among the plurality of clients. The modem allocation software may be based on a TDMA function, a CSMA function, token ring passing, polling function, et cetera. Accordingly, the processing module 204 provides access to the particular client based on the modem allocation software 414 such that each client has substantially equal access to the Internet.

As one of average skill in the art will appreciate, by storing the email applications 412 and web browser applications 410 within the multimedia server 42, the clients appear to have independent access to the Internet, while in actuality it is shared amongst a plurality of clients. The video graphics processing applications 420, in combination with the email applications and/or web browser applications 410, cause the data corresponding to the processing of the applications to appear as if the client device was processing the applications. As one of average skill in the art will further appreciate, if the client device includes video graphics processing, which is typically included in a personal computer, then the video graphics processing application 420 may be bypassed within the multimedia server 442. Accordingly, the processed data by the web browser application 410 or email application 412 may be packetized, without producing the client display data 422 and provided as client data 228 to the respective client device. The respective client device would then perform its own video graphics process of data to produce the display data. The overall functionality of multimedia server 42 will be described in greater detail with reference to FIGS. 57-62.

Figure 14:
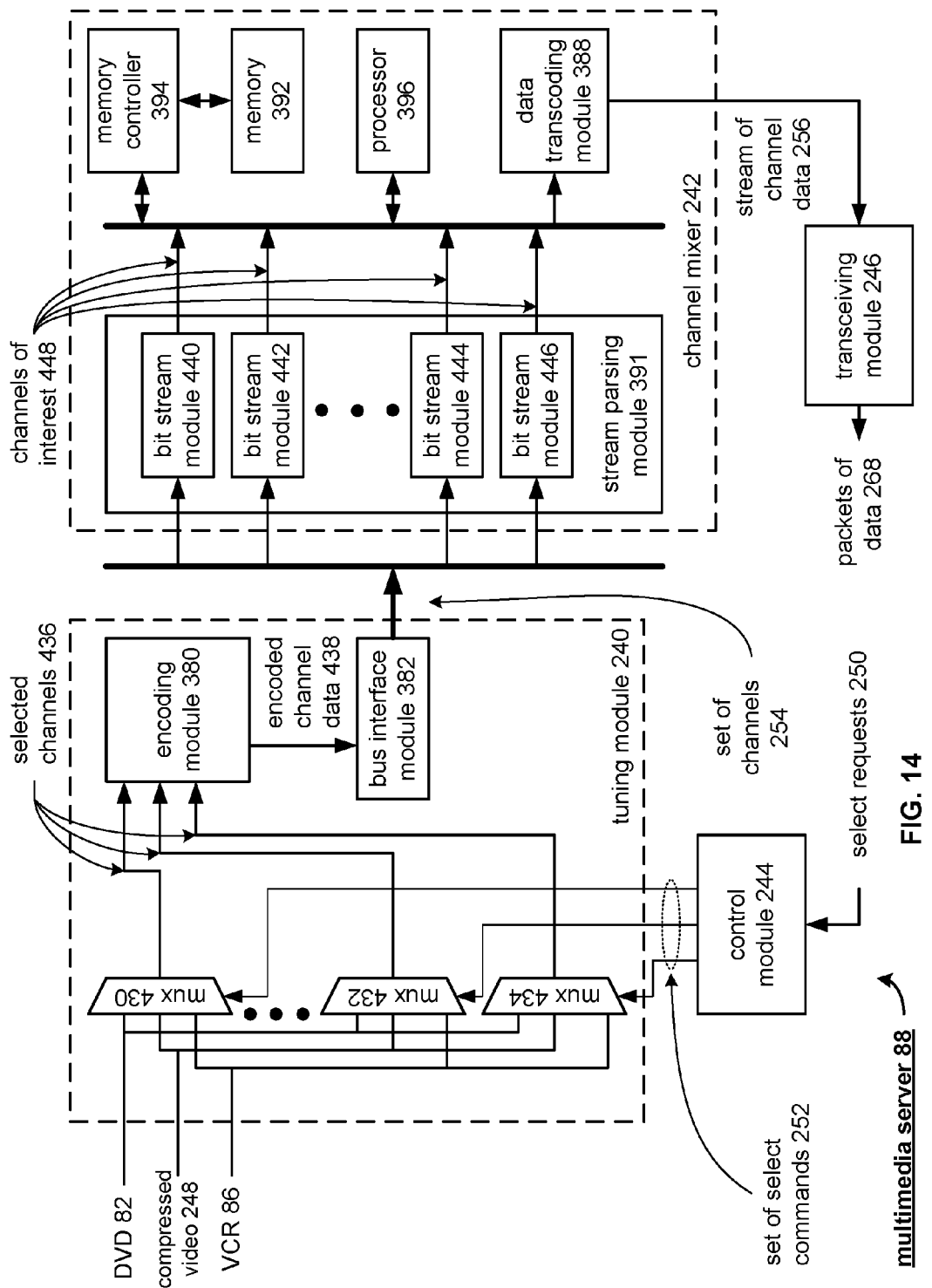
FIG. 14 illustrates a more detailed schematic block diagram of a multimedia server that may be used in the multimedia communication system of FIG. 3.

FIG. 14 illustrates a schematic block diagram of multimedia server 88 of the multimedia communication system of FIG. 3. The multimedia server 88 includes tuning module 240, channel mixer 242, transceiving module 246, and control module 244. The tuning module 240 includes a plurality of multiplexors 430-434, an encoding module 380 and a bus interface module 382. The channel mixer 242 includes at least one stream parsing module 391, memory controller 394, memory 392, processor 396 and a data transcoding module 388.

In operation, the control module 244 receives select request 250 from the client modules and produces therefrom a set of select commands 252. Each of the select commands is provided to one of the multiplexors 430-434. The multiplexors 430-434 each have its inputs coupled to single channel video sources such as a DVD player 82, VCR 86, compressed video source 248, closed circuit television, laser disk player, camcorder, et cetera. Each of the multiplexors 430-434 outputs one of the single channel multimedia sources as a selected channel 436 based on the respective select command 252.

The encoding module 380 receives the selected channels 436 from each of the multiplexors 430-434 and encodes the selected channels to produce encoded channel data 438. The encoding scheme used by encoding module 380 may be multilevel encoding, non-return to zero encoding, Manchester encoding, block encoding, nB/mB encoding where n<m. The encoded channel data 438 is provided to the channel mixer 242 as a set of channels 254 via the bus interface module 382. As one of average skill in the art will appreciate, the tuning module 240 has each of the multiplexors 430-434 processing requests from an individual client module. For example, if only one client module is accessing a single channel multimedia source, only one multiplexor is evoked to produce the selected channel. As more and more clients access single source multimedia devices, more and more multiplexors are evoked. If multiple clients are accessing the same multimedia source, such as DVD player 82, only one multiplexor is evoked wherein the processing of the selected channel for multiple clients includes the identity of the multiple clients and/or the selected channel such that each of the clients accessing the same single channel multimedia source will receive the same data.

The channel mixer 242 receives the set of channels 254 via its stream parsing module 391. In particular, each of the bit stream modules 440-446 is monitoring the bus for data related to the particular channel of interest 448 it is processing. Accordingly, each bit stream module 440-446 is processing data for a particular client module. Each bit stream module 440-446 receives the set of channels 254 and produces a respective channel of interest 448. As such, the bit stream modules 440-446 filter out the data of all other channels but the channel of interest. The data corresponding to each channel of interest 448 is stored in memory 392 via memory controller 394.

Processor 396 retrieves the data for each channel of interest 448 and converts the specific formatted video data into a generic video data. The generic video data is stored in memory 392 via memory controller 394.

The data transcoding module 388 retrieves the generic video data from memory 392 and produces therefrom a stream of channel data 256. The processing performed by the data transcoding module 388 includes converting the generic video data into specific formatted video data. The specific formatted video data comprises the stream of channel data 256.

The transceiving module 246 receives the stream of channel data 256 and produces therefrom packets of data 268. The transcoding module 246 adds the physical layer overhead of the particular data conveyance protocol used by the multimedia communication system to produce the packets of data 268.

Figure 15:
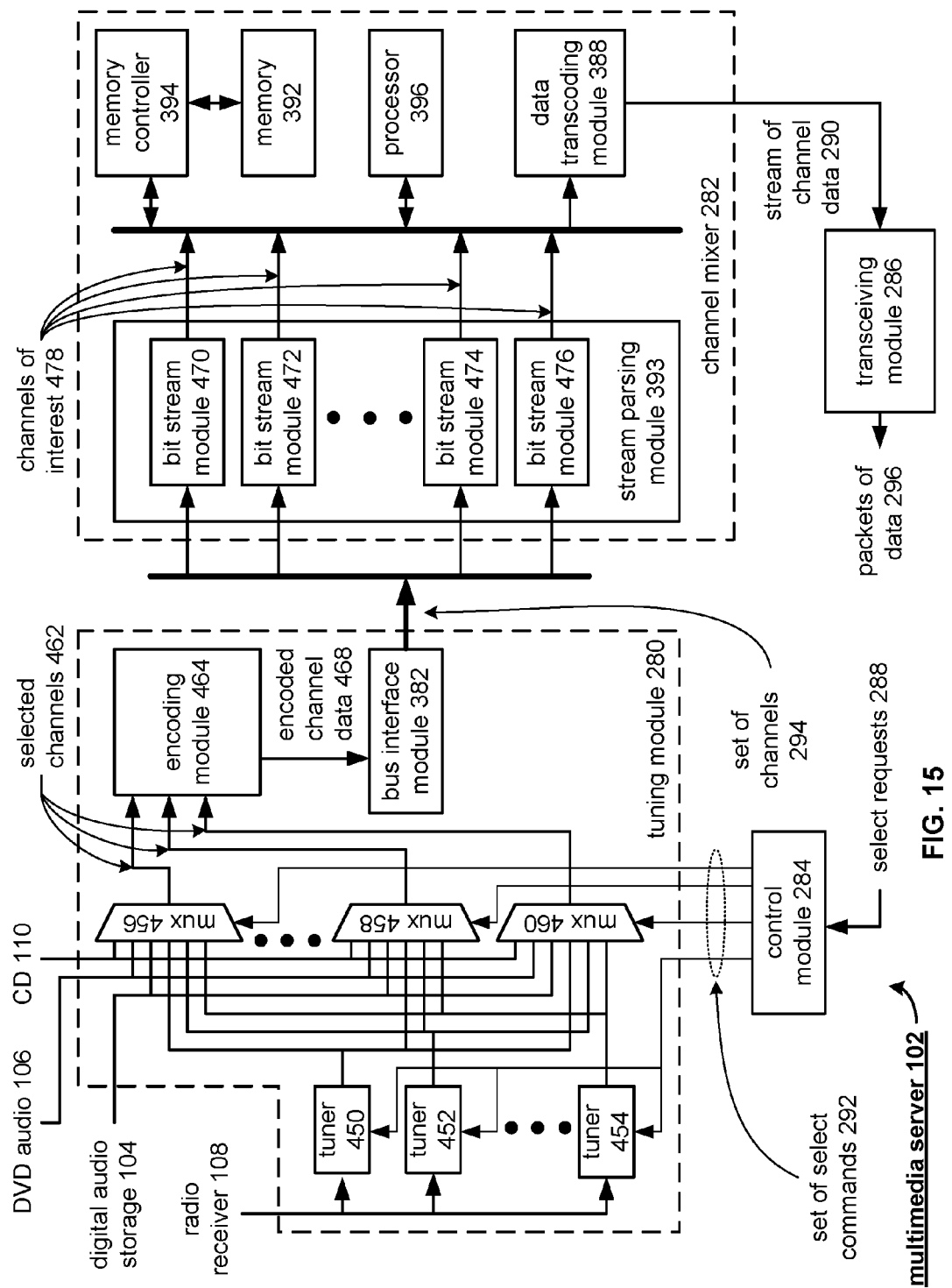
FIG. 15 illustrates a more detailed schematic block diagram of a multimedia server that may be used in the multimedia communication system of FIG. 4.

FIG. 15 illustrates a schematic block diagram of multimedia server 102 used in the multimedia communication system of FIG. 4. The multimedia server 102 includes tuning module 208, channel mixer 282, transceiving module 286, and control module 284. The tuning module 280 includes multiplexors 456-460, tuners 450-454, an encoding module 464 and a bus interface module 382. The channel mixer 282 includes at least one stream parsing module 393, memory controller 394, memory 392, processing module 396, and a data transcoding module 388.

In operation, the control module 284 receives select request 288 from a plurality of client modules. The control module 284 processes the select request 288 to produce a set of select commands 292. The select commands are provided to one or more of the plurality of tuners 450-454 and/or the plurality of multiplexors 456-460. The plurality of tuners 450-454 have a radio receiver 108 operably coupled to its inputs, where the radio receiver may be an antenna for receiving AM and/or FM radio transmissions. The tuners 450-454 are constructed of conventional circuitry to tune into a particular radio station from a plurality of radio stations. The construct of such tuners is known, as such no further discussion of the functionality or construct of the tuners 450-454 will be described except to further illustrate the present invention.

Based on the respective select command, each tuner 450-454 selects a particular channel of the radio channels received. The output of each tuner is an input for each of the multiplexors 456-460. Each of the multiplexors 456-460 also includes an input for other single audio channel multimedia sources. Such single audio channel multimedia sources include CD players 110, DVD audio players 106, digital audio storage devices 104, et cetera.

Based on the respective select commands 292, each of the multiplexors 456-460 outputs a particular selected channel 462. Accordingly, the selected channel 462 may be one of the single audio channel multimedia sources or the output of one of the plurality of tuners 450-454.

The encoding module 464 receives the selected channels 462 and encodes them to produce encoded channel data 468. The encoding performed by encoding module 464 may be one or more of multilevel encoding, non-return to zero encoding, Manchester encoding, block encoding, nB/mB encoding where n<m. The encoded channel data 468 is provided to the channel mixer 282 via the bus interface module 382.

The channel mixer 282 receives the encoded channel data 468 as a set of channels 294. The stream parsing module 393 includes a plurality of bit stream modules 470 through 476, which receive the set of channels 294 and extracts data related to a particular channel of interest 478. Accordingly, each bit stream module 470-476 is supporting a particular channel selection request of a particular client module. Each of the bit stream modules 470 filters out the data of other channels such that only the data of the channel of interest is passed. The data corresponding to the channels of interest 478 is stored in memory 392 via memory controller 394.

The processing module 396 retrieves the data corresponding to the channels of interest 478 from memory 392 and converts the specific formatted audio data into generic formatted audio data. The generic formatted audio data is stored in memory 392. Such generic formatted audio data may be PCM digitized audio, MP3 audio, MPEG audio, et cetera.

The transcoding module 388 retrieves the generic audio data from memory and converts it into a specific audio format. Such specific audio format may be MP3 audio, MPEG audio, et cetera. The data transcoding module 388 provides the specific audio formatted data of a stream of channel data 290 to the transceiving module 286. As one of average skill in the art will appreciate, the data transcoding module 388 may process the audio data from audio sources in a similar manner as it processes audio data from multimedia sources such as a DVD player, CD player, satellite connection, et cetera.

The transceiving module 286 converts the stream of channel data 290 into packets of data 296. The transceiving module utilizes the data conveyance protocol of the multimedia communication system to add physical layer overhead to the data of the stream of channel data 290 to produce packets. The packets are then conveyed to the plurality of client modules.

Figure 16:
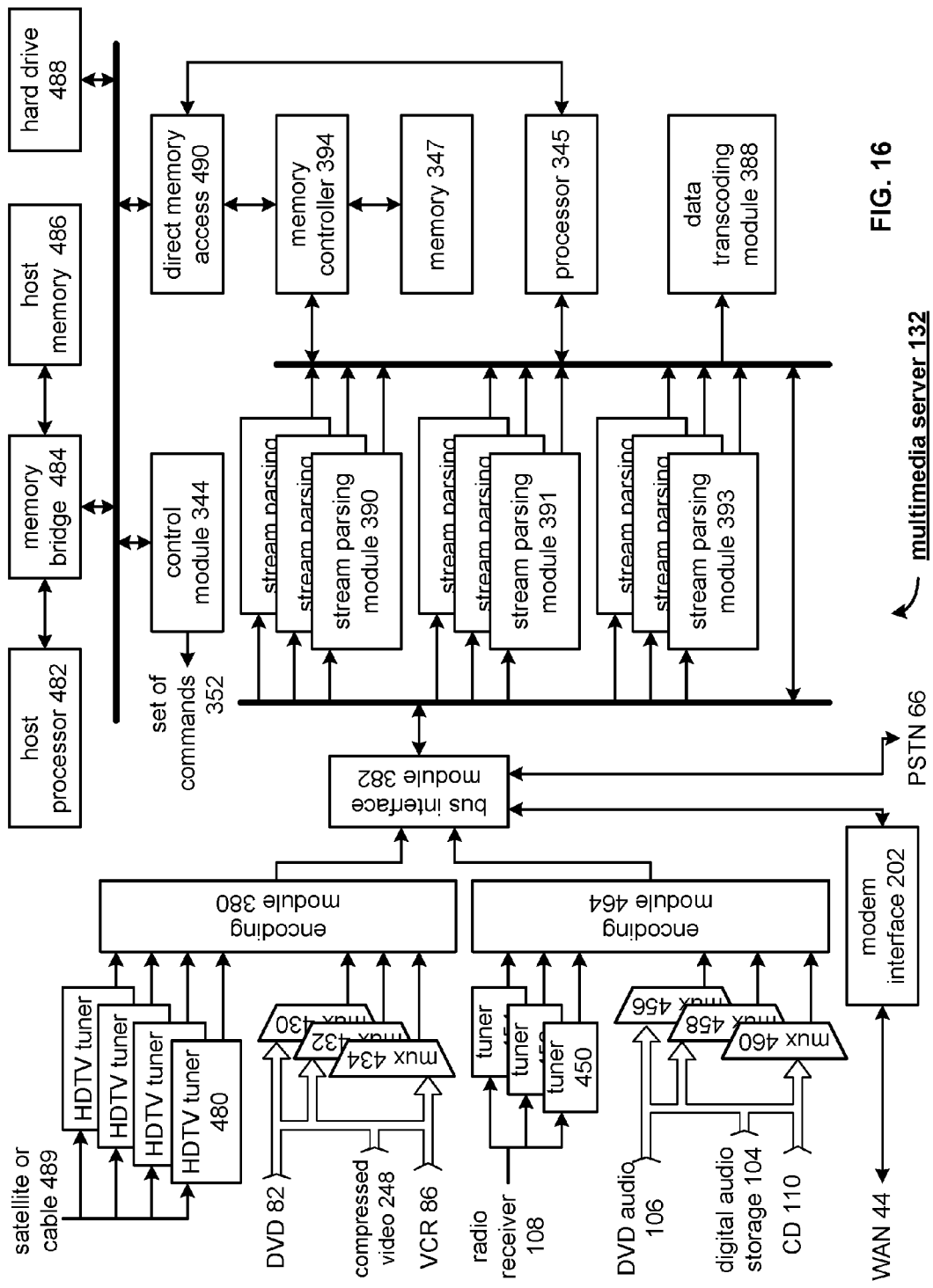
FIG. 16 illustrates a more detailed schematic block diagram of a multimedia server that may be used in the multimedia communication system of FIG. 5.

FIG. 16 illustrates a schematic block diagram of multimedia server 132 that may be used in the multimedia communication system of FIG. 5. The multimedia server 132 includes the transceiving module 346 (not shown), the control module 344, the tuning module 340, the channel mixer 342, the processing module 345, and memory 347. The tuning module 340 includes a plurality of HDTV tuners 480, a plurality of multiplexors 430-434, a plurality of audio tuners 450-454, a second plurality of multiplexors 456-458, a modem interface 202, an audio encoding module 464, a video/audio encoding module 380, and a bus interface module 382.

The channel mixer 342 includes a first plurality of stream parsing modules 391, a second plurality of stream parsing modules 390, a third plurality of stream parsing modules 393, and a data transcoding module 388. The multimedia server 132 may further include, or be operably coupled to, components within the host device. The host device may be a satellite receiver, cable box, set-top box, home theatre receiver, HDTV tuner, et cetera. The host device includes a host processor 482, a memory bridge 484, host memory 486, and a hard drive 488. To interface with the host components, the multimedia server 132 further comprises a direct memory access (DMA) device 490.

In this configuration, the control module 344 receives selection request via the host bus and produces therefrom a set of commands 352. The set of commands are provided to individual ones of the HDTV tuners 480, the multiplexors 430-434, the audio tuners 450-454, multiplexors 456-460, and/or the modem interface. As such, each of the elements of the tuning module will respond to an individual selection command accordingly.

If an HDTV tuner 480 receives a select command 352, it selects a particular channel from a satellite or cable source 489. The selected channel is provided to the encoding module 380. If one of the multiplexors 430-434 receives a select command, it outputs one of the single channel multimedia video sources such as a DVD player 82, compress video 248, VCR 86. The output of the multiplexor 430-434 is provided to encoding module 380. The encoding module 380 converts the audio and video data of the single channel into encoded data as previously discussed.

If one of the audio tuners 450-454 receives a select command, it selects a particular radio channel from a plurality of radio channels of radio receiver 108. The output of the tuner is provided to encoding module 464. If one of the multiplexors 456-460 receives a select command, it provides its output to the encoding module 464. As shown, the inputs to the multiplexors 456-460 include DVD audio 106, digital audio storage 104 and CD 110. The encoding module 464 encodes the received audio data of a selected channel as previously discussed.

The outputs of encoding module 380 and 464 are provided to the bus interface module 382. The bus interface module provides the encoded data to the channel mixing circuit. In addition, the bus interface module 382 is operably coupled to the modem interface 202 and to the public switch telephone network 66. The modem interface and PSTN connection provide the multimedia server 132 the ability to service clients as previously described with reference to FIGS. 2, 7 and 13.

The stream parsing modules 390, 391 and 393 receive the encoded channel data and filter the encoded channel data down to a particular channel of interest. The data corresponding to the particular channel of interest is stored in memory 347 via memory controller 394. The processing module 345 retrieves the data of the channels of interest from memory 347 and converts the data into generic audio data and/or generic video data. The generic audio and/or video data is stored in memory 347.

The data transcoding module 388 retrieves the generic audio and/or video data from memory 347 and converts it into a specific audio format, which is then provided as a stream of data to the transceiving module 346 for conveyance to the plurality of clients.

The hard drive 488 may store the digital audio, which is provided as digital audio storage 104. Accordingly, the digital audio may be stored in an MP3 format, PCM audio, and/or any means for digitizing for storing digital audio signals. In addition, the hard drive 488 may function as a digital VCR such that any of the channels of the multimedia sources may be stored in hard drive 488 and subsequently played back. Accordingly, host memory 486 would include the appropriate software to enable host processor 482 to retrieve the data from hard drive 488 as a digital VCR.

Figure 17:
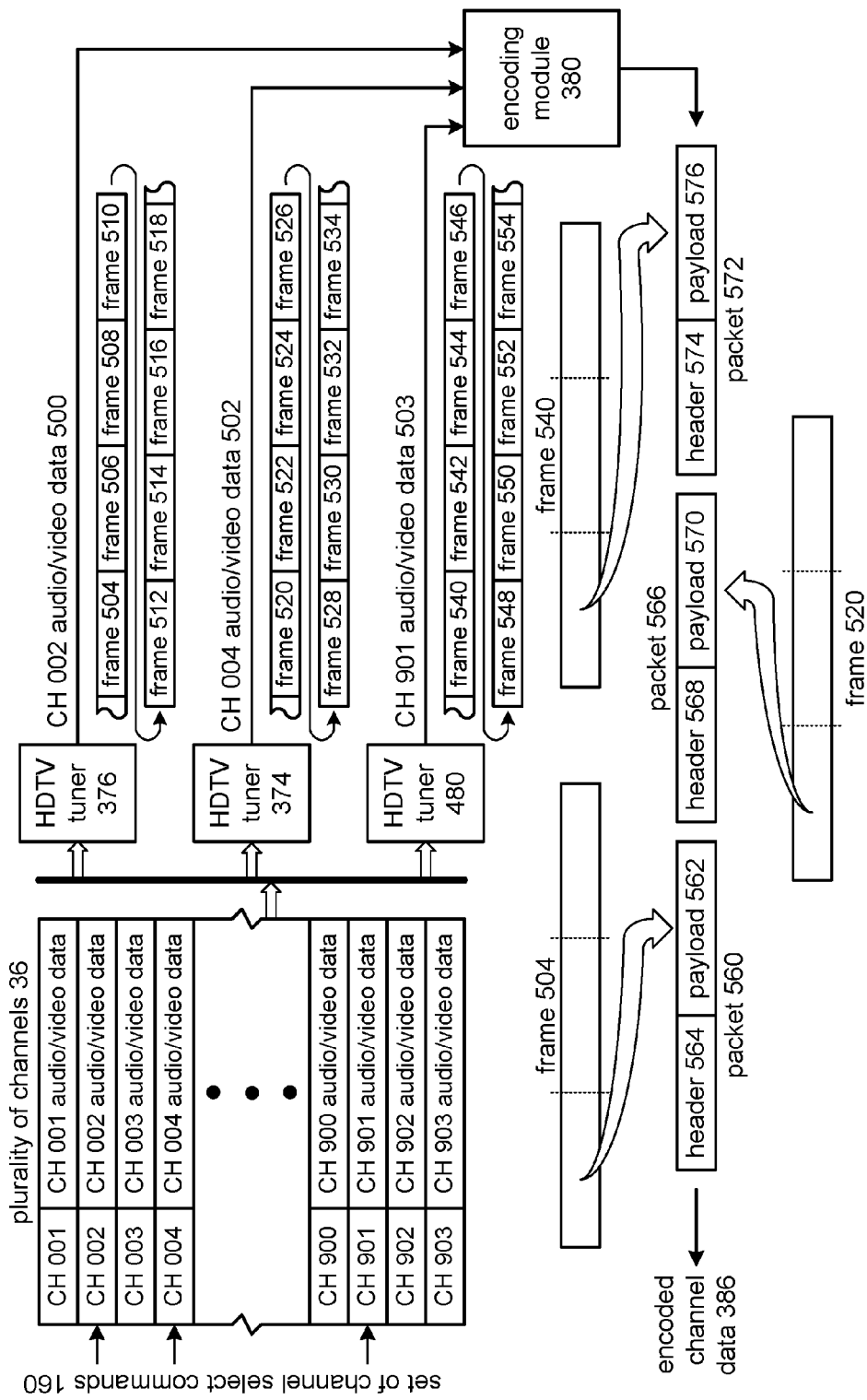
FIG. 17 illustrates a functional diagram of a tuning module that may be incorporated in a multimedia server in accordance with the present invention.

FIG. 17 illustrates a functional diagram of a tuning module, which may be used in any of the multimedia servers as described in the previous figures. While the functional diagram of FIG. 17 relates to processing data utilizing an HDTV tuner, the principles are common for processing data from any multi-channel multimedia source. For example, the plurality of channels 36 shown in FIG. 17 may correspond to channels received by a satellite connection, cable connection, NTSC connection, PAL connection, broadcast connection, radio receiver connection, et cetera.

As shown in FIG. 17, a plurality of channels 36 includes a channel identifier and the corresponding audio and/or video data. In this illustration, channel 001 includes channel 001 audio and video data, channel 002 includes channel 002 audio and video data, et cetera. As also illustrated, channel 002, channel 004 and channel 901 have been selected by different clients to be viewed. Accordingly, the set of channel selection commands 160 identifies these particular channels.

HDTV tuners 376, 374 and 480 each process one of the channel select commands. As shown, HDTV tuner 376 is processing the channel select command for channel 002, HDTV tuner 374 is processing the channel select command for channel 004 and HDTV tuner 480 is processing the channel select command for channel 901. As shown, each HDTV tuner 376 receives all of the plurality of channels 36. The output of each HDTV tuner 376 is of its corresponding selected channel. As shown, HDTV tuner 376 is outputting audio and video data 500 for channel 002, HDTV tuner 374 is outputting audio and video data 502 for channel 004 and HDTV tuner 480 is outputting audio and video data 503 for channel 901.

The audio/video data 500 for channel 002 includes a plurality of frames 504-518. Each frame may correspond to an I frame, a B frame, and/or a P frame of MPEG video data. The audio/video data 500 of channel 002 is provided to encoding module 380. Similarly, audio/video data 502 of channel 004 includes a plurality of frames 520-534 and audio/video data 503 of channel 901 includes a plurality of frames 540-554.

The encoding module 380 encodes the audio/video data 500, 502 and 503 of the respective channels. The resulting data is encoded channel data 386, which includes a plurality of packets 560, 566, and 572. As one of average skill in the art will appreciate, the packets 560, 566 and 572 may also be frames depending on the data conveyance protocol used within the multimedia communication system. For packet based transmission, which is illustrated in FIG. 17, the encoding module 380 packetizes data from each of the selected channels (for this example, channel 002, 004 and 901) in a round-robin fashion. As one of average skill in the art will appreciate, other schemes may be used to determine which data of a particular channel of interest will be processed and in what order. For example, one channel may have priority over another, which may be the case for real time transmissions versus non-real time data transmissions.

In this illustration, packet 560 includes a header portion 564 and a data payload 562. The header section 564 may include identity of the selected channel, type of data of the selected channel, identity of the multimedia source, an indication as to whether the data is encrypted or not, an indication of the type of encryption, an indication as to whether the data is compressed or not, an indication of the type of compression, and/or a packet sequence number. Accordingly, the header information 564 includes all the necessary information for the client modules to accurately retrieve the data contained in payload 562. As shown, a first portion of frame 504 of the audio/video data 500 for channel 002 is included in payload 562.

Packet 566 includes header information 568 and a payload 570. The header information 568 includes similar information as header 564 but directed towards data related to audio/video data 502. The payload section 570 carries data from a first portion of frame 520 of audio/video data 502. Packet 572 includes header 574 and payload 576. The header 574 includes similar header information as 564 but directed towards the audio/video data 503. The payload 576 includes a portion of frame 540.

The next three packets encoded by encoding module 380 will be for the second portion of each of frames 504, 520 and 540. The encoding module will continue to packetize portions of frames 504, 520 and 540 until the entire frame has been conveyed. Once the entire frame has been conveyed, the encoding module 380 encodes sections of the next frame in the sequence of the audio/video data 500, 502 and 503. The encoded channel data 386 is then conveyed as packets utilizing carrier sense multiple access (CSMA), CSMA with collision avoidance, and/or CSMA with collision detection.

While FIG. 17 is illustrated with respect to packetizing the encoded channel data 386, one of average skill in the art will appreciate that the encoding module 380 may utilize a TDMA concept wherein the encoded channel data 386 is prepared as frames. Accordingly, packets 560, 566 and 572 will be replaced by frames where each frame includes a header section and a data section. The header section includes one or more of the identity of the selected channel, the type of data of the selected channel, the identity of the multimedia source, an indication as to whether encryption is enabled or disabled, the type of encryption used, an indication as to whether compression is enabled or disabled, an indication of the type of compression, and a frame number. As such, the header information and the timing of the frames includes sufficient information such that the client modules may accurately retrieve the data contained in the respective data sections or payloads.

The encoded channel data 386 is then conveyed in frames in accordance with time division multiplexing, and/or frequency division multiplexing.

Figure 18:
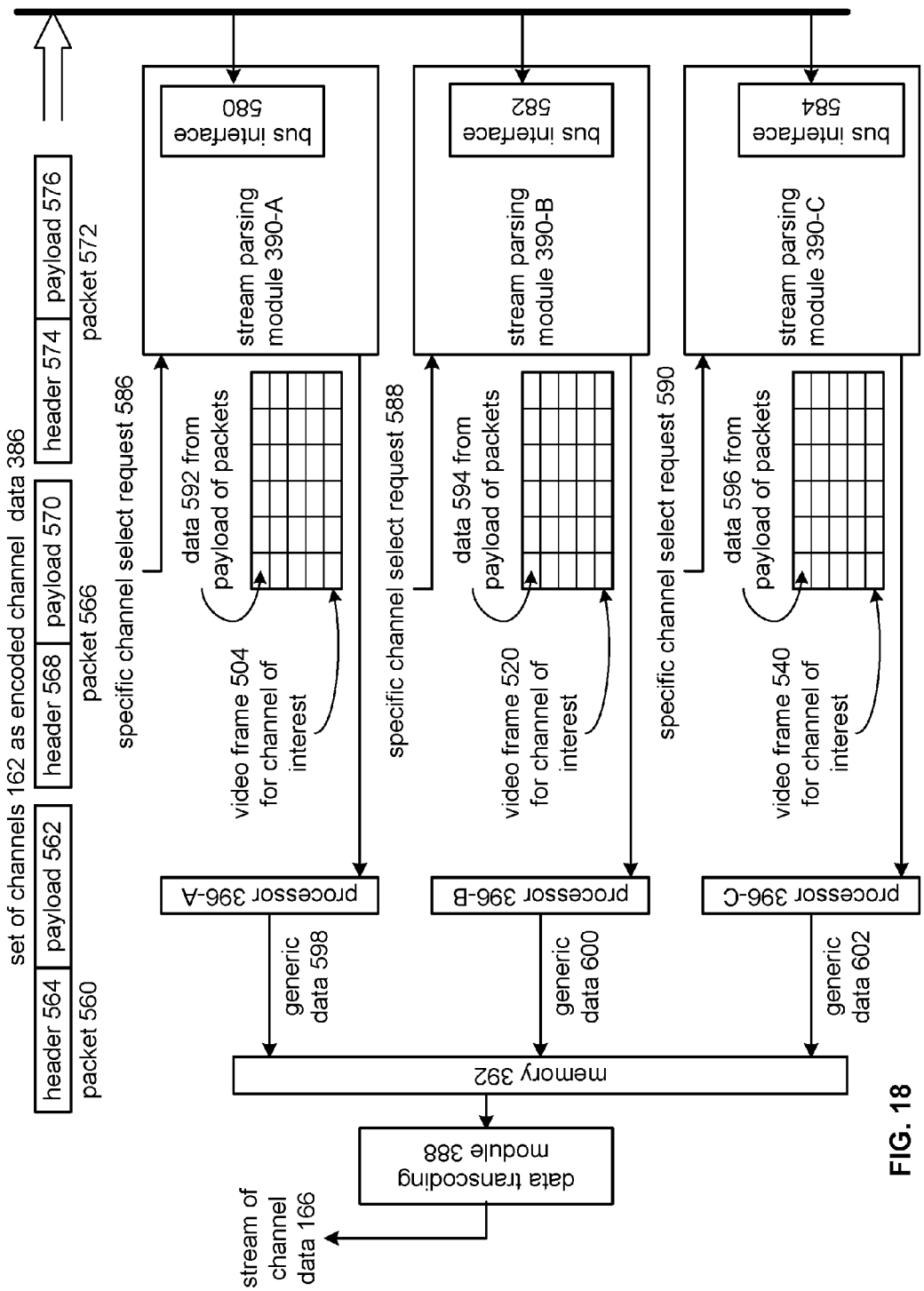
FIG. 18 illustrates a functional diagram of a channel mixer that may be incorporated in a multimedia server in accordance with the present invention.

FIG. 18 illustrates a functional diagram of the channel mixer that may be used in any one of the multimedia servers of FIGS. 1-11. As shown, a set of channels 162 is received as encoded channel data 386. The encoded channel data 386 includes a plurality of packets 560, 566 and 572. Each packet 560, 566 and 572 includes a header section 564, 568, 574 and a payload section 562, 570 and 576, respectively.

The channel mixer includes a plurality of stream parsing modules 390-A, 390-B and 390-C operably coupled to respective bus interfaces 580-584. The respective bus interfaces 580-584 are receiving each of the plurality of packets and reading the header section. When the bus interface module 580-584 detects that the particular packet relates to the specific channel select request 586, 588 or 590, the bus interface provides the payload section and a portion of the header section to the remaining circuitry of the stream parsing module 390-A, 390-B and/or 390-C.

Each of the stream parsing modules 390A, B and C are extracting data 592, 594 and 596 from the payload of packets corresponding to the specific channel select request 586, 588 and 590. The data 592, 594 and 596 is stored in memory 392 until the entire video frame 504, 520 and/or 540 is stored.

Once each of the video frames 504, 520 and 540 is stored, processor 396-A, B and/or C retrieves the respective data of the corresponding video frame 504, 520 or 540 from memory and converts it into generic data 598, 600, 602. The generic data is stored in memory 392. The data transcoding module 388 retrieves the generic data 598, 600, 602 from memory 392 and converts it into a specific video and/or audio data format and conveys the converted data as a stream of channel data 166 to the plurality of clients.

As one of average skill in the art will appreciate, the processors 396-A, B and C may process the data of the video frames 504, 520 and 540 as the data 592, 594 and 596 is being stored in memory. In other words, the processors do not have to wait until the entire video frame is stored to begin converting the data into the generic data 598, 600 and 602.

While FIG. 18 is illustrated with respect to receiving packets of encoded channel data 386, one of average skill in the art will appreciate that the packets may be frames of data. Accordingly, the bus interface modules 580-584 would monitor the bus for frames of data to be processed by the respective stream parsing modules 390-A, B or C. The determination of the particular frames to retrieve is based on the specific channel select request 586, 588 or 590. Accordingly, any data related to the specific channel select request 586, 588, 590 is obtained by the corresponding stream parsing module 390A, B or C and converted into data 592, 594 or 596.

Figure 19:
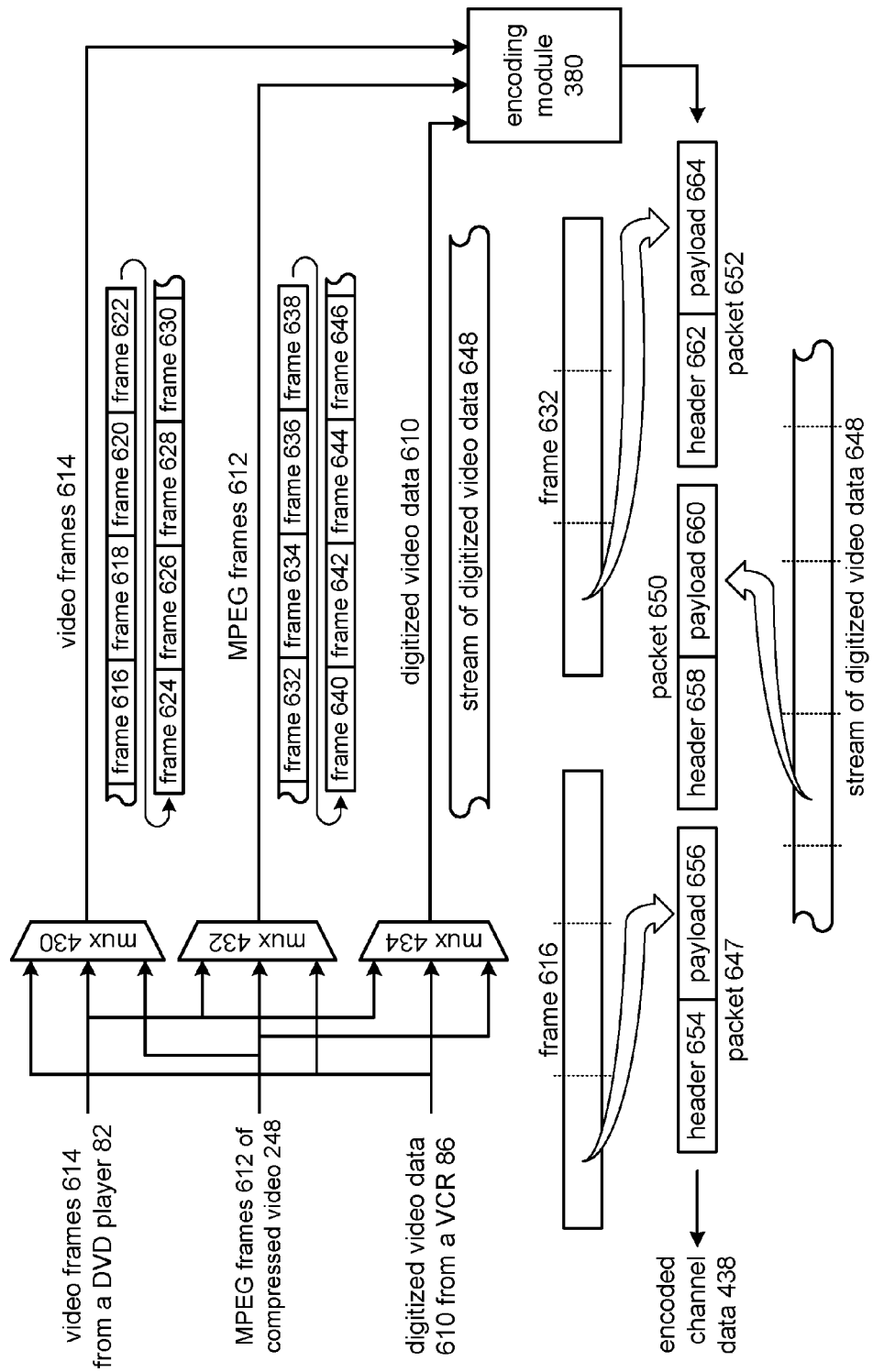
FIG. 19 illustrates an alternate functional diagram of a tuning module that may be incorporated in a multimedia server in accordance with the present invention.

FIG. 19 illustrates a functional diagram of the tuning module of any of the multimedia servers of FIGS. 1-11 processing single video channel multimedia sources. As shown, multiplexors 430-434 are operably coupled to receive video data from a plurality of single channel multimedia sources. Such single channel multimedia sources include DVD players, compressed video storage devices, VCRs, camcorders, etc. As shown, video frames 614 from a DVD player 82 are provided to each of the multiplexors 430-434 as well as MPEG frames 612 of compressed video 248 and digitized video data 610 from a VCR 86. Each of the multiplexors 430-434 is processing a separate channel selection request. As illustrated, multiplexor 430 is processing a channel select request for providing video frames 614 related to the DVD player 82, multiplexor 432 is processing MPEG frame 612 from a compressed video source 248, and multiplexor 434 is processing the digitized video data 610 from a VCR 86.

As shown, the video frame 614 includes a plurality of frames 616-630. The MPEG frame 612 include a plurality of frames 632-646, while the digitized video data 610 includes a stream of digitized video data 648.

The encoding module 380 receives the video frame 614, the MPEG frame 612, and the digitized video data 610 and encodes the data of these sources to produce the encoded channel data 438. This may be done in a packetized manner wherein packets 647, 650 and 652 are generated to include a header section 654, 658 and 662 and a payload section 656, 660 and 664, respectively.

The encoding module 380 encodes a portion of frame 616 into the payload 656 of packet 647. Similarly, the encoding module 380 encodes a portion of the digitized video data 648 into the payload 660 of packet 650. The encoding module 380 also encodes a portion of frame 632 of MPEG frame 612 into payload 664 of packet 652. The header sections 654, 658 and 662 include header information as previously described with reference to FIG. 17 to enable the client modules to accurately retrieve the corresponding data.

While FIG. 19 is illustrated with respect to transmitting the encoded channel data 348 as packets 647, 650 and 652 utilizing a CSMA type physical layer transmission, the packets 647, 650 and 652 may be frames of data that are transmitted utilizing TDMA and/or FDMA physical layer data conveyance techniques. As such, the encoded channel data 438 may include a plurality of packets where each packet includes a portion of one of the video data from one of the plurality of multimedia sources and/or frames of data from one of the plurality of multimedia sources.

FIG. 20 illustrates a schematic block diagram of the multimedia communication system of FIGS. 1-5 wherein the communication path 192 is a wire line connection 670. As shown, the tuning module 150, 240, 280 and/or 340 of the multimedia server receives audio/video source inputs 674. The audio/video source input 674 may be from one or any of the multimedia sources described in any of the preceding drawings. The tuning module selects the particular channels from the audio/video sources based on select commands received from control module 156, 244, 284 and/or 344.

The control module generates the select commands based on select request received via the transceiving module 154, 208, 246, 286 and/or 346. The channel mixer 152, 242, 282 and/or 340 receives the output of the tuning module and generates therefrom data for one or more of the client modules.

The multimedia server also includes processing module 204 and/or 345 to process communication via telecom sources 676. The telecom sources include Internet connection, PSTN connection and/or client-to-client communications.

The transceiving module 154, 208, 246, 286 and/or 346 includes a router 672. The router provides the connectivity to each of the client modules 14-22, 46-54, 90-98, 112-120 and/or 134-142. The construct and functionality of a router, such as router 672, is known, thus no further discussion will be presented except to further illustrate the concepts of the present invention.

With the communication path 192 being a wire line connection, the stream of channel data and the select request are transceived utilizing a type of transceiving. The type of transceiving may be time division multiplexing, frequency division multiplexing, pulse code modulation, amplitude shift keying, phase shift keying, quadrature phase shift keying, quadrature amplitude modulation, carrier sense multiple access (CSMA), CSMA with collision avoidance and/or CSMA with collision detection. Accordingly, such a wire line connection 670 transmits and receives data over the same twisted pair, coaxial cable, in-home network, telephone lines, et cetera.

Alternatively, the wire line connection 670 may include a transmit wire line connection and a receive wire line connection. The stream of channel data is transmitted via the transmit wire line connection using a type of transmission. The type of transmission includes time division multiplexing (TDM), frequency division multiplexing (FDM), pulse code modulation (PCM), amplitude shift keying (ASK), phase shift keying (PSK), quadrature phase shift keying (QPSK), quadrature amplitude modulation (QAM), carrier sense multiple access (CSMA), CSMA with collision avoidance (CA), and/or CSMA with collision detection (CD). The received wire line communication path may be utilized to receive the channel selects from the client modules. The receive wire line connection uses a type of reception that may be TDM, FDM, PCM, ASK, PSK, QPSK, QUM, CSMA, CSMA with CA and CSMA with CD.

Alternatively, if the multimedia communication system is supporting Internet connections, the transmit wire line connection and receive wire line connections are conveying data related to the telecom sources 676. Such data includes packets destined for the Internet, received packets from the Internet, telecommunication data destined for the PSTN, data received from the PSTN, and/or client-to-client communication data.

As shown, the router 672 is operably coupled to the channel mixer, the tuning module and to the control module. The router is also operably coupled to at least one of the client modules. With such a configuration, the control module causes the stream of channel data from the channel mixer to be formatted based on the type of transceiving to produce formatted channel data. The router provides the formatted channel data to the client modules via the wire line connection. The particular type of formatting used by the channel mixer is based on the type of transceiving, which was previously described. In addition, the selection request received by the client modules will be formatted in accordance with the type of transceiving such that when the router receives it, the router appropriately de-formats the data to recapture the particular selection request. The same applies whether the wire line connection 670 is a single path that transceives data or includes a receive and a transmit path.

FIG. 21 illustrates a schematic block diagram of the components of a multimedia server being operably coupled to client modules via a communication path that is a radio frequency (RF) communication path 680. To facilitate the communications via the RF communications via the RF communication path 680, the transceiving module 154, 208, 246, 286 and/or 346 of the multimedia server includes an RF transceiving switch 678. Similarly, each of the client modules would include an RF transceiving switch, an RF receiver, and/or and RF transmitter. The particular radio frequencies use would be dictated by governmental agencies, such as the Federal Communications Commission (FCC). Typically, such in-home frequencies range from the hundreds of megahertz to single digit gigahertz frequency ranges. One particular type of RF in-home application may be dictated by ITC specification 802.11a. The 802.11a specification provides the operating parameters for using radio frequencies for transceiving data within homes and/or over short distances.

The RF communication path 680 may utilize a single frequency to transceive data between the multimedia server and the clients, may include a separate frequency for transmitting data and a separate frequency for receiving data, may include a plurality of frequencies for transceiving data, may include a plurality of frequencies for receiving data and a separate plurality of frequencies for transmitting data.

As shown, the RF transceiving switch 678 is operably coupled to the processing module 204 and/or 345, the control module 156, 244, 284 and/or 344, the tuning module 150, 240, 280 and/or 340, and the channel mixer 152, 242, 282 and/or 342. As configured, the control module causes the stream of channel data, which is conveyed via the RF communication path 680 to the client modules, to be formatted based on the type of transceiving used. The type of transceiving may be time division multiplexing (TDM), frequency division multiplexing (FDM), pulse code modulation (PCM), amplitude shift keying (ASK), phase shift keying (PSK), quadrature phase shift keying (QPSK), quadrature amplitude modulation (QAM), carrier sense multiple access (CSMA), CSMA with collision avoidance (CA) and CSMA with collision detection (CD).

The RF transceiving switch provides the formatted channel data to the clients during transmitting intervals via the radio frequency path 680. The transmission and receiving intervals will be described in greater detail with reference to FIG. 26.

The client module receives the formatted data via the RF path then processes it as previously discussed and will be subsequently discussed in greater detail with reference to FIGS. 50-56. In addition, the client module formats the selection request based on the type of transceiving and then provides the formatted selection request to the transceiving module via the RF communication path 680. The RF transceiving switch 678 receives the selection request and provides them to the control module. The control module processes the selection request as previously described and will be subsequently described in greater detail with reference to FIGS. 24-28.

Figure 22:
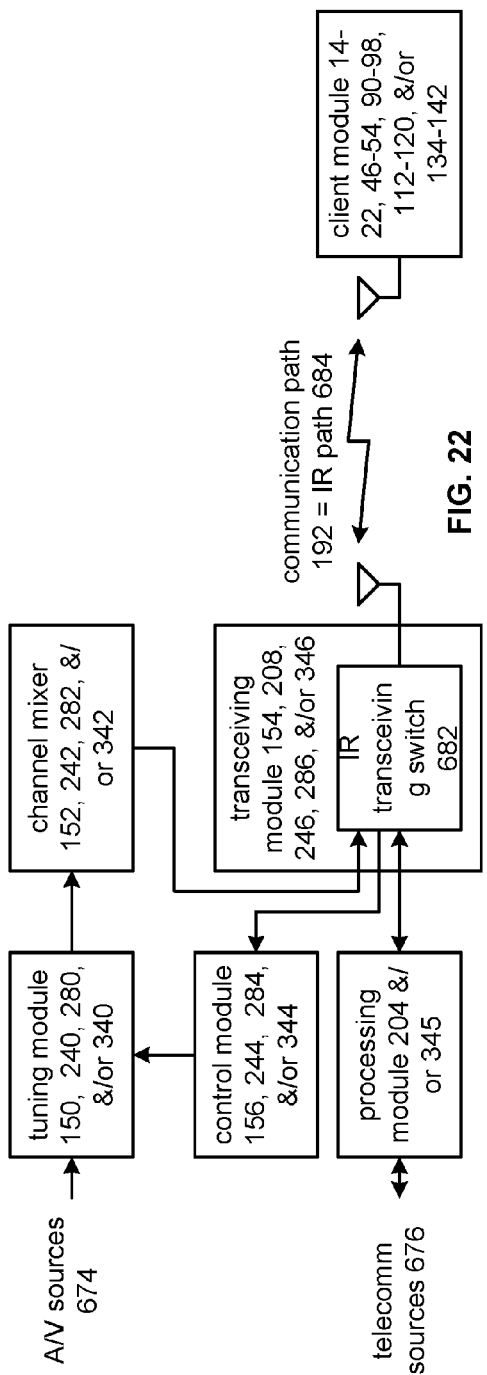
FIG. 22 illustrates a schematic block diagram of a multimedia server operably coupled to one or more client modules via an infrared communication path in accordance with the present invention.

FIG. 22 illustrates a schematic block diagram of a multimedia communication system that has the components of a multimedia server operably coupled via an infrared communication path 684 to a plurality of client modules. In this embodiment, the transceiving module 154, 208, 246, 286 and/or 346 includes an infrared transceiving switch 682. Similarly, each of the client modules would include a similar IR transceiving switch. In this embodiment, data is transmitted between the multimedia server and client modules via a single IR communication path 684. As such, the IR communication path is divided into transmit portions (i.e., from the multimedia server) to the client modules, and receive portions (i.e., from the client to the server). Alternatively, the IR path may include a transmit IR path and a receive IR path.

As shown, the IR transceiving switch 682 is operably coupled to the processing module, the control module, the tuning module and the channel mixer. As configured, the control module causes the stream of channel data, which is transmitted via the IR communication path 684 from the transceiving module to the client module, to be formatted based on the type of transceiving. As previously mentioned, the type of transceiving includes TDM, FDM, PCM, ASK, PSK, QPSK, QAM, CSMA, CSMA with CA, and CSMA with CD. The particular data contained in the stream of channel data is based on selection request received from the client module.

The client module formats the selection request in accordance with the type of transceiving and conveys the formatted selection requests during reception intervals via the IR communication path 684 or transmits them via a separate receive IR path. The transceiving module, upon receiving the selection request, provides the selection request to the control module, which provides commands to the tuning module, which selects the appropriate channels from the AV sources 674 based on the commands.

As one of average skill in the art will appreciate, the communication path 192 between the multimedia server and the plurality of clients may include one or more of the wire line communication path 670 of FIG. 20, the RF communication path 680 of FIG. 21 and the IR communication path 684 of FIG. 22. For example, the transceiving path between each of the client modules may utilize the RF communication path while the receiving path may be an IR path. As a further example, the client modules within the same physical location as the server may be operably coupled via a wire line communication path while other client modules in different locations within a home utilize an RF communication path. Thus, a variety of communication path combinations may be utilized within the same multimedia communication system to provide the multimedia communication services.

Figure 23:
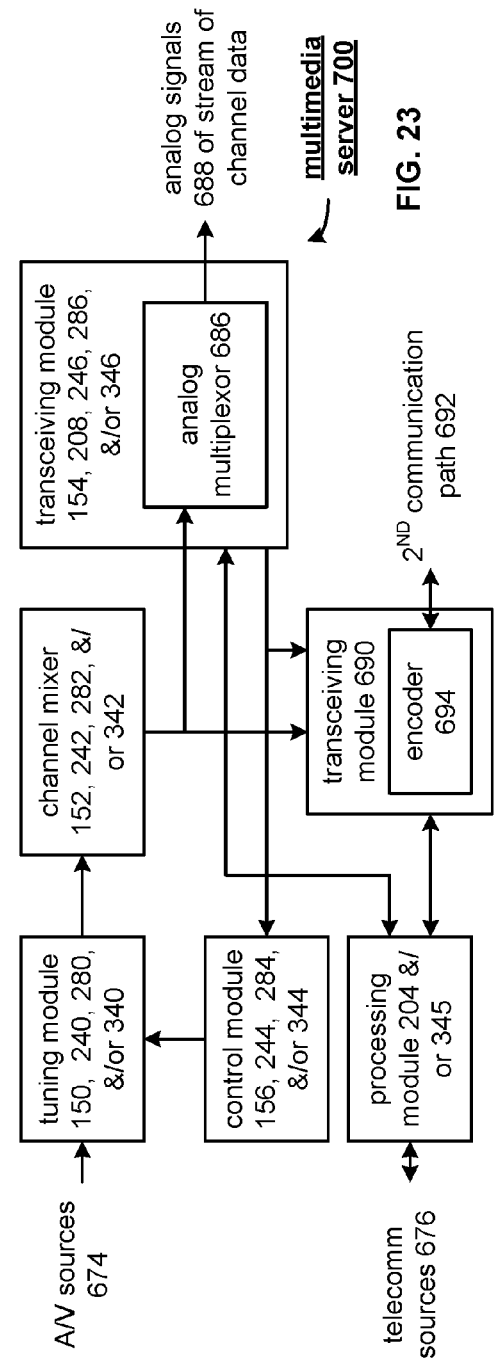
FIG. 23 illustrates a schematic block diagram of an alternate multimedia server in accordance with the present invention.

FIG. 23 illustrates a schematic block diagram of a multimedia server 700 that includes the tuning module 150, 240, 280 and/or 340, the channel mixer 152, 242, 282 and/or 340, the control module 156, 240, 284 and/or 344, the transceiving module 154, 208, 246, 286 and/or 346, the processing module 204 and/or 345, and a second transceiving module 690. The transceiving module 154, 208, 246, 286 and/or 346 includes an analog multiplexor 686. In addition to performing the functions as previously described with reference to the transceiving module, the analog multiplexor 686 converts the stream of channel data into analog signals 688 representing the stream of channel data. Accordingly, the analog multiplexor 686 may be utilized to interface with client modules coupled to legacy-type analog client devices.

The second transceiving module 690 includes encoder 694 and enables the multimedia server to communicate with at least some of the client modules via a second communication path 692. The second communication path 692 may be a wire line connection, RF connection and/or infrared connection. The data transmitted over the second communication path may be identical to the stream of channel data transmitted by transceiving module 154, 208, 246, 286 and/or 346, or separate data. As such, the multimedia server 700 may service multiple sets of client modules from the same grouping of audio and/or video sources 674.

The control module 156, 244, 284 and/or 344 includes processing means for determining client access privileges for each of the plurality of clients. Such access privileges include parental control features, time of access, quantity of access, et cetera. As such, the control module determines for each client selection request whether the request is valid before providing a selection command to the tuning module. Such a feature gives the operator of the multimedia communication system control over which A/V resources 674 each client module may access, the amount of access per day, and/or the time of access.

Figure 24:
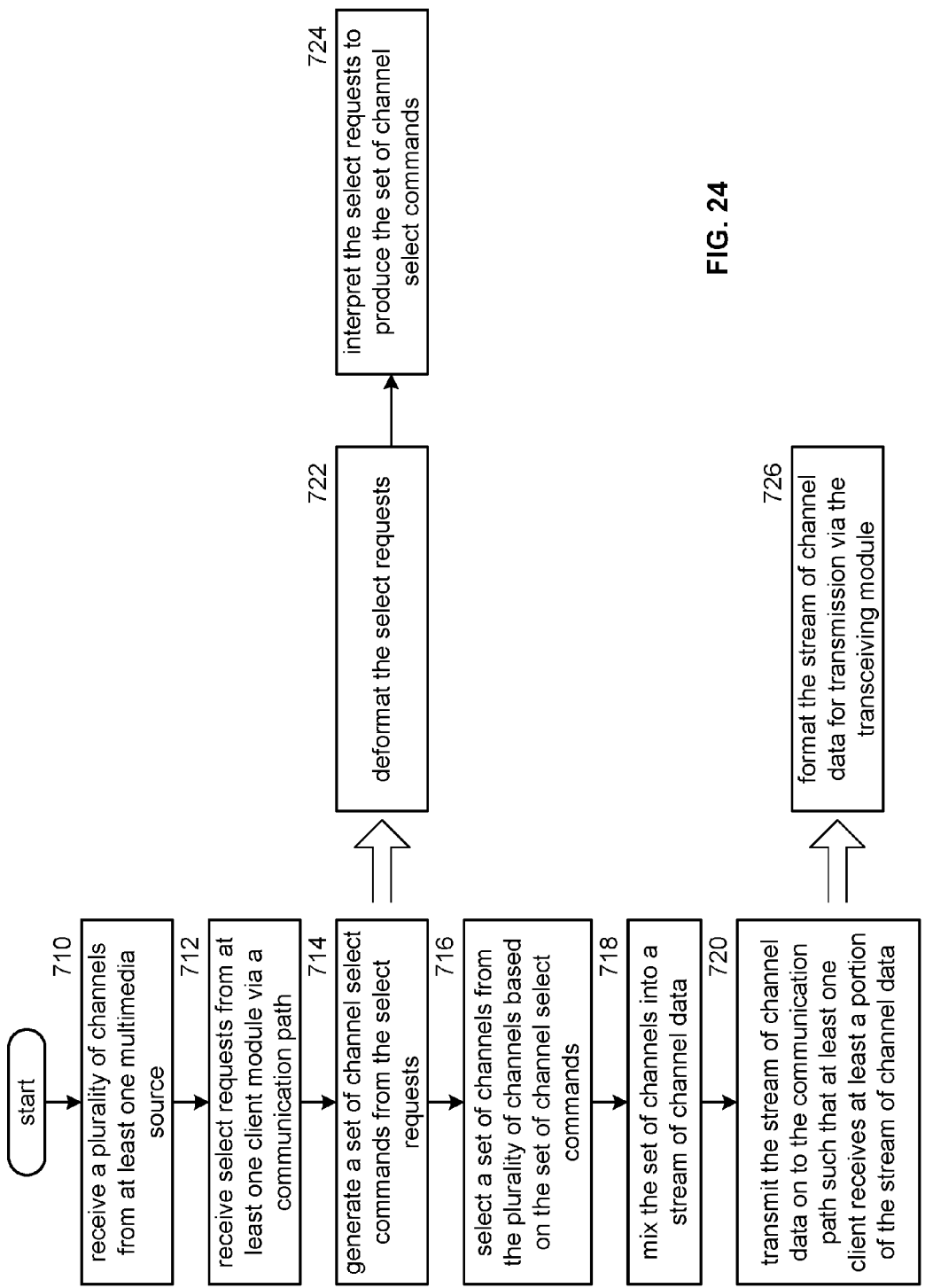
FIG. 24 illustrates a logic diagram of a method for data conveyance within a multimedia communication system in accordance with the present invention.

FIG. 24 illustrates a logic diagram of a method for providing multimedia services to a local area network. The method may be performed by any one of the multimedia servers illustrated and described in the previous figures. Accordingly, the operational steps illustrated in FIG. 24 may be performed by multimedia server 12, 42, 88, 102, 132 and/or 700.

The processing begins when a plurality of channels are received from at least one multimedia source at step 710. The multimedia source may be a satellite connection, cable connection, NTSC antenna connection, PAL antenna connection, HDTV connection, SDTV connection, radio connection, et cetera. In addition, the plurality of channels may be from a plurality of single channel sources including a DVD player, VCR, closed circuit television, laser disk player, camcorder, digital audio storage device (e.g., MP3 player), DVD audio player, CD player, et cetera. The plurality of channels are continuously received but not processed until one or more client modules select one or more channels.

The process proceeds to Step 712 where a select request is received from at least one client module via a communication path. The communication path as previously discussed in FIGS. 20-22 may be a radio frequency communication path, IR communication path, and/or wire line communication path. The selection request may be from one client module or a plurality of client modules, each client may be requesting access to a different channel, the same channel or any combination thereof. The selection request includes the identity of the particular client module and the identity of the particular channel and/or source for the channel. As such, the selection request includes sufficient information for the multimedia server to determine the particular audio and/or video source of the particular channel and the desired channel. For example, the selection request may indicate that channel 5 of a satellite broadcast is to be the channel of interest for a particular client module.

The processing then proceeds to Step 714 where a control module within the multimedia server generates a set of channel select commands from the select request. Accordingly, for each select request received from the client modules, the control module, assuming the select request is valid, generates a corresponding select command. Thus, if only one client module has provided a select request, only one select command is generated. As one of average skill in the art will appreciate, the select command is not repeatedly generated from a select request, the select command is typically generated once and maintained until an alternate select request is received or a termination request is received.

The processing of generating a set of channel select commands may further be described with reference to Steps 722-724. At Step 722, the select requests are de-formatted. As previously mentioned, the select requests are received via a communication path, which utilizes a particular data conveyance protocol. The data may be encoded utilizing one of a variety of encoding schemes such as Manchester encoding, non-return to zero encoding, multi-level encoding, block encoding, NB/MB encoding, et cetera. In addition, the encoded data is then modulated utilizing the particular modulation scheme which may be TDM, FDM, ASK, PSK, et cetera. Accordingly, to recapture the original selection requests, the data must be demodulated and decoded.

The process then proceeds to Step 724 where the select request is interpreted to produce the channel select command. The interpretation of the select request includes an authentication process, a verification of the particular client module, and a determination of the validity of the client module. If the client module is an authentic client module and the service being requested is within the privileges of the particular client module, the control module will generate the corresponding channel command.

Returning to the main flow of FIG. 24, the process continues at Step 716 where a tuning module selects a set of channels from the plurality of channels based on the set of channel select commands. For example, if only one channel select command exists, the tuning module will select a channel corresponding to this particular channel select command. If two channel select commands are being provided to the tuning module, the tuning module selects two channels, one for each selection command.

The process then proceeds to Step 718 where the set of channels are mixed into a stream of channel data. The channel data is mixed in such a way as to identify the particular source of the channel data, the destination of the channel data, the select request, and/or any other identifying information needed to ensure that the appropriate client module receives the appropriate data. As one of average skill in the art will appreciate, the stream of channel data may be stored on a hard drive within the multimedia server for subsequent retrieval and/or use. As such, the multimedia server, via a hard drive and appropriate software, may perform a digital VCR function or like function.

The process then proceeds to Step 720 where the stream of channel data is transmitted via a communication path to the plurality of client modules. As previously mentioned, the communication path may be a wire line communication path, RF communication path and/or infrared communication path. The transmitting of the stream of channel data may be further defined with reference to Step 726.

At Step 726, the stream of channel data is formatted for transmission via a transceiving module of the multimedia server. The formatting of the data includes encoding the data utilizing a particular encoding scheme such as multi-level encoding, non-return to zero encoding, Manchester encoding, block encoding, an nB/mB encoding where n<m. For example, the nB/mB encoding may be 4B/5B where 4 bits of original data is converted into 5 bits of encoded data. In addition, depending on the particular data conveyance protocol used within the communication system, the encoded data is then modulated utilizing one or more modulation schemes including TDM, FDM, ASK, PSK, PCM, QPSK, QAM, et cetera. The formatting of the stream of data may additionally include converting the stream of channel data into analog signals for conveyance in an analog format to one or more of the client modules. The conversion to analog signals may be done in parallel with the conveyance of the formatted stream of channel data. As such, both digital and analog signals representing the stream of channel data may be transmitted to the client modules. Accordingly, the analog signals may be transmitted over a different communication path than the digital signals. In addition, multiple communication paths may be utilized depending on the coupling between the client modules and the multimedia servers as previously discussed with reference to FIGS. 20-22.

As one of average skill in the art will appreciate, a single stream of data is provided from the multimedia server to the plurality of client modules. The stream of channel data includes the data corresponding to each selection made by the client modules. Thus, each client module receives the entire stream of channel data and extracts only the data relevant to service its particular selection request.

Figure 25:
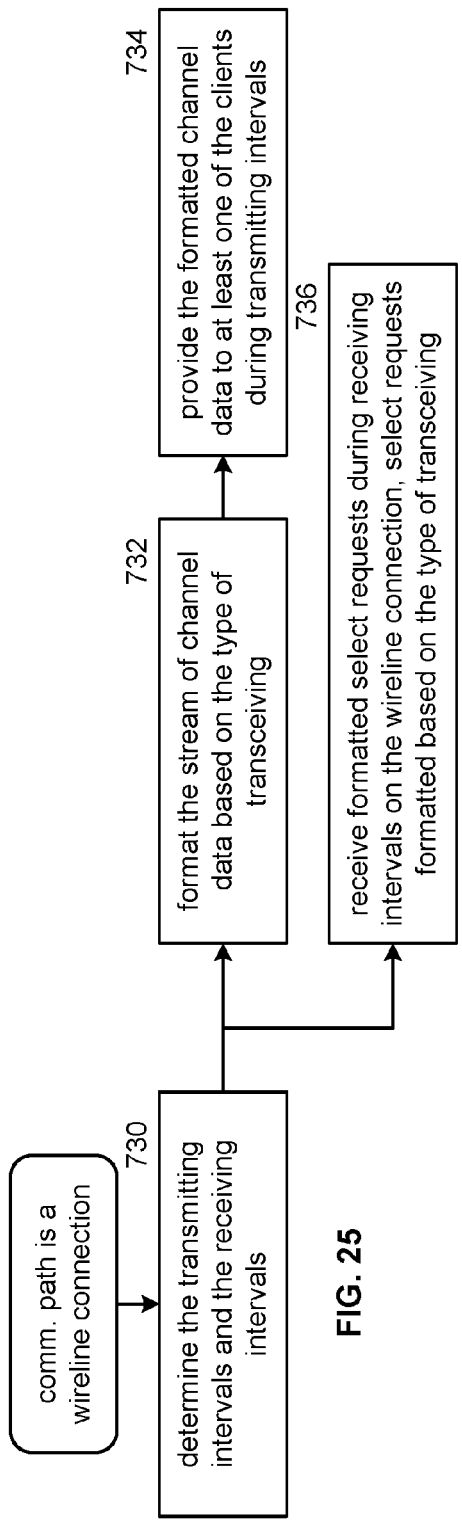
FIG. 25 illustrates a logic diagram of a method for conveying data within the multimedia communication system via a wire line connection in accordance with the present invention.

FIG. 25 illustrates a logic diagram of a method that further describes Step 720 of FIG. 24 when the communication path is a wire line connection. The process begins at Step 730 where a determination is made regarding the transmitting intervals and the receiving intervals. The determination is made by the control module within the multimedia server and is based on the traffic loading, pre-defined allocation intervals, et cetera. In addition, the transmitting intervals and receiving intervals are dependent upon whether a single communication path is utilized to receive and transmit data or whether separate transmit and receive paths are available.

The process then proceeds to Steps 732 and 736. At Step 732 the stream of channel data is formatted based on the type of transceiving. The type of transceiving corresponds to the modulation scheme utilized, which may be TDM, FDM, ASK, PCM, PSK, et cetera. The processing then proceeds to Step 734 where the formatted channel data is provided to at least one of the plurality of clients during a transmitting interval or multiple transmitting intervals, via the wire line connection.

At Step 732, the multimedia server receives formatted select request during receive intervals via the wire line connection. The select requests are formatted based on the type of transceiving used within the multimedia communication system. The type of transceiving corresponds to the modulation scheme utilized, which may be TDM, FDM, ASK, et cetera.

Figure 26:
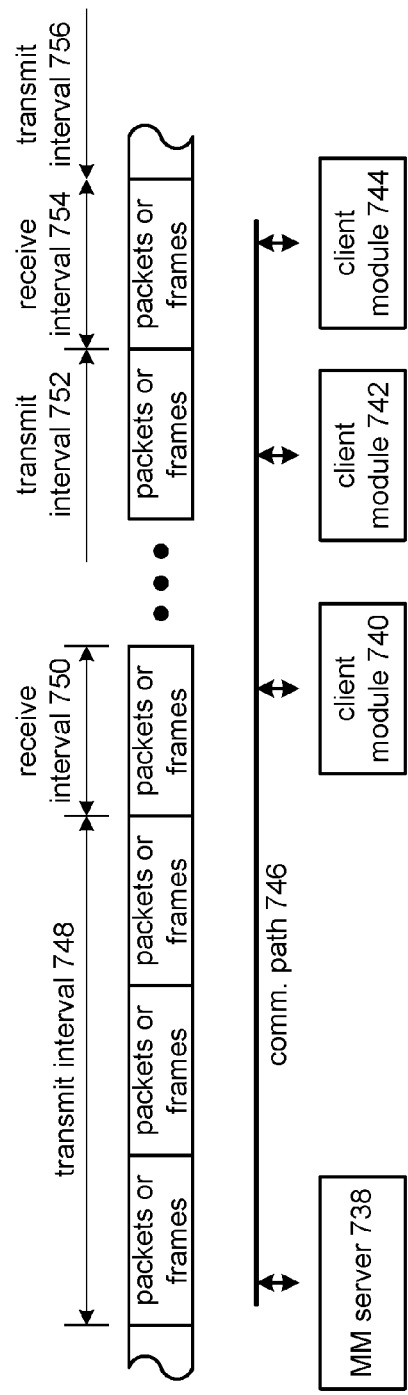
FIG. 26 illustrates a graphical representation of data conveyances within a multimedia communication system in accordance with the present invention.

FIG. 26 illustrates a graphical representation of the transmitting intervals and receiving intervals via the communication path. As shown, communication path 746 operably couples multimedia server 738 to a plurality of client modules 740-742. Note that multimedia server 738 may be any one of the multimedia servers described in reference to FIGS. 1-11 and FIG. 23. The client module 740-744 may be any one of the client modules discussed in reference to FIGS. 1-11. The communication path 746 may be a wire line connection, radio frequency connection, and/or infrared communication path.

As shown, data conveyed over the communication path 746 may be done in packets and/or frames. The transmission of packets and/or frames is divided into transmit intervals 748, 752 and 756 and receive intervals 750 and 754. During the transmit intervals 748, 752 and 756, the multimedia server is transmitting the stream of channel data to the plurality of client modules 740-744. During the receive intervals 750 and 754, one or more of the client modules 740-744 is transmitting a selection request to the multimedia server.

The client module 740-744 access the receive intervals 750 and 754 based on any one of a plurality of schemes such as CSMA, token ring passing, polling by the multimedia server 738, TDM access, et cetera. Accordingly, the ratio between the transmit intervals 748 and received intervals 750 may be set or may be allocated as needed. For example, the receive interval 750 and 754 may occur once for every 10-20 transmit intervals 748, 752, 756. Alternatively, the transmit intervals and receive intervals may be allocated strictly based on a CSMA concept where the multimedia server 738 and each of the client modules 740-744 monitor the communication path for transmissions. If the path is available, the particular entity transmits its data utilizing CSMA with collision avoidance and/or CSMA with collision detection. As one of average skill in the art will appreciate, there are numerous ways in which data can be conveyed via the communication path 746 between multimedia server 738 and the plurality of client modules 740-744 to ensure that the stream of channel data is received by the client modules 740-744 and the client modules 740-744 have adequate access to the communication path 746 to provide selection commands and/or changes to such selections. As a further example, the multimedia server 738 may broadcast within the stream of channel data, when the communication path 746 will be available for transmitting selection request by the client modules. In addition, the broadcasting by the multimedia server 738 may include the identity of which client module or client modules may access the communication path at the allocated received time.

Figure 27:
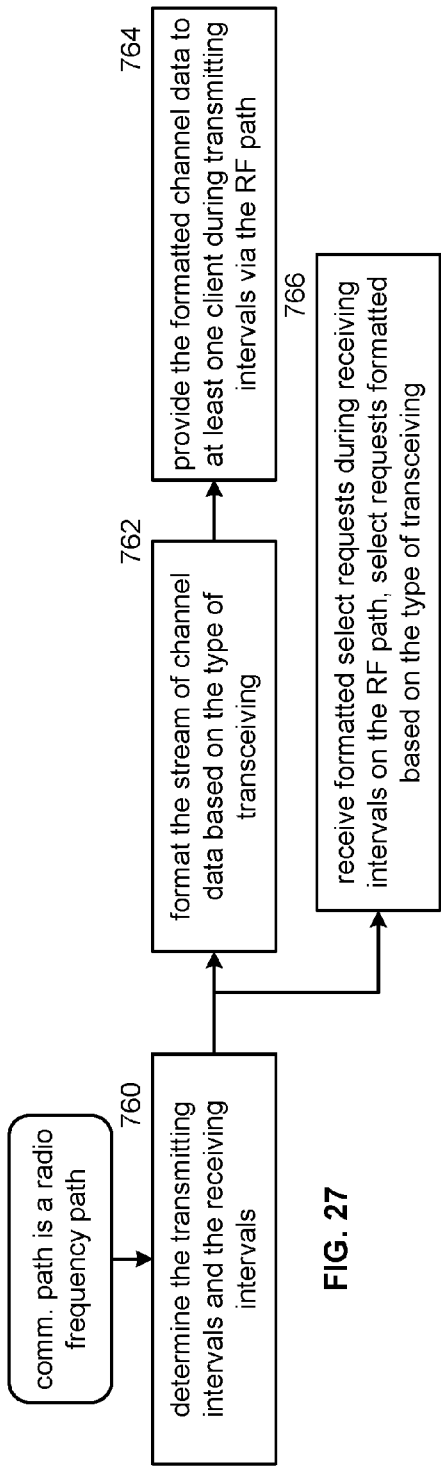
FIG. 27 illustrates a logic diagram of a method for data conveyances within a multimedia communication system utilizing a radio frequency communication path in accordance with the present invention.

FIG. 27 illustrates a logic diagram of a method for further processing of Step 720 of FIG. 24 when the communication path is a radio frequency communication path. The processing begins at Step 760 where the multimedia server determines the transmitting intervals and receiving intervals. This was described with reference to FIG. 26. The process then proceeds to Steps 762 or 766. At Step 762, the stream of channel data is formatted based on the type of transceiving. The process then proceeds to Step 764 where the formatted channel data is provided to at least one of the clients during a transmitting interval via the radio frequency communication path.

At Step 766, the multimedia server receives formatted select request during receive intervals on the RF communication path. The select requests are formatted based on the type of transceiving.

Figure 28:
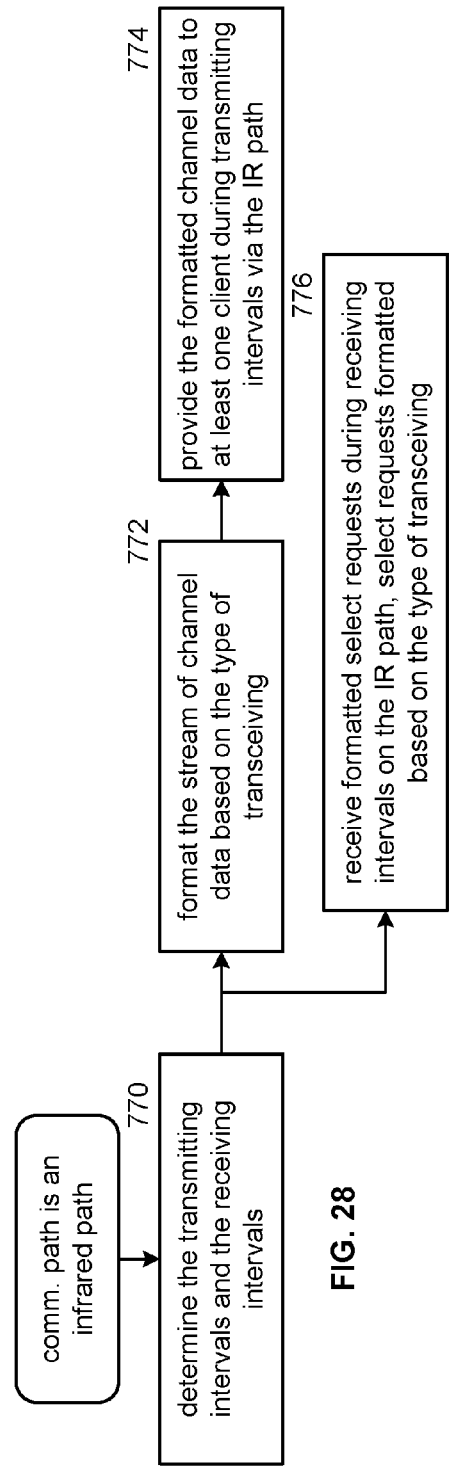
FIG. 28 illustrates a logic diagram of a method for data conveyances within a multimedia communication system via an infrared communication path in accordance with the present invention.

FIG. 28 illustrates a logic diagram of a method that further describes Step 720 of FIG. 24 when the communication path is an infrared communication path. The processing begins at Step 770 where the transmitting intervals and receiving intervals are determined. The process then proceeds to Steps 772 and 776. At Step 772, the stream of channel data is formatted based on the type of transceiving. The process then proceeds to Step 774 where the formatted channel data is provided to at least one client module during transmitting intervals via the infrared communication path.

At Step 776, the multimedia server receives formatted select request during receive intervals on the infrared communication path. The select requests are formatted based on the type of transceiving utilized.

Figure 29:
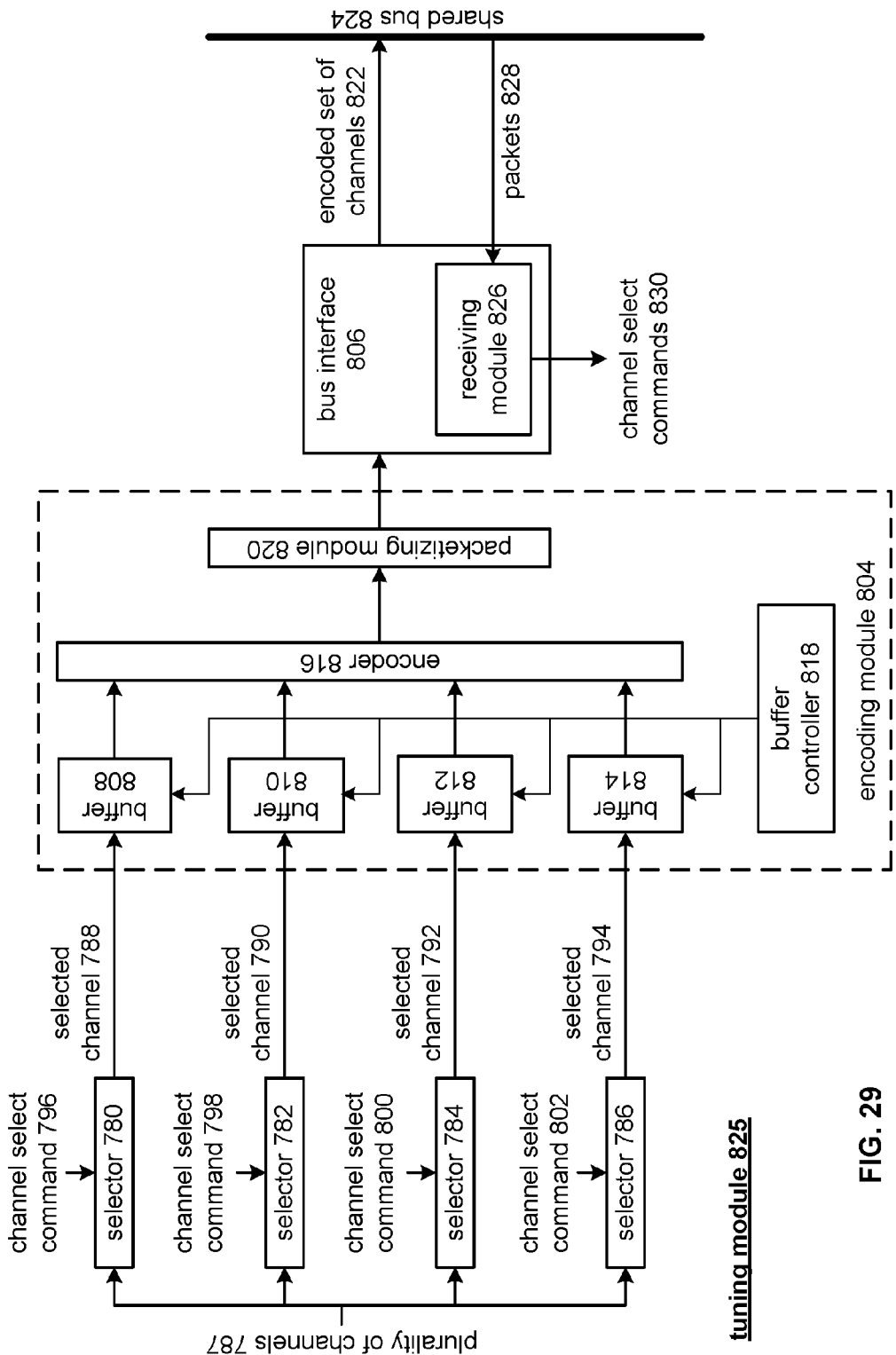
FIG. 29 illustrates a schematic block diagram of a tuning module, which may be incorporated in a multimedia server in accordance with the present invention.

FIG. 29 illustrates a schematic block diagram of a tuning module 825 that may be utilized as the tuning module 150, 240, 280, and/or 340 as shown in FIGS. 12, 14-16. The tuning module 825 includes a plurality of selectors 780-786, an encoding module 804, and a bus interface 806 that provides connectivity to a shared bus 824. The shared bus 824 is shared with the channel mixer processing module and other components of the multimedia servers as shown in FIGS. 12, 14-16. The selectors 780-786 may be the plurality of tuners shown in FIG. 12, the multiplexors shown in FIG. 14, the combination of multiplexors and tuners shown in FIG. 15 and/or the HDTV tuners shown in FIG. 16. Accordingly, the selectors 780-786 are dependent on the particular source providing the plurality of channel 787.

The encoding module 804 includes a plurality of buffers 808-814, an encoder 816, a buffer controller 818, and a packetizing module 820. The buffers 808-814 may be physically separate memory devices or logically separate memory devices. Each of the buffers 808-814 function as a ring buffer. The buffer controller 818 provides the management of each buffer 808-814 including head and tail pointer tracking, and read and write control.

As shown, each of the plurality of selectors 780-786 is operably coupled to receive a plurality of channels 787. Based on a respective channel select command 796-802, each of the selectors 780-786 outputs an individual selected channel 788-794. The plurality of channels 787 may be provided by the multimedia sources previously described with reference to FIGS. 1-11. As one of average skill in the art will appreciate, more or less selectors 780-786 may be included in tuning module 825. In addition, one or more of the selectors 780-786 may be idle if a limited number of client modules are accessing the multimedia server. Accordingly, the encoding module 804 via the buffer controller 818 is aware of which selectors 780-786 is actively providing selected channel data 788-794.

The buffer controller 818 coordinates the writing of the data of the selected channel 788-794 into the respective buffers 808-814. In addition, the buffer controller 818 coordinates the reading of the data from each of the buffers 808-814 into the encoder 816. The encoder 816 may perform a particular encoding function such as multi-level encoding, non-return to zero encoding, Manchester encoding, block encoding, NB/MB encoding where N>M. Typically, the encoder 816 is utilized to facilitate the accuracy of data transmission from the tuning module 825 to the channel mixer of the multimedia server. As one of average skill in the art will appreciate, the encoder 816 may be omitted when the data of the selected channels may be accurately transmitted to the channel mixer.

The packetizing module 820 packetizes the encoded data to produce a plurality of packets. Each packet includes a header section and data section. The header section includes the identity of the selected channel, the type of data of the selected channel (e.g., audio, video, text, et cetera), identity of the particular multimedia source, whether the encryption is enabled or disabled, the type of encryption used, whether compression is enabled or disabled, the type of compression used, and/or a packet sequence number. The packets are provided to bus interface 806, which may include a receiving module 826. The bus interface provides the packets of encoded set of channels 822 to the shared bus 824.

In addition, the bus interface 806 via the receiving module 826 receives packet 828. The receiving module 826 processes the packets to retrieve the channel select commands 830. The channel select command 830 is comprised of the individual channel select commands 796-802. The receiving module may include a decoder to decode the data contained within the packets to recapture at least a portion of a channel select command. The decoding performed would be the inverse of the encoding used by the client module.

Figure 30:
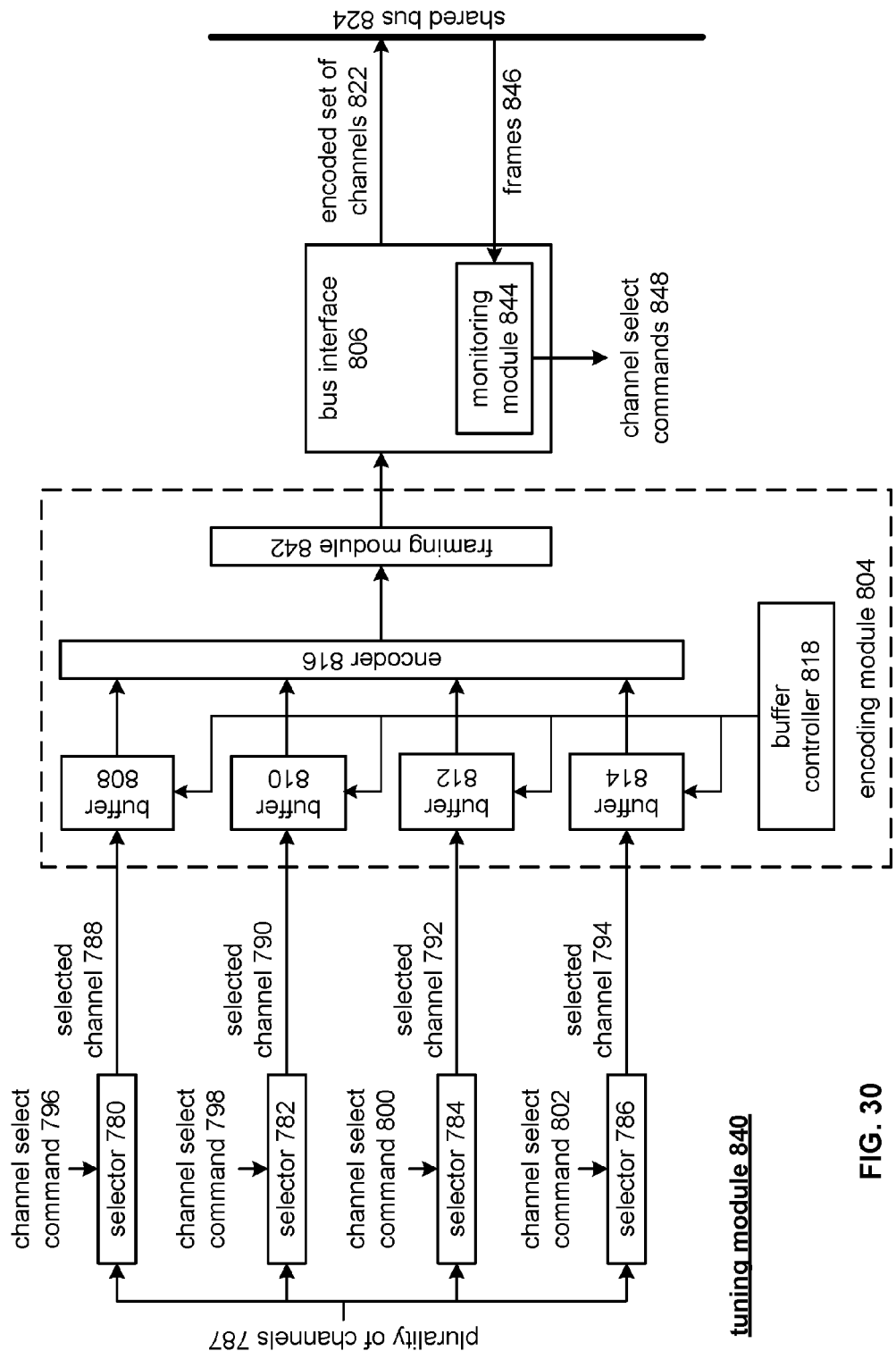
FIG. 30 illustrates a schematic block diagram of an alternate tuning module, which may be incorporated in a multimedia server in accordance with the present invention.

FIG. 30 illustrates a schematic block diagram of tuning module 840 which may be used in any one of the multimedia servers illustrated in FIGS. 12, 14-16. The tuning module 840 is very similar to tuning module 825 of FIG. 29 with the difference that the encoding module 804 includes a framing module 842 instead of a packetizing module 820. In addition, the bus interface 806 includes a monitoring module 844 as opposed to a receiving module 826.

In operation, the selectors 780-786 select a particular channel 788-794 based on a channel select command 796-802 from a plurality of channels 787. Buffers 808-814 store the data of the selected channel 788-794. The encoder 816 encodes the data to produce encoded channel data. The encoded channel data is received by framing module 842, which frames the data of each of the selected channels into frames that include a header section and data section. The header section includes the identity of the selected channel, the type of selected channel, the identity of the multimedia source, indication as to whether encryption is enabled or disabled, the type of encryption used, an indication as to whether compression is enabled or disabled, the type of compression, and/or a frame number.

The bus interface 806 receives the framed data and provides it as encoded set of channels 802 on to the shared bus 824. In addition, the bus interface 806 receives frames 846 from the shared bus. The monitoring module 844 interprets the frames 846 at specific time intervals to extract channel select commands 848.

FIG. 31 illustrates a schematic block diagram of another embodiment of the tuning module 850. The tuning module 850 may be utilized in any one of the multimedia servers illustrated in FIGS. 12, 14-16. The tuning module 850 includes a plurality of selectors 780-786, a data compression module 862, an encryption module 860, the encoding module 804, the bus interface 806, the bus controller 870, a decoding module 852, a decrypting module 864, and a decompressing module 868. The bus interface 806 is controlled via the bus controller 870, which controls the receiving of the channel select commands and further controls the transmitting of encoded channel data.

In operation, the tuning module 850 receives select commands from the shared bus 824 via the bus interface 806. The bus interface 806 provides the received channel select commands to the decoding module 852. The decoding module 852 includes a deframer or depacketizer module 854, a decoder 856, and a buffer 858. The deframer or depacketizer 854 extracts data from a received frame or from a received packet. The deframed or depacketized data is provided to the decoder 856. The decoder recaptures the original data of the selection request by utilizing the inverse function of the encoder within the client module. As such, if the client module used Manchester encoding, the decoder would use the inverse Manchester encoding function to recapture the data. The recaptured data is then stored in buffer 858.

If the data is unencrypted and is not compressed, the recaptured data is provided to control module 156, 244, 284, and/or 344. Based on the channel select request, the control module generates a plurality of channel select commands 796-802. The control module provides the channel select commands to the plurality of selectors 780-786.

If, however, the selection request is encrypted and/or compressed, the encrypted data would be provided to decryption module 864. Decryption module 864 decrypts the data based on the encryption/decryption scheme utilized. For example, if the client module utilized a data encryption standard (DES) encryption technique, the decryption module would use the corresponding decryption scheme to recapture the data.

If the data is also compressed, the decrypted data or the data from buffer 858 is provided to the decompressing module 868. The decompressing module 868 utilizes the inverse function that was used to compress the data. As such, the recaptured data, which has either been decrypted and/or decompressed, is provided to the control module, which produces the corresponding channel select commands 796-802.

The selectors 786-780 output a selected channel 788-794 based on the respective channel select commands 796-802 from a plurality of channels 787. The plurality of selected channels 788-794 may be provided to a data compression module 862, an encryption module 860, and/or directly to the encoding module 804.

If the selected channels 788-794 are to be compressed, the data compression module 862 utilizes a data compression scheme to compress the data. The data compression scheme may be a zip-type function or other known data compression techniques. If the compressed data is to also be encrypted, it is provided to encrypting module 860. Alternatively, if the compressed data is to be processed without encryption, it would be provided directly to encoding module 804.

If the data is to be encrypted, encrypting module 860 utilizes an encryption scheme to encrypt the data of the selected channels 788-794. The encryption scheme utilized may be any one of a variety of known encryption schemes such as DES, PGP (pretty good protection), et cetera. The data from encrypting module 860 is then provided to encoding module 804, which subsequently encodes the data and provides the encoded data to bus interface 806 for transmission on the shared bus 824. As previously mentioned, the encoder of the encoding module 804 may be omitted such that the encrypted data may be transmitted directly onto the shared bus without further encoding.

FIG. 32 illustrates a schematic block diagram of an alternate tuning module 880 that may be utilized in any one of the multimedia servers illustrated in FIGS. 12, 14-16. The tuning module 880 includes a processing module 882 and memory 884. The processing module 882 may be a single processing device or a plurality of processing devices. Such a processing device may be a microprocessor, microcontroller, microcomputer, digital signal processor, programmable gate array, central processing unit, state machine, logic circuitry, and/or any device that manipulates signals (analog and/or digital) based on operational instructions. The memory 84 may be a single memory device or a plurality of memory devices. Such a memory device may be a read-only memory device, random access memory device, flash memory, magnetic tape memory, system memory, erasable read-only memory, and/or any device that stores digital information. Note that when the processing module 882 implements one or more of its functions via a state machine or logic circuitry, the memory storing the corresponding operational instructions is embedded within the circuitry comprised in the state machine or logic circuit. The operational instructions stored in memory 884 and executed by processing module 882 have generally been discussed with reference to the preceding figures and is further illustrated with reference to FIGS. 33-37.

FIG. 33 illustrates a logic diagram of a method for multiplexing a plurality of channels in a multimedia system via a tuning module. The processing begins at Step 890 where a plurality of channels is received from a multimedia source. The receiving of the plurality of channels may further include one or more of: receiving audio and video data for each of a plurality of channels from a satellite connection; receiving audio and video data for each of a plurality of channels from a set-top box; receiving audio and video data for each of a plurality of channels from a cable connection; receiving audio and video data for each of the plurality of channels from a high definition television receiver; receiving audio and video data for each of the plurality of channels from an antenna connection which receives NTSC broadcasts, PAL broadcasts, et cetera. Accordingly, the plurality of channels may be from a single multimedia source or a plurality of multimedia sources.

The process then proceeds to Step 892 where a plurality of channel selection commands are received. The plurality of channel selection commands are derived from select requests provided by a plurality of client modules wherein each of the channel select commands identifies a particular channel of the plurality of channels. The processing then continues at Step 894 where a channel of the plurality of channels is selected per channel selection command. Note that the selected channel may be from any one of a plurality of multimedia sources.

The process then proceeds to Step 896 where each of the selected channels is encoded based on a data conveyance protocol of the multimedia system. The encoding may be multi-level encoding, non-return to zero encoding, Manchester encoding, block encoding, and/or nB/mB encoding where n<m.

As one of average skill in the art will appreciate, high definition television, satellite receivers, set-top boxes, et cetera typically utilize MPEG video data. As such, in the typical 6 MHz bandwidth for NTSC channel separation, compressed video includes multiple channels in the same frequency band. Thus, when a particular channel is selected from one of these multimedia sources, multiple compressed channels may be retrieved. Accordingly, each of the compressed channels may be encoded as described in Step 896. As one of average skill in the art will further appreciate, prior to the encoding of Step 896, the data may be compressed via a compression technique and/or encrypted utilizing an encryption technique.

The process then proceeds to Step 898 where the encoded channel data is conveyed to the channel mixer. The conveying of the encoded data may be done by framing the data from each of the selected channels into frames that include a header section and a data section. Alternatively, the encoded channel data may be packetized into packets that include a header section and a data section. The header section of either a packet or frame includes the identity of the selected channel, type of data of the selected channel, the identity of the multimedia source, whether encryption is enabled or disabled, the type of encryption used, an indication as to whether compression is enabled or disabled, the type of compression, and/or a packet or frame number.

FIG. 34 illustrates a logic diagram of a method that further defines the receiving of the channel select commands as described generally in Step 892 of FIG. 33. The processing begins at Step 900 where the channel select requests are received from a plurality of client modules. The process then proceeds to Step 902 where the channel select requests are processed to produce the plurality of channel select commands. Each of the channel select commands include a specific channel select command, less channel selection command, next channel selection command, previous channel selection command, favorite channel selection command, and/or select channel from a user defined list. Such a command corresponds to the particular request by the client and/or a default processing scheme used within the multimedia server. Accordingly, when a particular client makes a request, the tuning module will interpret the request in light of one of these particular multimedia channel selection schemes.

The processing of the plurality of selection requests may be done in one or more of Steps 904-908. At Step 904, the channel select request is interpreted to identify at least one of the clients. In addition, the request is interpreted to determine the particular channel selection request being made. Based on this information, the channel command may be generated.

At Step 906, the client initiating the selection request is authenticated. The authentication determines whether the client is a valid client of the multimedia server. At Step 908, the specific channel selection request made by a client is authenticated. This may be done by determining whether the client has access privileges for the particular channel being requested, whether the request is being made within an approved time of the day, and/or whether a time allotment of accessing multimedia sources has been exceeded. In addition, the authentication of the specific channel request may include determining whether the client is authorized to purchase the requested channel from one of the multimedia sources (e.g., whether the client is authorized to access pay preview channels), and/or whether the client has exceeded in the count limit established by the multimedia server.

Figure 35:
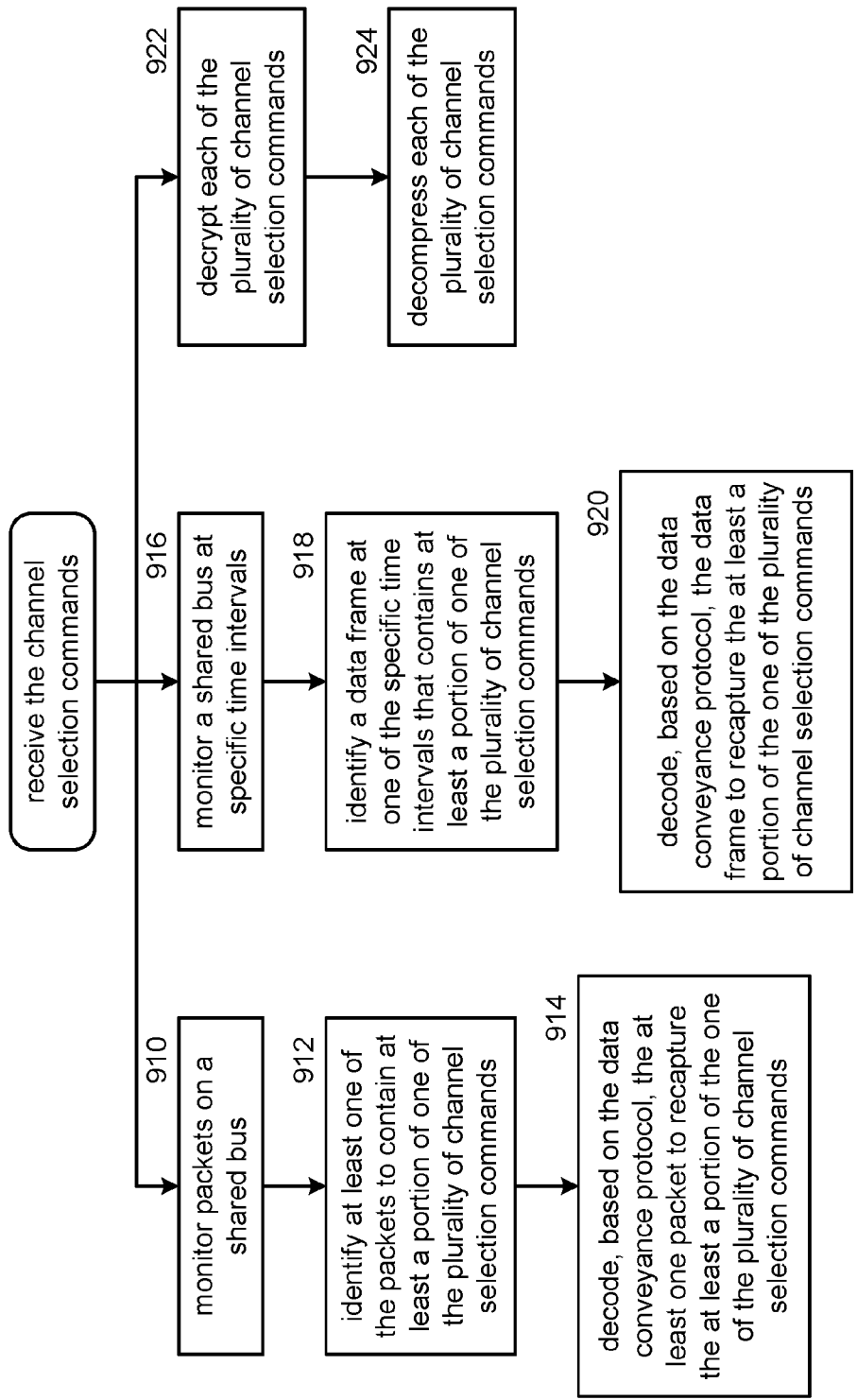
FIG. 35 illustrates a logic diagram of a further method for receiving the channel selection commands of the logic diagram of FIG. 33.

FIG. 35 illustrates a logic diagram of a method for receiving the channel selection commands of Step 892 of FIG. 33. The process may begin at Step 910, 916 and/or at Step 922. At Step 910, the tuning module monitors packets on a shared bus. The packets, as previously described, include a header section and data section. The process then proceeds to Step 912 where the tuning module identifies at least one of the packets as containing at least a portion of one of the plurality of channel selection commands.

The process then proceeds to Step 914 where the tuning module decodes the at least one packet based on the data convention protocol of the multimedia system to recapture at least a portion of one of the plurality of channel select commands. Such decoding includes interpreting the header section, extracting the data from the data section, and determining whether the extracted data contains all of the data of a channel select command or partial data of a channel select command. If the data extracted is a partial select request, it is buffered until all of the data related to the channel select command is received.

At Step 916, the tuning module monitors a shared bus at specific time intervals for frames of relevant data. The process then proceeds to Step 918 where the tuning module identifies a data frame at one or the specific time intervals to contain at least a portion of one of the plurality of channel select commands. The process then proceeds to Step 920 where the tuning module decodes the data frame based on the data convention protocol to recapture at least a portion of one of the channel select commands. The decoding includes interpreting the header section, extracting the data from the data section, and determining whether the data contains a full channel selection command or a partial one. If partial, the data is buffered until a full channel select command has been received.

At Step 922, the tuning module decrypts each of the plurality of channel select commands. In addition, at Step 924, the tuning module decompresses each of the channel select commands.

Figures 36, 37:
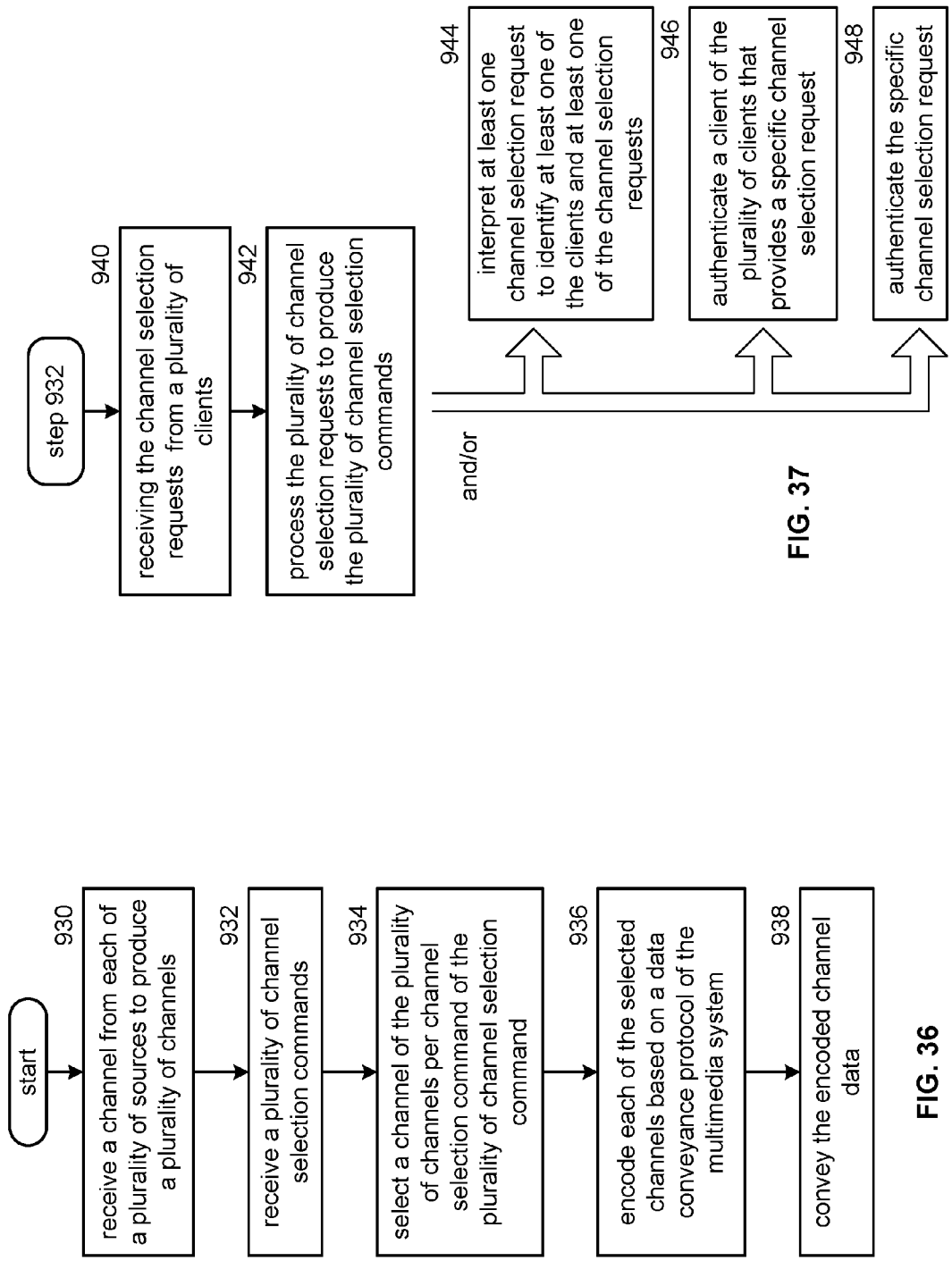
FIG. 36 illustrates a logic diagram of an alternate method for channel selection within a multimedia communication system in accordance with the present invention.
FIG. 37 illustrates a logic diagram of a method further describing the receiving of channel selection commands of the logic diagram of FIG. 36.

FIG. 36 illustrates a logic diagram of an alternate method for multiplexing a plurality of channels in a multimedia system by a tuning module. The processing begins at Step 930 where a channel from a plurality of multimedia sources is received to produce a plurality of channels. The multimedia sources may be a DVD player, CD player, camcorder, VCR, DVD audio player, et cetera. The process then proceeds to Step 932 where the tuning module receives a plurality of channel select commands. The process then proceeds to Step 934 where the tuning module selects a channel from the plurality of channels for each of the channel select commands received.

The process then proceeds to Step 936 where the tuning module encodes each of the selected channels based on a data convention protocol of the multimedia system. The encoding includes multi-level encoding, non-return to zero encoding, Manchester encoding, block encoding, and/or nB/mB encoding where n<m. Note that prior to encoding, the data of each selected channel may be compressed and/or encrypted. The process then proceeds to Step 938 where the encoded channel data is conveyed to the channel mixer. The data may be conveyed as packets utilizing CSMA, CSMA with collision avoidance and/or CSMA with collision detection. Alternatively, the data may be conveyed as frames, which will be transmitted in specific time slots for time division multiplexing and/or frequency positions for frequency division multiplexing.

FIG. 37 illustrates a logic diagram of further processing of Step 932 of FIG. 36. At Step 940, the tuning module receives the channel select request from a plurality of client modules. The process then proceeds to Step 942 where the tuning module, and/or control module, processes the plurality of channel selection requests to produce the plurality of channel selection commands. The processing of the channel select request may be done as described in Steps 944, 946, and/or 948.

At Step 944, the control module interprets a channel select request to identify the particular client and the particular request being made. If both are valid, the channel selection command is generated.

At Step 946, the control module authenticates the client that provided the specific channel selection request. The authentication of the client verifies that the client is an authorized user of the multimedia system.

At Step 948, the control module authenticates the specific channel selection request. The authentication of the channel selection request includes determining parental control limits, subscription verification, account limits, time of day of the request, and/or amount of multimedia service accessing over a given duration.

Figure 38:
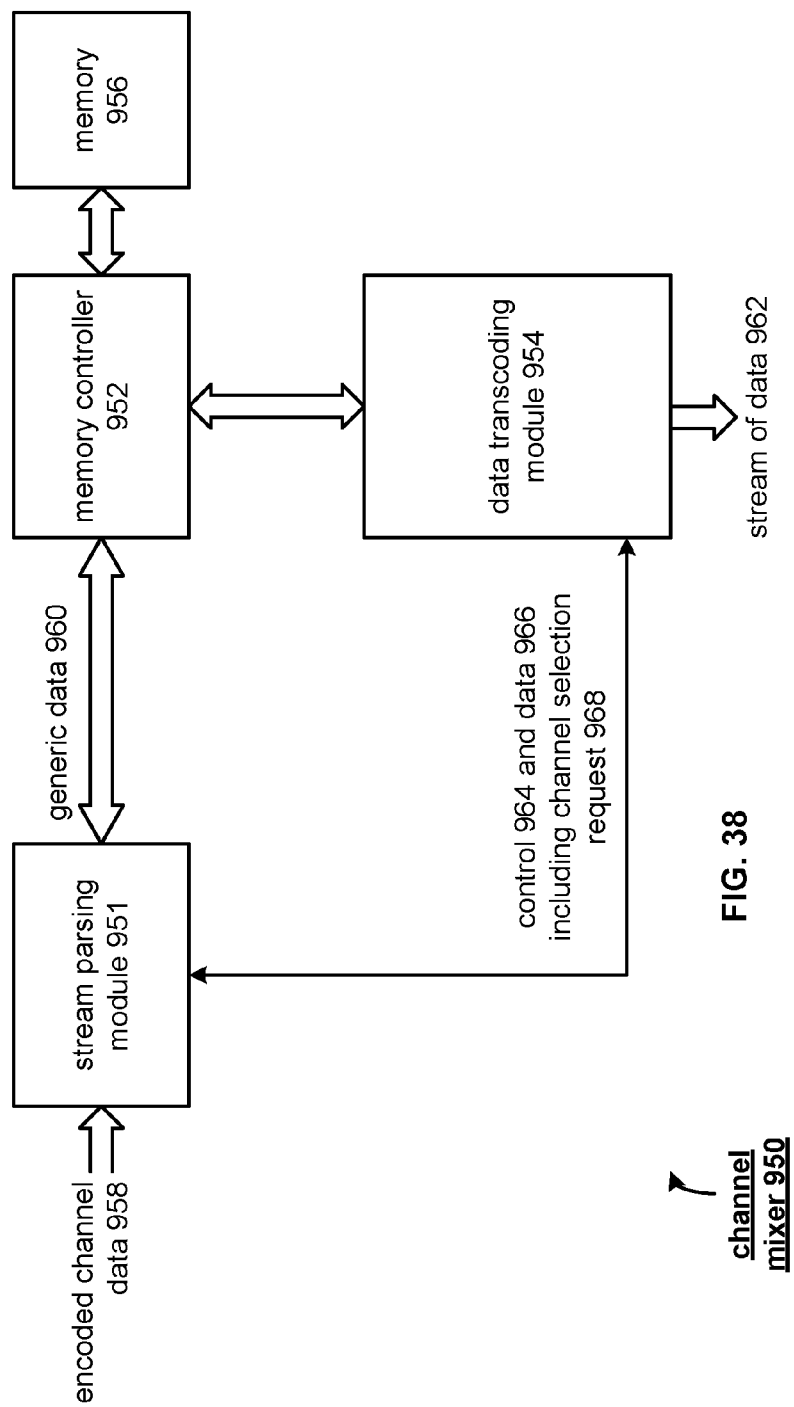
FIG. 38 illustrates a schematic block diagram of a channel mixer for use in a multimedia communication system in accordance with the present invention.

FIG. 38 illustrates a schematic block diagram of a channel mixer 950. The channel mixer 950 may be utilized in any one of the multimedia servers described in FIGS. 1-15. The channel mixer 950 includes a stream parsing module 951, memory controller 952, memory 956 and a data transcoding module 954.

The stream parsing module 951 is operably coupled to receive the encoded channel data 958 from the tuning module. The stream parsing module 951 decodes the encoded channel data 958 to recapture the original data. The stream parsing module 951 then converts the data of each of the selected channels into generic data 960. The stream parsing module 951 stores the generic data 960 in memory 956 via the memory controller 952.

The stream parsing module 951 conveys control information 964 and data 966 with the transcoding module 954. The control information includes the channel select request 968. As such, based on the control information, which includes the channel selection request, the stream parsing module 951 processes the encoded channel data 958 to produce the generic data 960.

The data transcoding module 954 retrieves the generic data 960 from memory 956 via the memory controller 952. The data transcoding module 954 converts the generic data 960 into a stream of data 962. The conversion of the generic data 960 is dependent upon the particular type of data. For example, video data may be stored as digital RGB data, digital YCRCB data, digitized video, et cetera. The transcoding module retrieves the generic video data and converts it into a specific formatted video data, such as MPEG 2, and provides that as the stream of data 962.

If the data is audio data, the audio data is stored as generic PCM audio data in memory 956. The data transcoding module 954 converts the generic PCM digitized audio data into MP3 data, MPEG audio data, et cetera. If the encoded channel data 958 includes network data, the stream parsing module 951 passes the network data to be stored in memory 956. The data transcoding module retrieves the network data and passes it as the stream of data 962.

Figure 39:
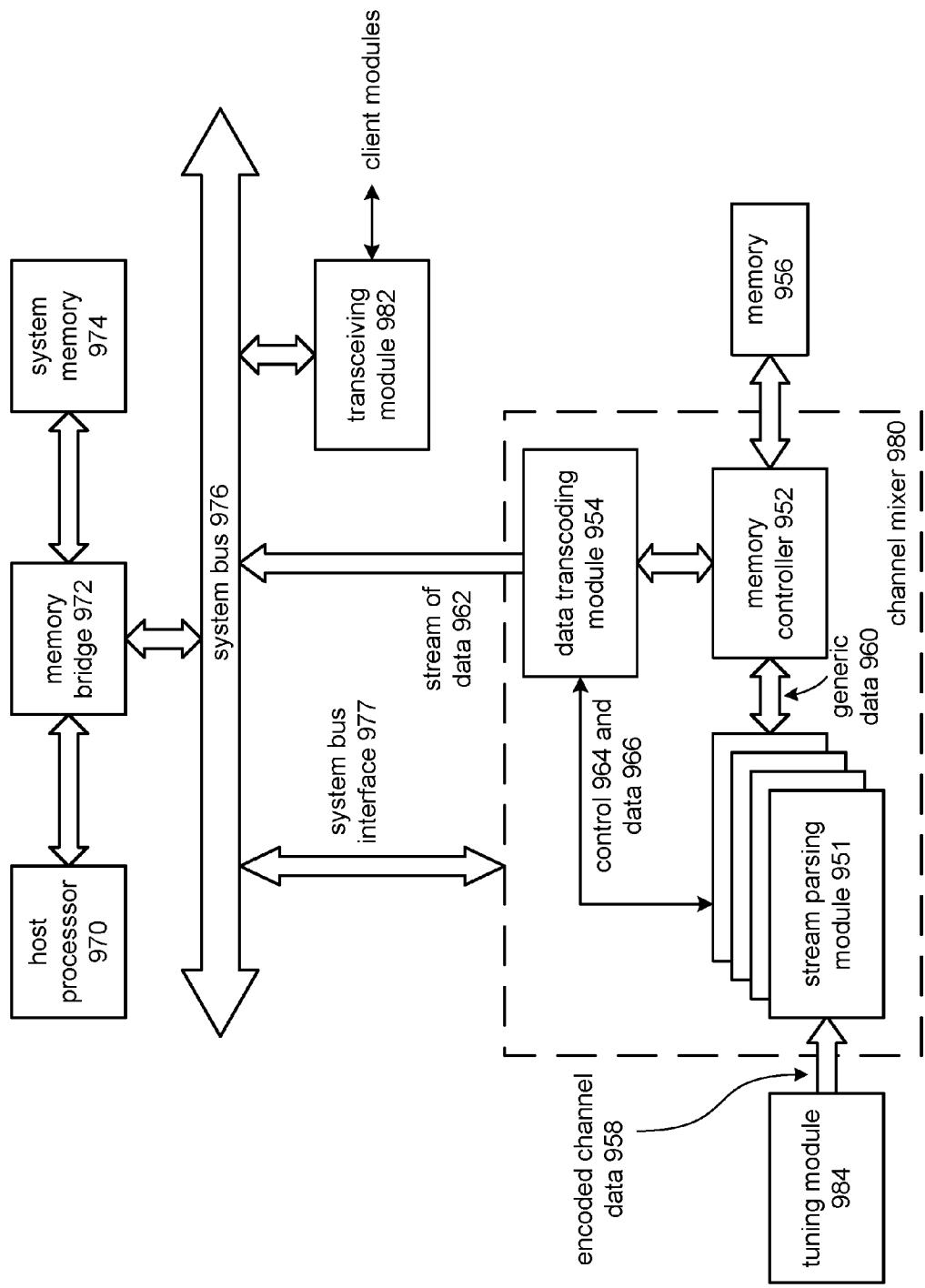
FIG. 39 illustrates a schematic block diagram of a channel mixer operably coupled to components within a multimedia server in accordance with the present invention.

FIG. 39 illustrates a channel mixer 980 operably coupled to components of a device hosting the multimedia server. The channel mixer 980 may be any of the channel mixers used in the multimedia servers previously described. The host device includes a system bus 976, a host processor 970, a memory bridge 972 and system memory 974. The host device may be a personal computer, laptop computer, satellite receiver, set top box, home theater receiver, radio receiver, VCR, DVD, etc.

The channel mixer 980 includes a plurality of stream parsing modules 951, memory controller 952, and the data transcoding module 954. The plurality of stream parsing modules 951 is operably coupled to the tuning module 984. The tuning module 984 provides the encoded channel data 958 to the channel mixer 980. In this embodiment, each of the stream parsing modules 951 may be processing a particular channel selection request for a particular client module.

Each of the stream parsing modules 951 provides generic data 960 to memory 956 via the memory controller 952. The transcoding module 954 converts the generic data 960 into the stream of data 962 and provides it to the transceiving module 982 via the system bus 976.

The transceiving module 982 includes an encoder and modulator for preparing the stream of data 962 for transmission to the client modules. In addition, the transcoding module 982 includes a demodulator and decoder for receiving the channel select commands from the plurality of client modules.

The transceiving module 982 provides the channel select commands to the channel mixer 980 via the system bus interface 977. As coupled, the host processor 970 may perform system operational functions for the multimedia server via algorithms stored in the system memory 974. Such system level functions may be allocation of system multimedia resources, managing Internet access, client-to-client communications, telephone communications, et cetera. As such, system level functions will be described in greater detail with reference to FIGS. 57-65.

Figure 40:
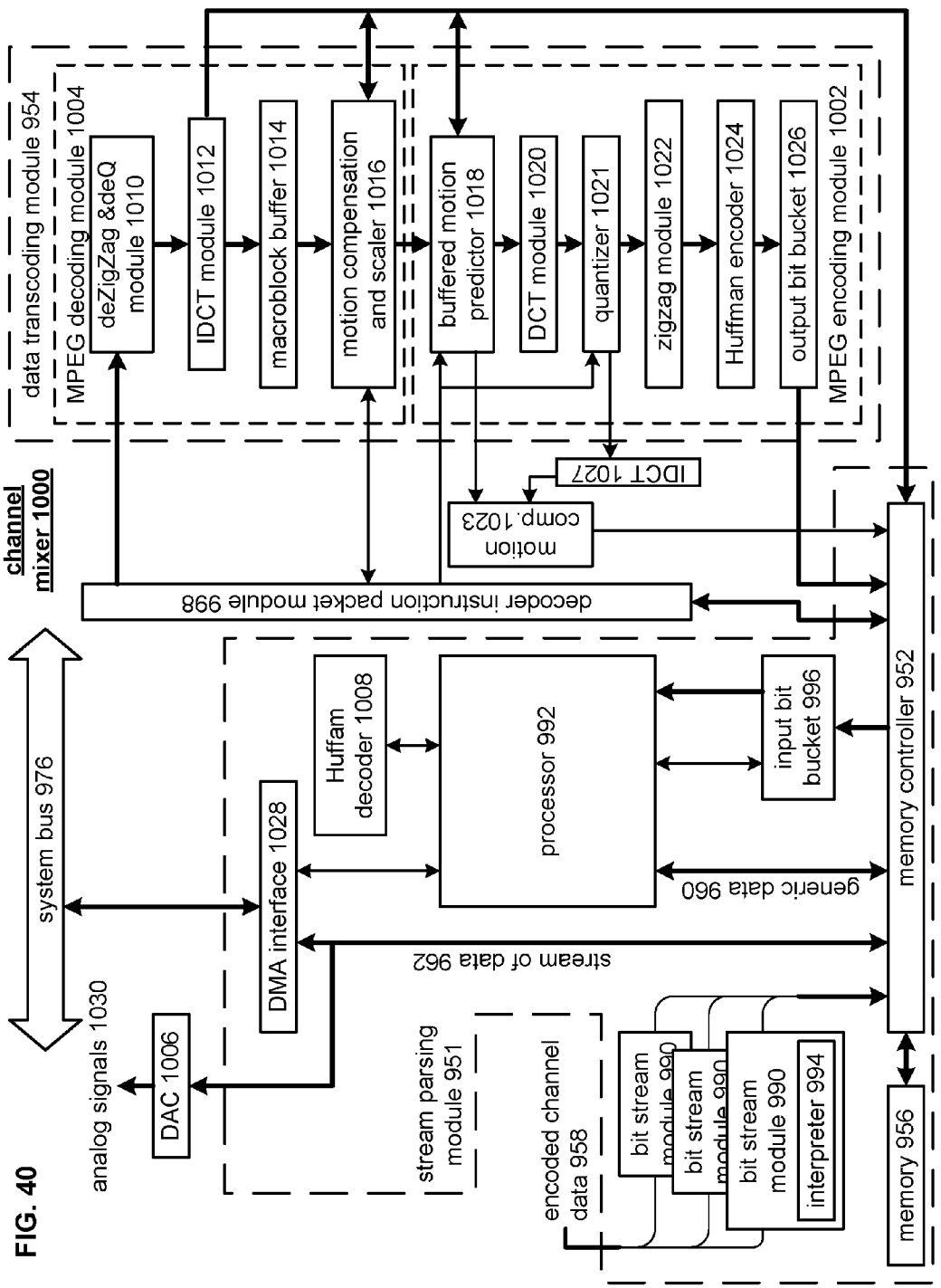
FIG. 40 illustrates a schematic block diagram of an alternate channel mixer for use in a multimedia communication system in accordance with the present invention.

FIG. 40 illustrates a schematic block diagram of another channel mixer 1000 that may be utilized in any one of the previously discussed multimedia servers. The channel mixer 1000 includes the stream parsing module 951 and may further include multiple stream parsing modules 951, a digital to analog converter 1006, a decode instruction packet module 998, IDCT module 1027, motion compensation 1023, and the transcoding module 954. The transcoding module 954, for video signals, includes a MPEG decoding module 1004 and an MPEG encoding module 1002. For audio signals, the transcoding module 954 would include a PCM decoding module and a PCM encoding module.

The MPEG encoding module 1002 includes a buffered motion predictor 1018, a discrete cosigned transform module 1020, a quantizer 1021, zigzag module 1022, a Huffman encoder 1024 and an output bit bucket 1026. The MPEG decoding module 1004 includes a dezigzag and dequantizer module 1010, an inverse discrete cosign transform module 1012, a macro-block buffer 1014 and a motion compensation and scaling module 1016. The functionality of motion compensation and scaling module 1016 and the buffered motion predictor 1018 are further described in U.S. Utility patent application Ser. No. 09/823,646, entitled, ADAPTIVE BANDWIDTH FOOTPRINT MATCHING FOR MULTIPLE COMPRESSED VIDEO STREAMS IN A FIXED BANDWIDTH NETWORK, filed Mar. 30, 2001, issued as U.S. Pat. No. 8,107,524 on Jan. 31, 2012 and U.S. Utility patent application Ser. No. 09/819,147, entitled and DEVICE AND METHOD FOR COMPRESSION OF A VIDEO STREAM, filed Mar. 27, 2001, issued as U.S. Pat. No. 7,602,847 on Oct. 13, 2009. The remaining elements of the MPEG decoding module 1004 and MPEG encoding module 1002 are known, thus no further discussion will be provided except to further illustrate the concepts of the present invention.

Each of the stream parsing modules 951 includes a processor 992, an input bit bucket 996, memory controller 952, memory 956, a plurality of bit stream modules 990, a direct memory access interface 1028 and a Huffman decoder 1008. Each of the bit stream modules 990 includes an interpreter 994. In operation, each of the bit stream modules 990 is operably coupled to process one channel of interest of the encoded channel data 958. The interpreter 994 is utilized to identify which of the channels the particular bit stream module is to process. The bit stream module then filters the channel of interest such that all others are removed. The output of each of the bit stream modules 990 is stored in memory 956 via memory controller 952.

The processor 992 retrieves the data of each channel of interest from memory 956 and converts it into generic data 960. The processor 992 causes the generic data 960 to be stored in memory 956 via the memory controller. The processor 992 may utilize the input bit bucket 996 to retrieve bytes of data from the memory 956 in a bit stream fashion. As such, the input bit bucket 996 performs the function of converting bytes of data, which are stored in memory, into bits of data, which are processed by processor 992. The input bit bucket 996 may be utilized to retrieve any type of data from memory 956 by processor 992.

The MPEG encoding module 1002 retrieves the generic data 960 under the control of the decoder instruction packet module 998. The buffered motion predictor 1018 receives the generic data 960 and produces therefrom motion compensated data. The motion compensated data is provided to the DCT module 1020, which performs a discrete cosine transform upon the data to produce DCT data. The quantizer and zigzag module 1022 receives the DCT data and quantizes it and zigzags it before providing the processed data to a Huffman encoder 1024. The Huffman encoder encodes the data to produce the specific formatted data, which is provided back to memory 956 via the output bit bucket 1026 via memory controller 952. The output bit bucket 1026 converts the bits received from the Huffman encoder 1024 and provides it as bytes of data to memory controller 952.

The memory controller 952 retrieves the MPEG encoded data from memory 956 and provides it as a stream of data 962 via the DMA interface 1028 to the system bus 976. The transceiving module retrieves the stream of data 962 from the system bus and processes it as previously discussed.

The MPEG decoder module 1004 may be utilized to decode incoming MPEG data to produce the generic data 960 and/or to decode MPEG encoded data received from client modules. The MPEG decoding module 1004, under the instruction of the decode instruction packet module 998 receives MPEG encoded data and dezigzags and dequantizes it via the dezigzag and dequantizer module 1010. The dezigzag and dequantized data is provided to the IDCT module 1012 which performs an inverse discrete cosine transform function upon the data. The resulting data is then either provided to macroblock buffer 1014 or provided to memory 956 via memory controller 952. The motion compensation and scaler module 1016, under the control of the decoder instruction packet module 998, retrieves data either from the macroblock buffer 1014 or from memory 956 to perform a motion compensation and scaling function thereon. The resulting data is then either provided back to memory 956 or to the MPEG encoding module 1002.

The digital to analog converter 1006 is operably coupled to receive the stream of data 962 and convert it into analog signals 1030. The analog signals 1030 may be provided to legacy-type client devices that still transceive data in an analog format.

FIG. 41 illustrates a schematic block diagram of another channel mixer 1040, which may be utilized in any one of the previously described multimedia servers. The channel mixer 1040 includes a processing module 1042 and memory 1044. The processing module 1042 may be a single processing device or a plurality of processing devices. Such a processing device may be a microprocessor, microcontroller, microcomputer, central processing unit, digital signal processor, programmable gate array, logic circuitry, state machine and/or any device that manipulates signals (analog or digital) based on operational instructions. The memory 1044 may be a single memory device or a plurality of memory devices. Such a memory device may be a read-only memory, random access memory, system memory, flash memory, magnetic tape memory, hard drive memory, and/or any device that stores digital information. Note that when the processing module 1042 performs one or more of its functions via a state machine or logic circuitry, the memory storing the corresponding operational instructions is embedded within the circuitry comprising the state machine or logic circuitry. The channel mixer 1040 performs the functions as generally described in the preceding figures and further performs the functions described in FIGS. 42-49.

FIG. 42 illustrates a logic diagram of a method for mixing channels within a multimedia system. The process begins at Step 1050 where a set of channels is received as encoded channel data. The process then proceeds to Step 1051 where the channel mixer interprets the encoded channel data to identify a channel of interest for each specific channel selection request it is processing. For example, the set of channels may be received as packets containing the encoded channel data from a tuning module. Each packet includes a header section and a payload section. The encoded channel data may be interpreted by reviewing the header section to identify the particular channel of interest. The channel of interest may be identified based on the identity of a source of the channel data, the identity of the client requesting it, and/or the multimedia resources processing the channel request.

If the channel of interest is included within a group of compressed video channels, as would be the case for MPEG 2 encoded video data, the channel of interest is retrieved from one of the group of compressed video channels based on header information contained within the packets transporting the encoded channel data. Having identified the particular channel of interest, it is isolated from the group of compressed video channels.

The interpretation of Step 1051 may further be described with reference to Step 1056-1060. At Step 1056, the channel mixer interprets the encoded channel data to identify a series of channels of interest from the set of channels based on a corresponding series of channel selection request. In other words, the channel mixer is identifying each channel of interest for each channel selection request being processed. The process then proceeds to Step 1058 where the channel mixer processes data each of the series of channels of interest based on the type of channel to produce a series of generic data. The type of channel may be audio data, video data, text data, and/or a combination thereof. The processing then proceeds to Step 1060 where the series of generic data is converted into a stream of data.

Returning to the main flow of FIG. 42 with processing of a single channel selection request, the process continues at Step 1052 where the channel mixer processes data of the channel of interest based on the type of channel to produce generic data. The processing may include decoding the data, filtering the data to isolate the particular channel of interest and then converting the data to the generic data based on the type of data. For example, when the type of data is multi-channel compress video, the processing includes filtering the multi-channel compress video to produce the channel of interest. The channel of interest is then converted to generic data, which will be described in greater detail with reference to FIGS. 43 and 44.

Continuing with the examples of the type of data, when the type of data is single channel compress video, the processing includes passing the single channel compress video as the channel of interest. When the type of data is multi-channel digitized video data, the multi-channel digital video data is filtered to produce the channel of interest; when the type of data is single channel digitized video data, it is passed as the channel of interest; when the type of data is multi-channel digital audio, it is filtered to produce the channel of interest; when the type of data is single channel digital audio, it is passed as the channel of interest; and, when the type of data is network carrier data, it is passed as the channel of interest. As such, the channel of interest is then converted to the generic data. The process then proceeds to Step 1054 where the generic data is converted into a stream of data.

FIG. 43 illustrates a logic diagram of a method that further describes the processing of the data of the channel of interest as generally described in Step 1052 of FIG. 42. The processing may be done in any one or more of Steps 1070-1082. At Step 1070, the channel mixer converts video data of the channel of interest into generic video data when the type of data is multi-channel compressed video. Typically, multi-channel compress video will be received via a satellite connection where the data is MPEG, or other MPEG standardized encoding.

At Step 1072, the channel mixer converts video data of the channel of interest into generic video data when the type of data is single channel compress video. Single channel compress video may be from a DVD player or other source that produces a single channel of MPEG 2, or other MPEG standard, encoded video data.

At Step 1074, the channel mixer converts video data of the channel of interest into generic data when the type of data is multi-channel digitized video data. The multi-channel digitized video data may be received from a plurality of NTSC television tuners, et cetera.

At Step 1076, the channel mixer converts video data of the channel of interest into generic video data when the type of data is single channel digitized video data. The single channel digitized video data may be received as the output of a VCR, output of a DVD player to a standard antenna or cable connection of a television set, an NTSC television tuner, et cetera.

At Step 1078, the channel mixer converts audio data of the channel of interest into generic audio data when the type of audio data is multi-channel digital audio. Multi-channel digital audio signals may be received from a satellite broadcast, or from multiple digital audio sources, such as a CD player, DVD audio player, et cetera.

At Step 1080, the channel mixer converts audio data of the channel of interest into generic audio data when the type of audio data is single channel digital audio. The single channel digital audio may be received from a CD player, MP3 player, system memory that is storing digitized audio, DVD audio player, et cetera.

At Step 1082, the channel mixer passes network data as the channel of interest when the data being processed is network data. Network data corresponds to one or more client modules accessing the Internet, participating in a telephone conversation via the PSTN, and/or client-to-client communication.

FIG. 44 illustrates a logic diagram that further defines the processing of the data of Step 1052 of FIG. 42 when the data is being converted into generic video data. This may be done in one or more of Steps 1084-1092.

At Step 1084, the channel mixer converts the video data of the channel of interest into MPEG formatted video data. The video data may be the multiple compress video, the single channel compress video, the multi-channel digitized video data, and/or the single channel digitized video data.

At Step 1086, the channel mixer converts the video data of the channel of interest into JPEG formatted video data. At Step 1088, the channel mixer converts the video data of the channel of interest into M-JPEG formatted video data.

At Step 1090, the channel mixer converts the video data of the channel of interest into digital RGB video data. The digital RGB data may be stored in the associated memory device of the multimedia server, stored in the host system memory, et cetera.

At Step 1092, the channel mixer converts the video data of the channel of interest into digital YCBCR video data. The digital YCBCR video data may be stored in the multimedia server memory, the host system memory associated with the multimedia server, et cetera.

As one of average skill in the art will appreciate, the incoming video data from a plurality of multimedia sources may be in a variety of video formats including digitized audio MPEG 1, MPEG 2, et cetera, analog format, et cetera. The various formatted video data is converted by the channel mixer into a generic video format, which may be MPEG, JPEG, M-JPEG, digital RGB video data, digital YCBCR video data, and/or any other conventional technique for storing video information in a digital format.

FIG. 45 illustrates a logic diagram of a method that further defines the processing of Step 1052 of FIG. 42 when audio data is being converted into generic audio data. The processing may be done by implementing one or more of Steps 1100-1104.

At Step 1100, the channel mixer converts the audio data of the channel of interest into MPEG formatted audio data. At Step 1102, the channel mixer converts the audio data of the channel of interest into MP3 formatted audio data. At Step 1104, the channel mixer converts the audio data of the channel of interest into PCM digitized audio data.

As one of average skill in the art will appreciate, the multimedia server may receive a plurality of audio signals having various audio data formats. The channel mixer converts the various audio formats into a single audio format such as MPEG audio, MP3 audio, and/or PCM digitized audio. As one of average skill in the art will further appreciate, by converting video data and audio data into generic data formats, the multimedia server more readily processes it. The processing of the generic data has been generally described to convert the generic data into a specific formatted data (e.g., MPEG 2 video and audio), before transmission to the plurality of clients.

FIG. 46 illustrates a logic diagram of a method that further describes the converting of the generic data into a stream of data of Step 1054 of FIG. 42. The processing begins at Step 1110 where the channel mixer determines the type of data of the channel of interest. The processing then proceeds to Step 1112 where the channel mixer converts the generic data into the stream of data based on the type of data. The conversion processing at Step 1112 may be further described in one or more of Steps 1114-1126.

At Step 1114, the channel mixer converts the generic video data of the channel of interest into specific video data when the original data was multi-channel compressed video. The specific video data may be in accordance with the MPEG 2 standard, MPEG 1 standard, and/or any of the other MPEG standards, or other standardized process for conveying digitized video.

At Step 1116, the channel mixer converts the generic video data of the channel of interest into the specific video data when the original video data was a single channel compressed video signal. At Step 1118, the channel mixer converts the generic video data of the channel of interest into the specific video data when the original video data was multi-channel digitized video data. At Step 1120, the channel mixer converts the generic video data of the channel of interest into the specific video data when the original video data was a single channel digitized video signal.

At Step 1122, the channel mixer converts the generic audio data of the channel of interest into specific audio data when the original audio data was multi-channel digital audio. At Step 1124, the channel mixer converts the generic audio data of the channel of interest into specific audio data when the type of data is single channel digital audio. Note that the specific audio data may be in accordance with the MPEG 2 format, MP3 format, PCM encoded audio, et cetera.

At Step 1126, the channel mixer passes network data of the channel of interest without conversion to a specific format. Accordingly, the network data is passed via the channel mixer without conversion to a specific format, however, it is mixed with the other channels of interest to produce the stream of channel data.

FIG. 47 illustrates a logic diagram of a method for converting the generic video data of the channel of interest into an MPEG 2 specific video data format. The processing begins at Step 1130 where the channel mixer performs a motion prediction on the generic video data to produce motion prediction data. The process then proceeds to Step 1132 where the channel mixer performs a discrete cosine transform on the motion prediction data to produce DCT data. The process then proceeds to Step 1134 where the channel mixer quantizes the DCT data to produce quantized data. The process then proceeds to Step 1136 where the channel mixer zigzags processes the quantized data to produce ZZ data. The process then proceeds to Step 1138 where the channel mixer Huffman encodes the ZZ data to produce the MPEG 2 specific video formatted data. As one of average skill in the art will appreciate, Steps 1130-1138 are known in the art, thus no further discussion will be presented except to further illustrate the concepts of the present invention.

FIG. 48 illustrates a logic diagram that further defines the processing of Step 1052 of FIG. 42. The processing begins at Step 1140 where the channel mixer receives a control signal that indicates multiple channel processing, when the channel of interest is a compressed video signal and one of many compressed video channels. The process then proceeds to Step 1142 where the channel mixer decompresses the multiple compressed video channels to produce multiple channels. The process then proceeds to Step 1144 where the channel mixer processes data of the multiple channels based on the type of channel to produce multiple generic data. The process then proceeds to Step 1146 where the channel mixer converts the multiple generic data into the stream of data.

As one of average skill in the art will appreciate, MPEG encoded video received via a satellite connection, or other type connection, typically includes multiple channels within a typical 6 Mhz band. As such, multiple channels are received within the typical single channel band. As such, the video for the channels in the single channel band are decompressed to retrieve the actual video data. From there, the channel of interest may be extracted and processed accordingly, or all of the channels within the band may be processed into the stream of data.

As one of average skill in the art will further appreciate, the stream of data is essentially a multiplexing of the specific formatted video data for each of the channel of interest. As such, when two channels of interest are being conveyed to the plurality of client modules, each channel comprises approximately 50% of the stream of data. Accordingly, as the number of channels of interest is being processed, the corresponding percentage of the stream of data decreases but decreases proportionally.

Figure 49:
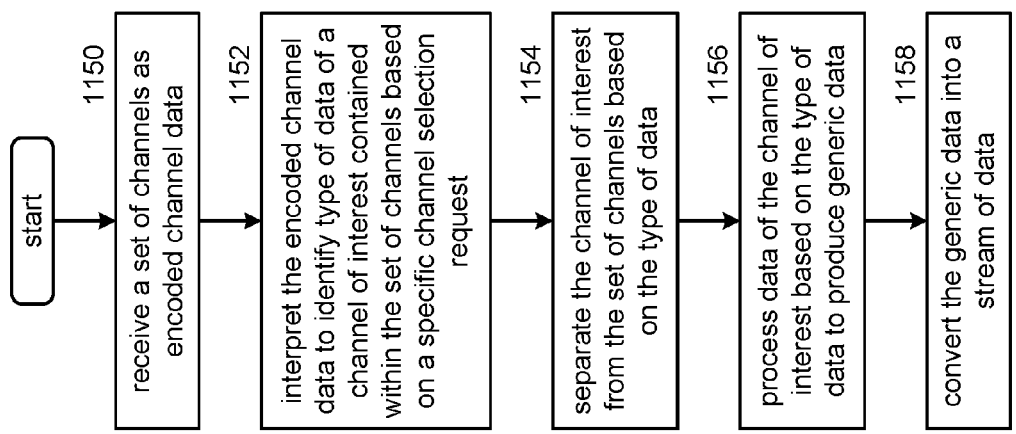
FIG. 49 illustrates a logic diagram of an alternate method for mixing channels in accordance with the present invention.

FIG. 49 illustrates an alternate logic diagram of a method for channel mixing of signals within a multimedia communication system. The process begins at Step 1150 where a channel mixer receives a set of channels as encoded channel data. The process then proceeds to Step 1152 where the channel mixer interprets the encoded channel data to identify the type of data of a particular channel of interest contained within the set of channels. The interpretation is based on a specific channel selection request received via one of the plurality of clients. The encoded channel data may be received in packets and/or frames where the packets and frames each include a header section that provides identifying information such that the channel mixer may appropriately identify the particular channel of interest. In addition, the interpretation of the encoded channel data may further include determining the filtering requirements to extract the channel of interest from a plurality of channels.

The processing proceeds to Step 1154 where the channel mixer separates the channels of interest from the set of channels based on the type of data. The process then proceeds to Step 1156 where the channel mixer processes the data of the channels of interest based on the type of data to produce generic data. Such processing was previously described with reference to FIGS. 43-46. The process then proceeds to Step 1158 where the channel mixer converts the generic data into a stream of data. This was previously described with reference to FIGS. 46 and 47.

Figure 50:
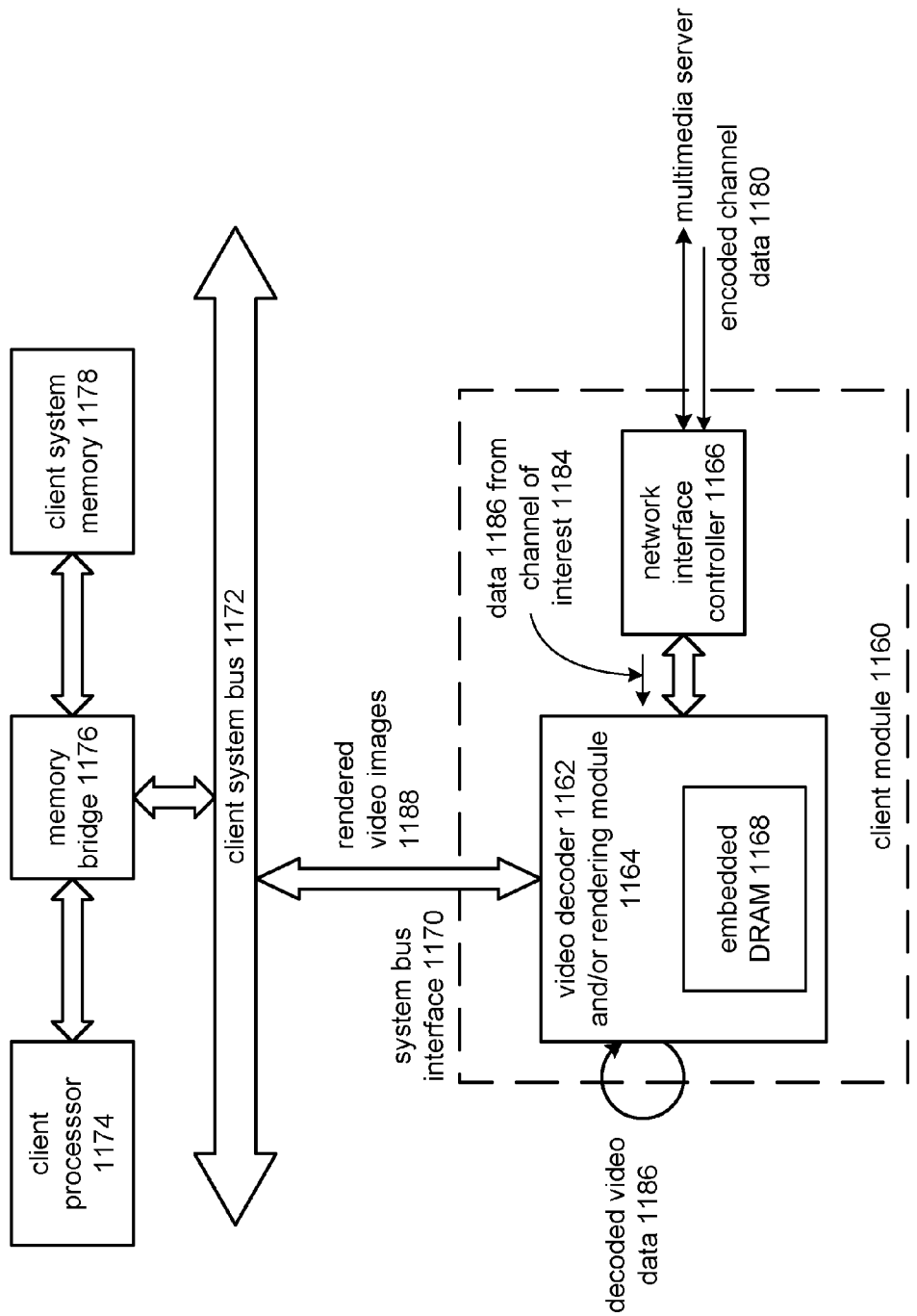
FIG. 50 illustrates a schematic block diagram of a client module operably coupled to a client in accordance with the present invention.

FIG. 50 illustrates a schematic block diagram of a client module 1160 operably coupled to a client device. The client module 1160 may be any of the client modules illustrated in FIGS. 1-11. The client module 1160 includes a video decoder 1162 and/or rendering module 1164, embedded dynamic random access memory (DRAM) 1168, and a network interface controller 1166. The client device includes a client system bus 1172, a client processor 1174, memory bridge 1176 and client system memory 1178. The client device may be a laptop computer, personal computer, personal digital assistant, CRT monitor, flat panel monitor, television set, high definition television set, a SDTV, a home theatre system, and/or any device that has an audio and/or video display associated with it.

The client module 1160 is operably coupled to the client system bus 1172 via a system bus interface 1170. The system bus interface 1170 may couple the client module 1160 to external serial and/or parallel ports of the client device and/or internal interfaces within the client device. Such external interfaces include universal serial bus (USB), serial port, IR port, parallel port, et cetera. Internal connections include PCI bus, AC 97 interface, and/or any interface that allows a peripheral component to interface with the memory bridge of a host device.

The network interface controller 1166 is operably coupled to the multimedia server, which may be any one of the multimedia servers shown in FIGS. 1-11. The network interface controller 1166 receives packets and/or frames from the multimedia server and extract data 1186 for a channel of interest 1184. In essence, the network interface controller 1166 monitors the packets on the communication path with the multimedia server to identify packets that are addressing the client module 1160. When such packets and/or frames are identified, the network interface controller extracts the data 1186 from the frames and/or packets and provides the data to the video decoder 1162 and/or the rendering module 1164.

The video decoder 1162 decodes the data 1186 to produce display data. The display data may be stored in the embedded memory 1168. The rendering module 1164 retrieves the display data from the embedded memory 1168 and provides it as rendered video images 1188 to the client device. As such, the rendering module 1164 prepares the data for display by a display of the client device.

Figure 51:
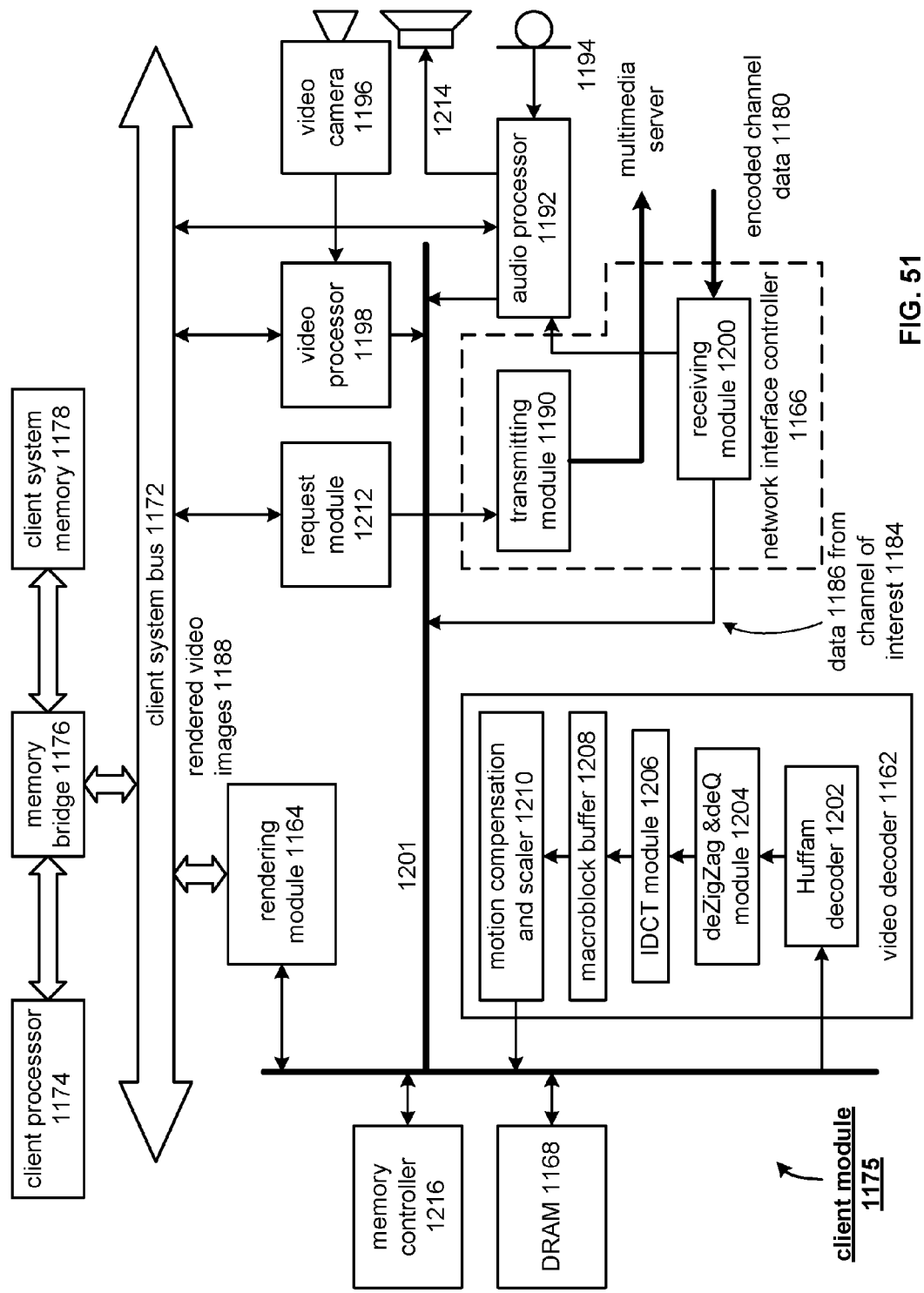
FIG. 51 illustrates a more detailed schematic block diagram of a client module operably coupled to a client in accordance with the present invention.

FIG. 51 illustrates a more detailed schematic block diagram of a client module 1175 which may be used to implement any one of the client modules illustrated in FIGS. 1-11. The client module 1175 includes the rendering module 1164, a memory controller 1216, the memory device 1168, an internal bus 1201, the video decoder 1162, the network interface controller 1166, a request module 1212, a video processor 1198, a video camera 1196, at least one speaker 1214, a microphone 1194, and an audio processor 1192. The video decoder 1162 includes a Huffman decoder 1202, a dezigzag and dequantizer module 1204, an inverse discrete cosine transform module 1206, a macroblock buffer 1208, and a motion compensation and scaler 1210. The function of the video decoder 1162 is known, thus no further discussion of the video decoder or its components will be provided except to further illustrate the concepts of the present invention.

The network interface controller 1166 includes a transmitting module 1190 and the receiving module 1200. The receiving module 1200 receives encoded channel data 1180, which may be in packet form, or in frames. The receiving module interprets the packets and/or frames to extract data 1186 for the particular channel of interest 1184. The extracted data is placed on bus 1201 for storage and RAM 1168. The data 1186 is subsequently retrieved from memory 1168 by the video decoder 1162 to produce decoded video data. The decoded video data is stored once again in the memory 1168. The rendering module 1164 subsequently retrieves the decoded video data from memory 1168 and processes it to produce rendered video images 1188. The rendered video images 1188 are then provided onto the client system bus 1172 for subsequent display. Note that the client device includes a display, which includes a video display and/or audio display.

If the encoded channel data 1180 includes frames and/or packets of audio data for the client module 1175, the receiving module 1200 provides the audio data to audio processor 1192, which prefers the audio data for display. The prepared audio data may be stored in 1168 for subsequent playback or provided to the client system bus 1172.

In addition, the audio processor 1192 may receive audio signals via microphone 1194. The audio processor 1192 processes the audio signals from microphone 1194 and either provides them to the client system bus 1172 or to the memory 1168. If the audio data from microphone 1194 is to be transmitted to the multimedia server, the transmitting module 1190 subsequently retrieves the audio data from 1168 and provides it to the multimedia server.

The request module 1212 receives the selection request from the client device. As previously discussed, the selection request identifies the particular channel of interest that the client desires to access from the multimedia server. The transmitting module 1190 prepares the selection request for transmission to the multimedia server via the communication path. The transmitting module 1190 utilizes an encoding and/or modulation scheme in accordance with the data conveyance protocol of the multimedia communication system.

The client module 1175 may also include interfacing for receiving video signals from a video camera 1196 via video processor 1198. The video processor 1198 processes video signals from the video camera 1196 and either provides them to the client system bus 1172 or stores them in RAM 1168. If the stored video signals are to be provided to the multimedia server, the transmitting module 1190 retrieves the video data from RAM 1168 and prepares them for transmission. The preparation of video data for transmission is in accordance with the data conveyance protocol used within the multimedia communication system. As one of average skill in the art will appreciate, the memory controller 1216 controls the reading and writing of data to and from RAM 1168. As one of average skill in the art will also appreciate, the client module 1175 may have interfaces for connecting to an audio processor 1192 and/or video processor 1198, where such devices may be included in the client device.

FIG. 52 illustrates a schematic block diagram of a client module 1220, which may be used to implement any one of the client modules illustrated in FIGS. 1-11. The client module 1220 includes a processing module 1222 and memory 1224. The processing module 1222 may be similar to the processing module 364 used in the client module of FIG. 11 and memory 1224 may be similar to memory 366 used in the client module of FIG. 11. The processing module 1222 may be a single processing device or a plurality of processing devices. Such a processing device may be a microcontroller, microcomputer, microprocessor, digital signal processor, central processing unit, programmable gate array, state machine, logic circuitry, and/or any device that manipulates signals (analog or digital) based on operational instructions. The memory 1224 may be a single memory device or a plurality of memory devices. Such a memory device may be a read-only memory, random access memory, system memory, floppy disk memory, hard drive memory, magnetic tape memory, flash memory, and/or any device that stores digital information. Note that when the processing module 1222 implements one or more of its functions via a state machine or logic circuitry, the memory storing the corresponding operational instructions is embedded within the circuitry comprising the state machine and/or logic circuit. The operational instructions performed by processing module 1222 and stored in memory 1224 are illustrated as logic diagrams as shown in FIGS. 53-56.

FIG. 53 illustrates a logic diagram of a method for processing data within a client module. The processing begins at Step 1240 where the client module transmits a channel selection request that identifies a channel of interest. The channel selection request is provided to a multimedia server which, subsequently responds by providing a stream of channel data that wherein at least a portion of the stream of data includes data corresponding to the channel of interest.

The process continues at Step 1230 where the client module receives the set of channels as a stream of data from a multimedia server. The receiving may further include decoding the stream of data to recapture data of the channel of interest (i.e., the channel corresponding to the one requested by the client module's client). The decoding may include one or more of multi-level decoding, non-return to zero decoding, Manchester decoding, block decoding, and/or nB/mB decoding where n<m.

The process then proceeds to Step 1232 where the client module interprets segments of the stream of data to identify data corresponding to the channel of interest. The segments may be frames and/or packets of data that include header information. The header information includes identity of the client module, the source of the data, et cetera such that the client module may readily identify the particular packets and/or frames destined for the client module. The process then proceeds to Step 1234 where the client module interprets the data of the channel of interest to determine the type of data, where the type of data may be audio data, video data, and/or text data.

The process then proceeds to Step 1236 where the client module processes the data of the channel of interest based on the type of data to produce processed data. The process then proceeds to Step 1238 where the client module provides the processed data to the client for display.

Figure 54:
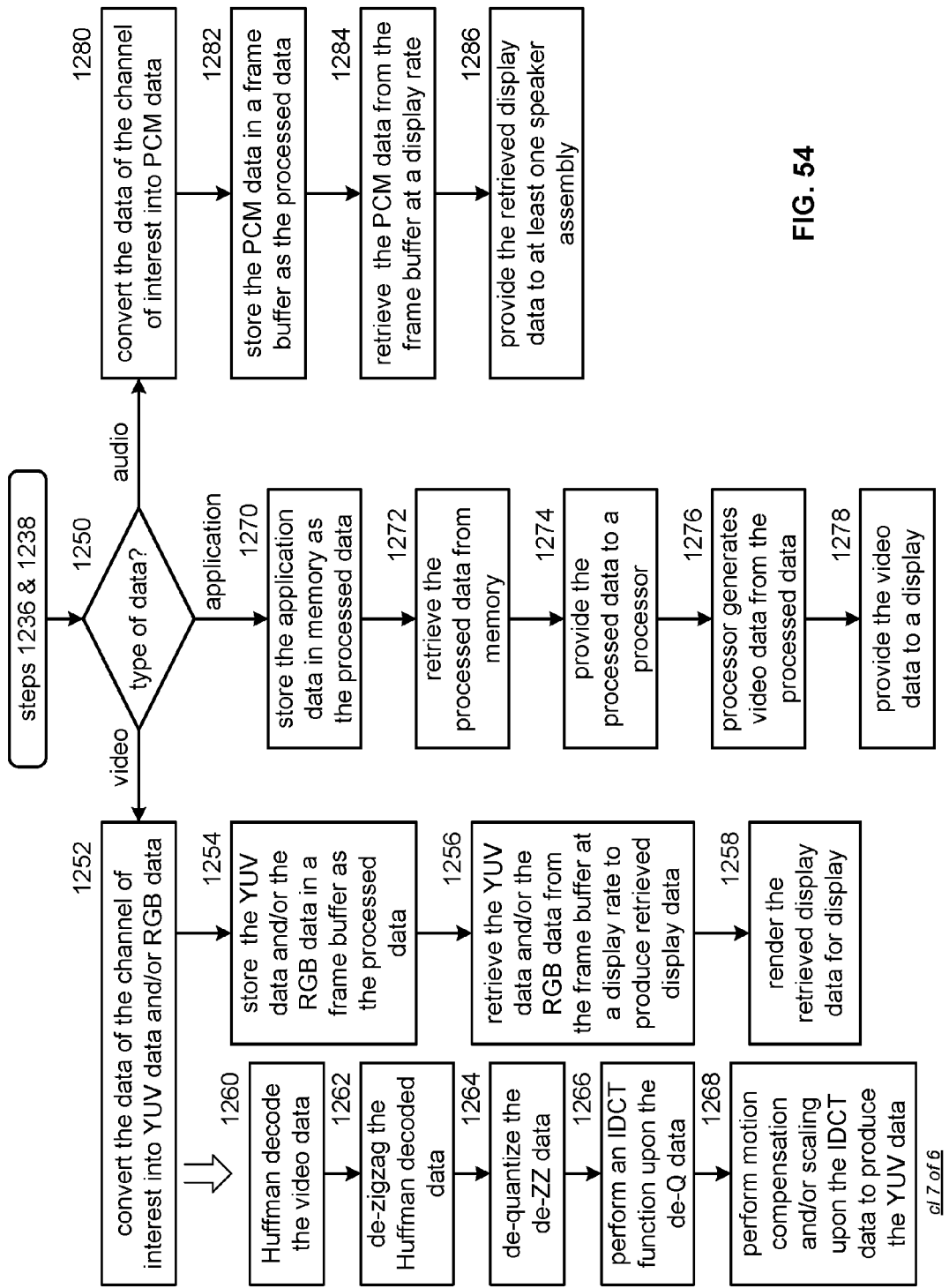
FIG. 54 illustrates a logic diagram of a method that further describes Steps 1236 and 1238 of FIG. 53.

FIG. 54 illustrates a logic diagram of a method that further describes Steps 1236 and 1238 of FIG. 53. The processing begins at Step 1250 where the type of data is determined. The type of data may be video data, application data, and/or audio data. For video data, the process proceeds to Step 1252 where the client module converts the data of the channel of interest into YUV data and/or RGB data. When the data is received in MPEG format, the conversion may be done as shown in Steps 1260-1268. At Step 1260, the client module utilizes a Huffman decoder to decode the video. The process then proceeds to Step 1262 where the Huffman decoded data is dezigzagged.

The process then proceeds to Step 1264 where the dezigzagged data is dequantized. The process then proceeds to Step 1266 where the dequantized data has an inverse discrete cosine transform function performed upon it. The process then proceeds to Step 1268 where motion compensation and/or scaling function is performed upon the IDCT data to produce the YUV data. The YUV data may then be converted into RGB data and stored in memory. As one of average skill in the art will appreciate, both YUV data and RGB data may be maintained for use by the client module and/or associated client device.

Returning to the flow of processing video data, the process continues at Step 1254 where the YUV data and/or the RGB data is stored in a frame buffer (e.g., the memory of the client module and/or memory of the client device) as the processed data. The process then proceeds to Step 1256 where the client module retrieves the YUV data and/or RGB data from the frame buffer at a display rate to produce retrieved display data. The process then proceeds to Step 1258 where the client module renders the retrieved display data for display. The rendered data is provided to the client device for subsequent display.

If the type of data is audio data, the process proceeds to Step 1280. At Step 1280, the client module converts the audio data of the channel of interest into PCM data. The process then proceeds to Step 1282 where the client module stores the PCM data in a frame buffer (e.g., the RAM within the client module and/or memory of the client device) as processed data. The process then proceeds to Step 1284 where the client module retrieves the PCM data from the frame buffer at a display rate. The process then proceeds to Step 1286 where the client module provides the retrieved display data to at least one speaker assembly either associated with the client module and/or within the client device.

If the type of data is application data, the process proceeds to Step 1270. At Step 1270, the client module stores the application data in memory as the processed data. Note that the application data corresponds to data received via an Internet connection, client-to-client communication, and/or telephone communication. The process then proceeds to Step 1272 where the client module retrieves the processed data from memory. The process then proceeds to Step 1274 where the client module provides the processed data to a processor. The processor may be within the client device and/or the processor within the client device.

The process then proceeds to Step 1276 where the processor generates video data from the processed data. The process then proceeds to Step 1278 where the video data is provided for display by the client device.

Figure 55:
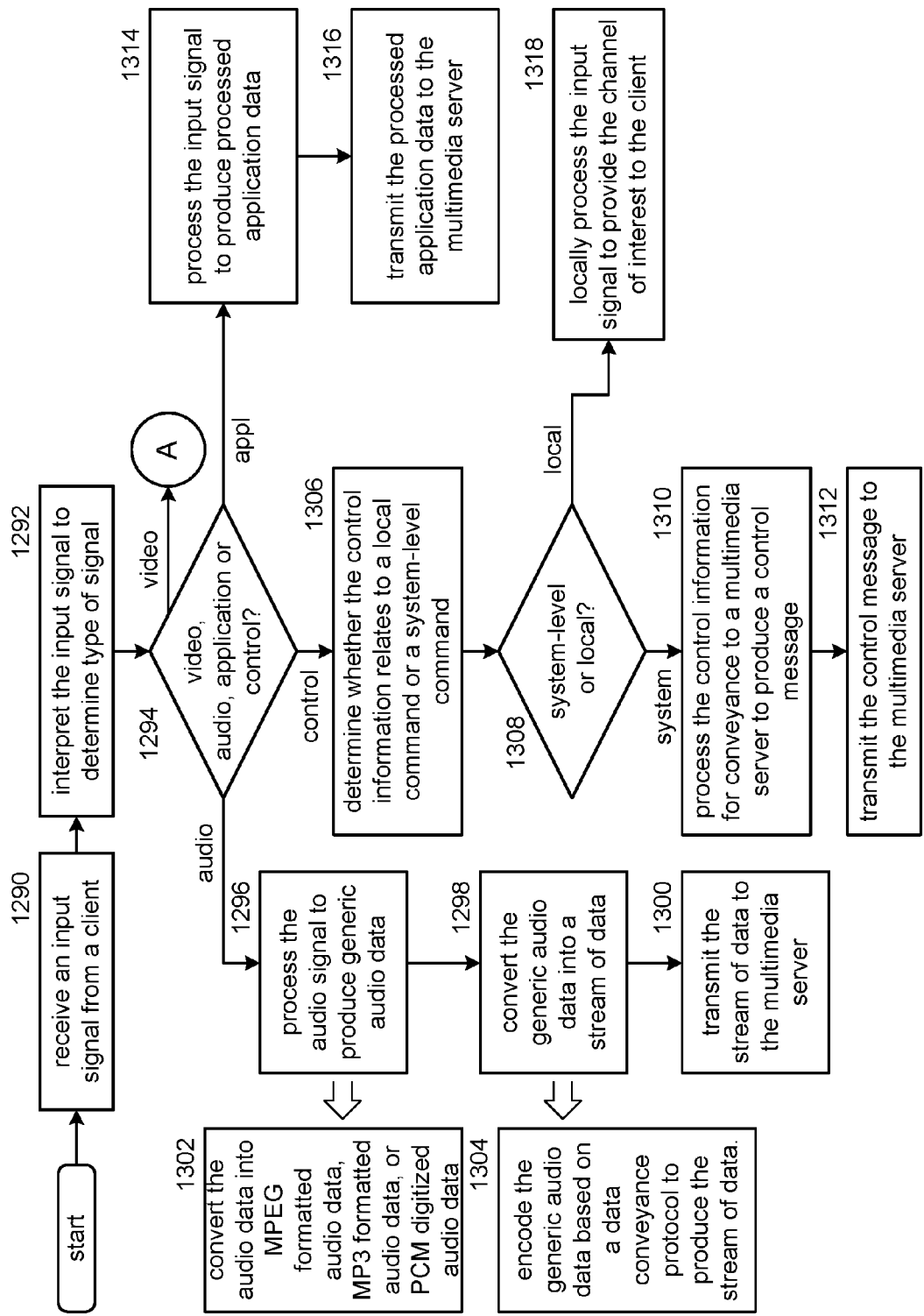
FIG. 55 illustrates a logic diagram of an alternate method for processing data within a client module in accordance with the present invention.
Figure 56:
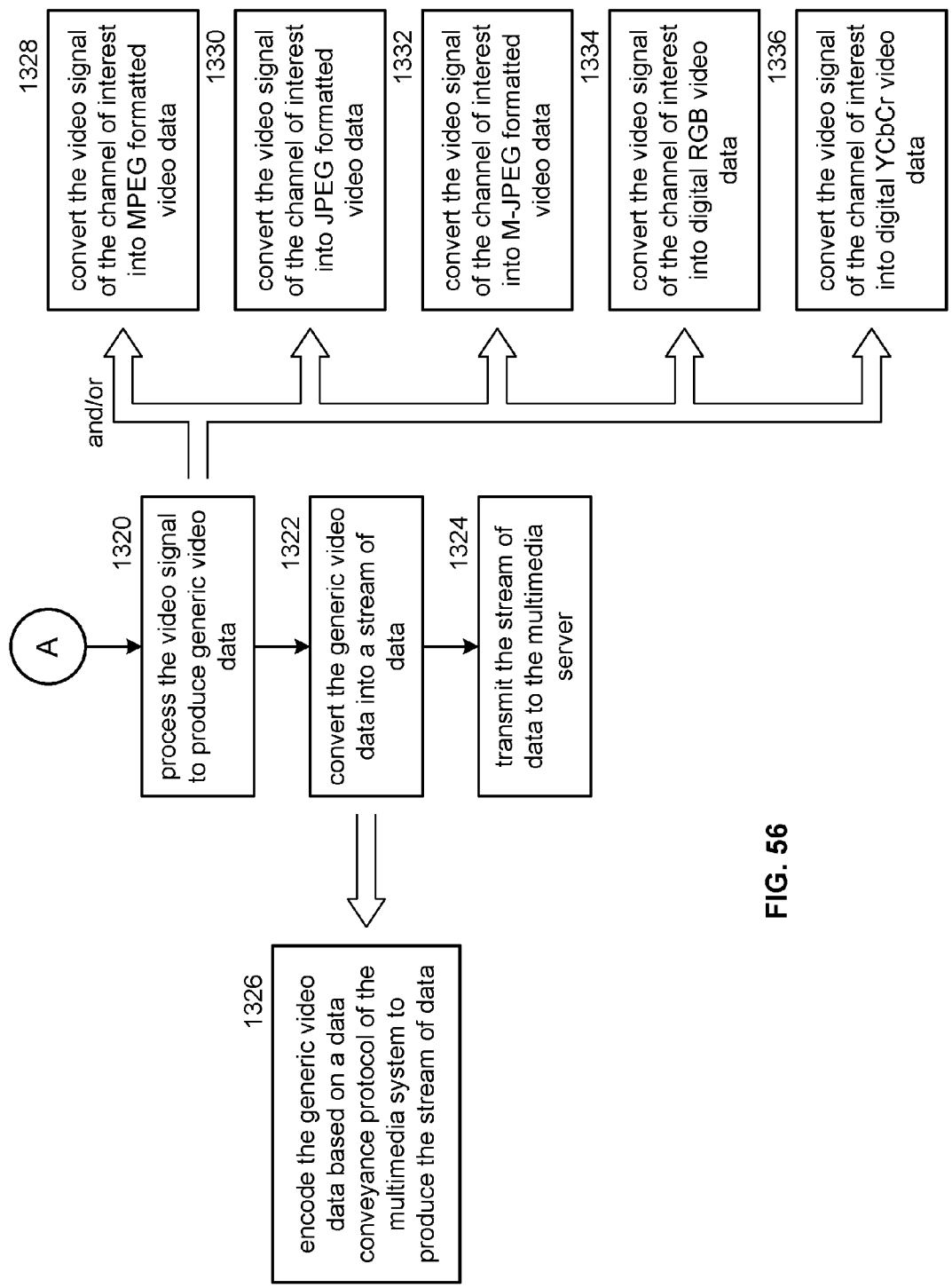
FIG. 56 illustrates a logic diagram of an extension of the method illustrated in FIG. 55.

FIGS. 55 and 56 illustrate a logic diagram of an alternate method for a client module to provide a channel selection request and receive corresponding data within a multimedia system. The process begins at Step 1290 where the client module receives an input from a client. The input signal may be received an interface with the client where the client includes at least one of a personal computer, laptop computer, personal digital assistant, video telephone, digital telephone, cellular telephone, monitor, CRT monitor, LCD monitor, television set, high definition television set, and/or any device that includes a video and/or audio display device. In addition, the interface with the client device between the client module may include a wireless communication path such that the remote control device associated with the client device provides the input signal to the client module.

The process then proceeds to Step 1292 where the client module interprets the input signal to determine the type of signal being requested. The process then proceeds to Step 1294 where the client module determines that the type of signal as either video, audio, application or control. If the type of signal is audio, the process proceeds to Step 1296 where the client module processes the audio signal to produce generic audio data. This may be done as shown at Step 1302 where the client module converts the audio data into MPEG formatted audio data, MP3 formatted audio data, and/or PCM digitized audio data.

The process then proceeds to Step 1298 where the client module converts the generic audio data into a stream of data. This may be done as shown in Step 1304 where the client module encodes the generic audio data based on a data conveyance protocol to produce the stream of data. The type of encoding may include one or more of multi-level encoding, non-return to zero encoding, Manchester encoding, block encoding, and/or nB/mB encoding where n<m.

The process then proceeds to Step 1300 where the client module transmits the stream of data to the multimedia server. The transmission of the stream of data includes packetizing and/or framing the data in accordance with the data conveyance protocol used by the multimedia communication system. In addition, the transmission of the stream of data may include utilizing a modulation scheme such as TDM, FDM, ASK, PSK, et cetera.

If the client module determines that the type of signal is control signals, the process proceeds to Step 1306. At Step 1306, the client module determines whether the control information relates to a local command or a system level command. The process then proceeds to Step 1308 where the client module determines the system level or local level command. If it is a system level command, the process proceeds to Step 1310 where the client module processes the control information for conveyance to the multimedia server to produce a control message. The processing of the control information may include encoding the control message based on the data conveyance protocol of the multimedia communication system, and utilizing the data conveyance protocol which may include packetizing and/or framing the data as well as utilizing a modulation scheme such as CSMA, CSMA with collision avoidance, and/or CSMA with collision detection for packets of data and time division multiplexing and/or frequency division multiplexing for frames of data.

The processing then proceeds to Step 1312 where the client module transmits the control message to the multimedia server. The control message may include the channel selection request, which identifies the particular channel of interest for processing by the client module.

If the type of control information relates to a local command, the process proceeds to Step 1318. At Step 1318, the client module locally processes the input signal to provide the channel of interest to the client. Accordingly, the client module may interpret the control information, which includes a channel selection request and determines that another client is already accessing that particular channel. As such, the client module simply extracts the channel data destined for the other client and utilizes it to service its client.

If the client module determines that the type of signal is application related, the process proceeds to Step 1314. At Step 1314, the client module processes the input signal to produce processed application data. The application data may be data related to a network application such as email and/or web browser, a telephone communication, and/or a client-to-client communication. Such processing for a telephone communication would include the similar functionality that the handset performs in a cordless telephone.

The processing for data within the Internet access is simply functioning as a terminal to provide input selections and/or received data from the multimedia server, which performs the network applications. The process then proceeds to Step 1316 where the client module transmits the process application data to the multimedia server. The process application data is formatted in accordance with the data conveyance protocol of the multimedia communication system, which includes encoding and/or a modulation scheme.

As shown in FIG. 56, if the type of signal is video, the processing continues at Step 1320. At Step 1320, the client module processes the video signal to produce generic video data. This may be done in one of a variety of ways as shown in Steps 1328-1336. At Step 1328, the client module converts the video signal of the channel of interest into MPEG formatted video data. At Step 1330, the client module converts the video signal of the channel of interest into JPEG formatted video data. At Step 1332, the client module converts the video signal of the channel of interest into MPEG formatted video data. At Step 1334, the client module converts the video signal of the channel of interest into digital RGB video data. At Step 1336, the client module converts the video signal of the channel of interest into digital YCBCR video data. As one of average skill in the art will appreciate, the client module is performing a similar function as the multimedia server performs when conveying video and/or audio data to the multimedia server.

Returning to the main processing of video data, the process continues at Step 1322 where the client module converts the generic video data into a stream of data. This may be done as shown at Step 1326 where the client module encodes the generic video data based on a data conveyance protocol of the multimedia communication system. The data conveyance protocol may include a particular type of encoding such as Manchester encoding, multi-level encoding, et cetera and also a corresponding modulation scheme such as FDMA, TDMA, CSMA, CSMA with collision avoidance, or CSMA with collision detection. The process then proceeds to Step 1324 where the stream of data is transmitted as either packets or frames to the multimedia server.

Figure 57:
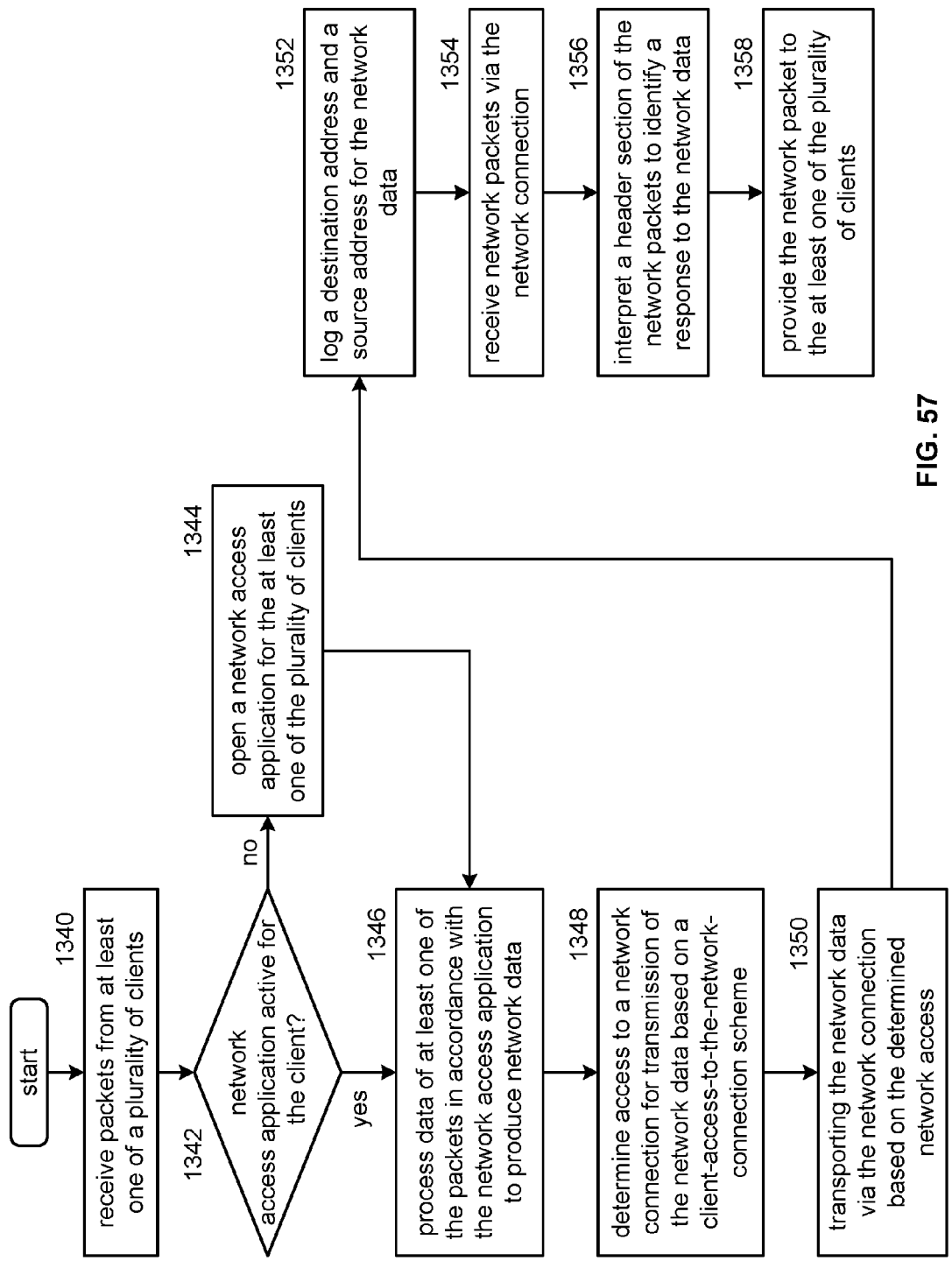
FIG. 57 illustrates a logic diagram of a method for a multimedia server to provide network connection for clients in accordance with the present invention.

FIG. 57 illustrates a logic diagram of a method for a multimedia server to act as a hub based network access module for a plurality of client modules. The processing steps shown in FIG. 57 as well as in FIGS. 58-62 may be performed by the multimedia server of FIGS. 2, 7 and/or 11. The processing begins at Step 1340 where the multimedia server receives packets from at least one of a plurality of clients. The process then proceeds to Step 1342 where the multimedia server determines whether a network access application is active for the particular client. If not, the process proceeds to Step 1344 where the multimedia server opens a network access application for the client.

Once the network access application is open, or if the application was already open, the process proceeds to Step 1346. At Step 1346, the multimedia server processes data of at least one of the packets in accordance with the network access application to produce network data. The network access application may be an email application, web browser application, and/or any application that allows a user to access the Internet or other wide area network. The process then proceeds to Step 1348 where the multimedia server determines how to access a network connection (e.g., a modem) for transmission of the network data. Accessing the network connection is based on a "client access to network connection scheme", which will be subsequently discussed. The process then proceeds to Step 1350 where the multimedia server transports the network data via the network connection to a wide area network based on the determined network access.

The process then proceeds to Step 1352 where the multimedia server logs a destination address and/or source address for each packet of network data transmitted via the network connection. The logging enables the multimedia server to accurately track the appropriate destination within the multimedia communication system for the received data when it receives a response via the wide area network. The process then proceeds to Step 1354 where the multimedia server receives network packets via the network connection. The process then proceeds to Step 1356 where the multimedia server interprets a header section of the network packets to identify a response to the network data. The response includes an identifier that identifies the particular destination within the multimedia communication system. The process then proceeds to Step 1358 where the multimedia server provides the network packets to the particular client associated with the network data.

FIG. 58 illustrates a logic diagram that further defines the determination of whether the network access application is active as shown in Step 1342 of FIG. 57. The processing begins at Step 1360 where the multimedia server interprets a header section of at least one of the packets received from the client to identify the individual client. The process then proceeds to Step 1362 where the multimedia server interprets the header section to determine the particular type of network access being requested. The process then proceeds to Step 1364 where the multimedia server determines whether the network application is active based on the identity of the particular client and the type of network access being requested.

FIG. 59 illustrates a logic diagram for the determination of the particular type of network access of Step 1362 of FIG. 58. This may be done at either Step 1366 or Step 1368. At Step 1366, the multimedia server interprets the header section of the at least one packet to determine email network access. At Step 1368, the multimedia server interprets the header section of the packet or packets to determine a web browser network access.

FIG. 60 illustrates a logic diagram of a method that further describes the determination of access to the network connection of Step 1348 of FIG. 57. This may be done in one or more of Steps 1370-1378. At Step 1370, the multimedia server utilizes a time division multiplexing accessing scheme to provide access to the network connection for each of the clients that currently have an active network access application. At Step 1372, the multimedia server utilizes a carrier sensed multiple access process to determine the access to the network connection among the clients that currently have an active network access application.

At Step 1374, the multimedia server utilizes a token passing scheme among the clients that currently have an active network access application to determine access to the network connection. At Step 1376, the multimedia server utilizes a queuing scheme of the network data for each client that has a currently active network access application open. The queuing scheme may be based on a first-in first-out buffering arrangement. At Step 1378, the multimedia server responds to a request for access to the network connection from the resources within the channel mixer processing the particular request.

Figure 61:
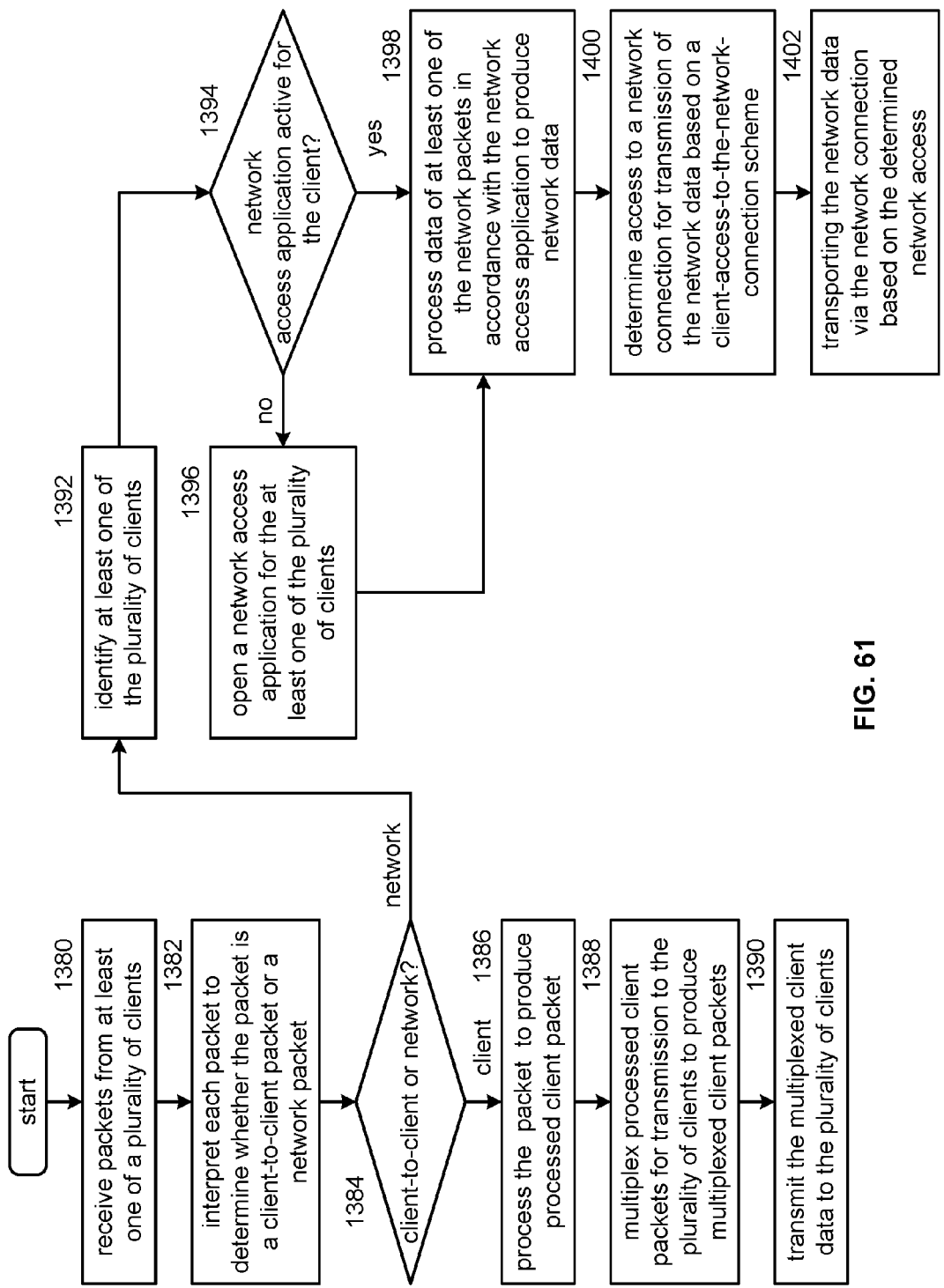
FIG. 61 illustrates a logic diagram of a method for processing client-to-client communications and network communications within a multimedia server communication system in accordance with the present invention.

FIG. 61 illustrates a logic diagram of an alternate method for a multimedia server to act as a hub based network access connection for a plurality of clients. The processing begins at Step 1380 where the multimedia server receives packets from at least one of a plurality of clients. The process then proceeds to Step 1382 where the multimedia server interprets each packet to determine whether the packet is a client-to-client packet or network packet. The interpretation is done by reviewing the header section of the packet, which includes an indication as to whether it is client-to-client data or network data.

The process then proceeds to Step 1384 where the multimedia server determines whether the packet relates to client-to-client data or network data. For client-to-client data, the process proceeds to Step 1386 where the multimedia server processes the packet to produce processed client packets. Such processing includes packetizing the client-to-client communication for subsequent transmission to one or more other clients within the multimedia communication system.

The process then proceeds to Step 1388 where the multimedia server multiplexes the process client packets for transmission to the plurality of clients, which yields multiplex client packets. The process client packets are also multiplexed with network data destined for clients, video data destined for clients and/or audio data destined for clients. The process then proceeds to Step 1390 where the multimedia server transmits the multiplex client data to the plurality of clients in accordance with the data conveyance protocol used within the multimedia communication system.

If the packet corresponds to network data, the process proceeds to Step 1392 where the multimedia server identifies at least one of the clients from the packet. The process then proceeds to Step 1394 where the multimedia server determines whether a network access application is active for the particular client. If not, the process proceeds to Step 1396 where the multimedia server opens a network access application (e.g., email and/or web browser application) for the particular client.

Once a network application is open or has been opened, the process proceeds to Step 1398 where the multimedia server processes data of the network packets in accordance with the network access application to produce network data. The process then proceeds to Step 1400 where the multimedia server determines access to the network connection for transmission of the network data based on the client access to network connection scheme. The process then proceeds to Step 1402 where the multimedia server transports the network data via the network connection to a wide area network based on the determine network access. The determination of Step 1400 has been explained in greater detail with reference to FIG. 60 and the determination of Step 1394 has been explained in greater detail with reference to FIGS. 58 and 59.

Figure 62:
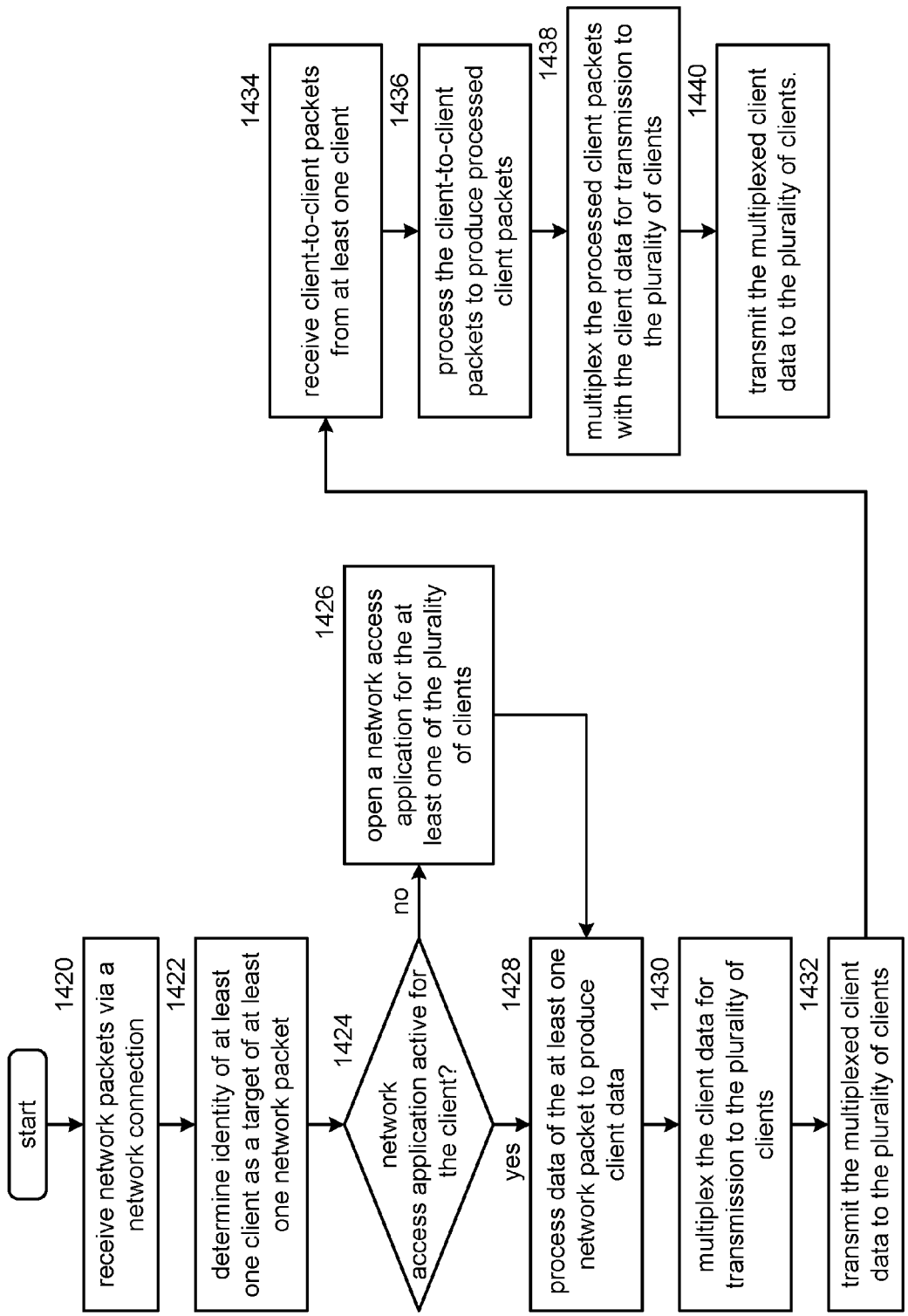
FIG. 62 illustrates a logic diagram of an alternate method for processing network communications and client-to-client communications within a multimedia communication system in accordance with the present invention.

FIG. 62 illustrates a logic diagram of a method for a multimedia server to function as a hub base network access for a plurality of clients. The process begins at Step 1420 where the multimedia server receives network packets via a network connection. The network packets are received from a wide area network system such as the Internet in response to information provided by the multimedia server on behalf of one or more clients. The process then proceeds to Step 1422 where the multimedia server determines identity of at least one client that is a target of the network packet. This may be done by interpreting a header section of the network packet where the header section includes the destination address, which corresponds to an individual client. As such, each network packet that is received, the multimedia server may readily determine the appropriate client.

The process then proceeds to Step 1424 where the multimedia server determines whether a network access application is active for the particular client. The network application may be an email application and/or a web browser application. If the particular network access application is not active, the process proceeds to Step 1426 where the multimedia server opens one for the particular client.

With a network access application open, the process proceeds to Step 1428 where the multimedia server processes data of the network packets to produce client data. The processing of the data may include preparing display data corresponding to the execution of the network application upon the incoming network packets and storing the resulting data as client data. The process then proceeds to Step 1430 where the multimedia server multiplexes client data for transmission to the plurality of clients. The client data may be multiplexed with other data destined for the clients, such other data includes video data, audio data, and/or other application data. The process then proceeds to Step 1432 where the multimedia server transmits the multiplex client data to the plurality of clients in accordance with the data conveyance protocol of the multimedia communication system.

The processing continues at Step 1434 where the multimedia server receives client-to-client packets from at least one client. The process then proceeds to Step 1436 where the multimedia server processes the client-to-client packets to produce processed client packets. The process then proceeds to Step 1438 where the multimedia server multiplexes the processed client packets with other client data for transmission to the plurality of clients. The process then proceeds to Step 1440 where the multimedia server transmits the multiplex client data to the plurality of clients.

Figure 63:
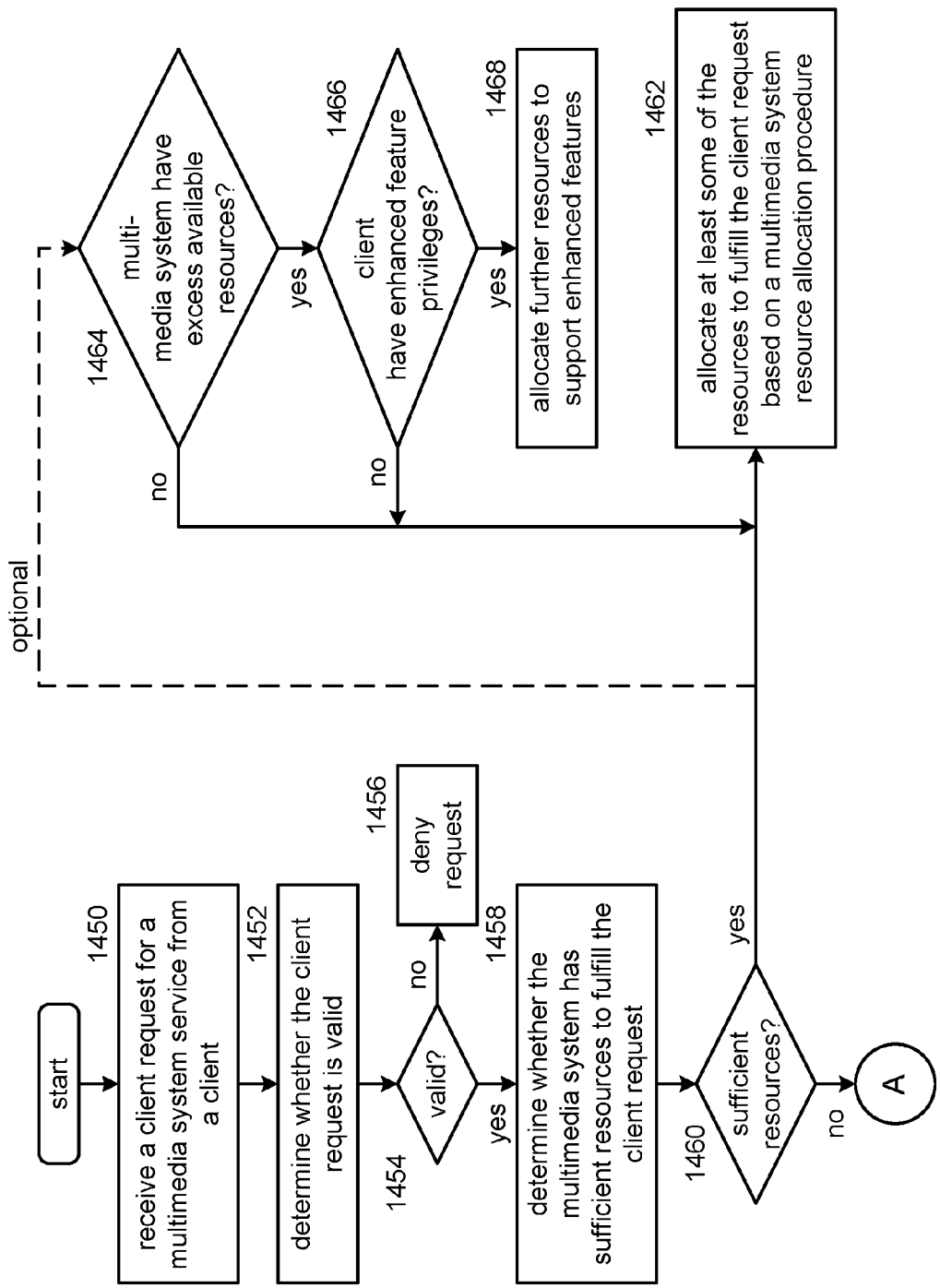
FIG. 63 illustrates a logic diagram of a method for managing resources within a multimedia communication system in accordance with the present invention.

FIG. 63 illustrates a logic diagram of a method for managing resources within a multimedia system. The processing illustrating in FIG. 63, as well as those illustrated in FIGS. 64 & 65, may be executed by any one of the multimedia servers illustrated in FIGS. 1-11. The processing begins at Step 1450 where the multimedia server receives a client request for a multimedia service. The multimedia system service includes one or more of accessing a channel from a satellite connection, cable connection, NTSC broadcast connection, HDTV broadcast connection, SDTV broadcast connection, output of a VCR DVD radio receiver, CD player, MP3 player, et cetera.

The process then proceeds to Step 1452 where the multimedia server determines whether the client request is valid at step 1454. The determination of whether the client request is valid may be based on whether the particular client has access to the particular video program that is being requested, determining whether the particular channel that is being selected exceeds parental control settings, and/or determining whether the clients request is received during an assigned access time. Accordingly, the assigned access time period corresponds to the time of day in which the user of the particular module may access services from the multimedia server. If the client request is not valid, the process proceeds to Step 1456 where the multimedia server denies the request.

If, however, the request is valid, the process proceeds to Step 1458. At Step 1458, the multimedia server determines whether the multimedia system has sufficient resources to fulfill the client request. The determination of whether the multimedia system has sufficient resources includes determining whether the tuning module has the capacity to accommodate the client request, the channel mixer has sufficient processing resources to process the client request, and/or whether the communication path between the multimedia server and the plurality of clients has sufficient bandwidth to accommodate the client request.

The process then proceeds to Step 1460 where a determination is made as to whether sufficient resources exist. If they do, the process proceeds to Step 1462. At Step 1462, the multimedia server allocates at least some of the resources to fulfill the client request based on a multimedia system resource allocation procedure. The multimedia system resource allocation procedure includes allocating the resources in a first-come-first-serve basis, allocating the resources in a trunked manner, and/or allocating the resources based on a predetermined assignment of particular resources to a particular client. Accordingly, a particular tuner, stream parsing module may be allocated to a particular client. As such, these resources would remain idle unless the particular client desires access to the multimedia system.

In addition to allocating the resources as shown in Step 1462, the multimedia system may also provide the functionality as shown in Steps 1464-1468. At Step 1464, the multimedia server determines whether the system has access available resources. If not, the process reverts to Step 1462. If so, the process proceeds to Step 1466 where the multimedia server determines whether the client has enhance feature privileges. The enhance feature privileges allow the client's favorite channels to be selected and processed by the multimedia server, previous-channel, next-channel, picture-in-picture, et cetera. If the client does not have the enhance features, the process reverts to Step 1462. If, however, the client has advanced features, the process proceeds to Step 1468. At Step 1468, the multimedia server allocates further resources to support the enhance features of the client.

Figure 64:
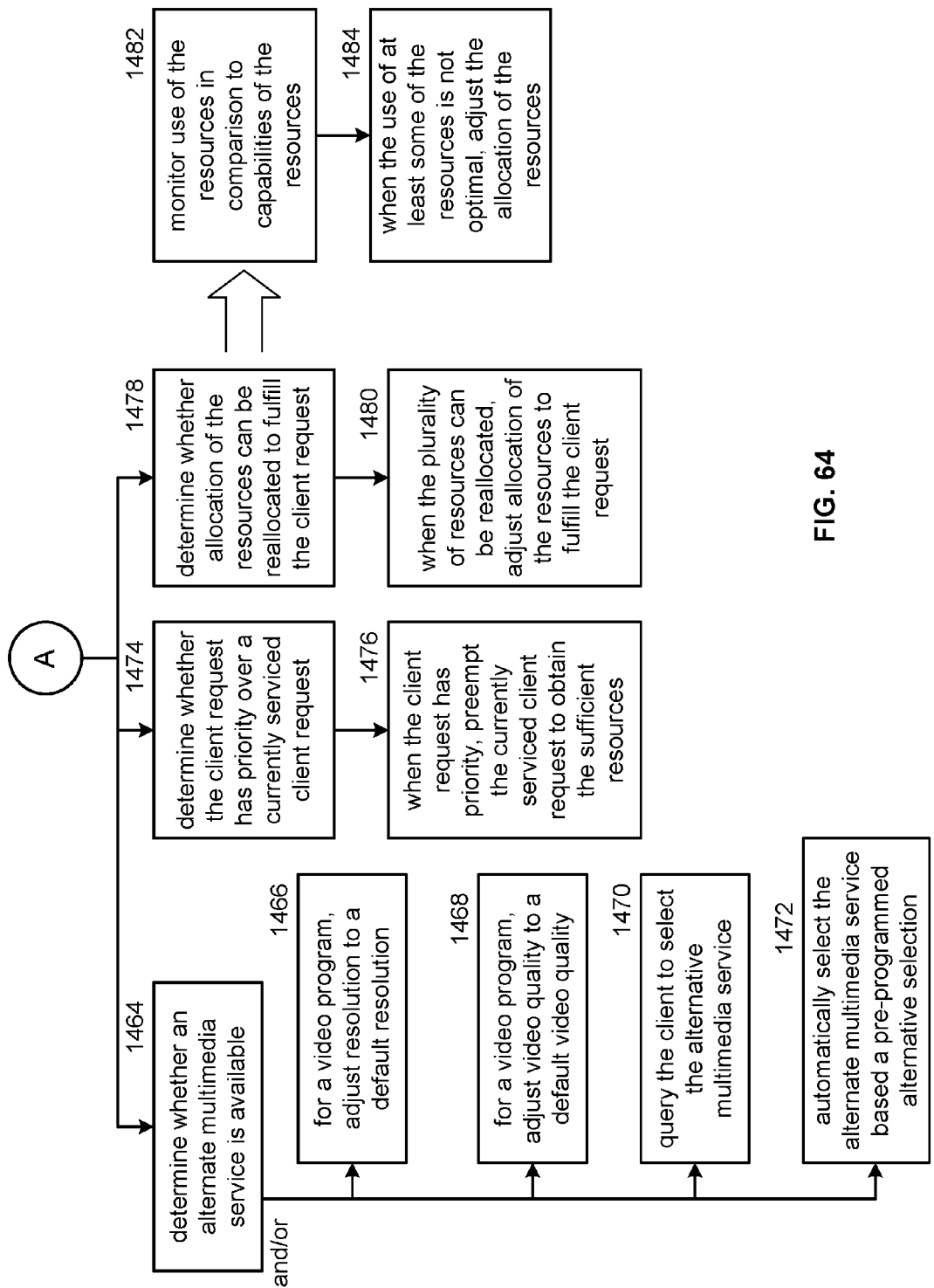
FIG. 64 illustrates a logic diagram of an extension of the method of FIG. 63.

If sufficient resources are not available, the process proceeds to FIG. 64, which provides a variety of alternatives for handling insufficient resources. One such approach is to remove the enhance features provided to particular clients to make resources available. Alternate processes are shown at Steps 1464, 1474 and 1478.

At Step 1464, the multimedia server determines whether an alternate multimedia service is available for the particular client. This may be done as shown in one or more of Steps 1466-1472. At Step 1466, the multimedia server, for a video program, adjusts the resolution of the display to a default resolution, which reduces the processing requirements. At Step 1468, the multimedia server, for a video program, adjusts the video quality to a default video quality, which reduces the processing requirements to prepare the video data for the client.

At Step 1470, the multimedia server queries the client to select an alternative multimedia service. The query may include a listing of channels currently being serviced and requesting that the client select one of those, and/or select an alternate resolution, video quality, et cetera. At Step 1472, the multimedia server automatically selects an alternative multimedia service based on pre-programmed alternate selections. In essence, the client may pre-program its default settings or alternate multimedia services as opposed to being directly queried.

At Step 1474, the multimedia server determines whether the client request has priority over currently serviced other client request. If so, the process proceeds to Step 1476 where the multimedia server preempts currently serviced client(s) to obtain the resources to fill the present client request. If the current client request does not have priority over at least one other currently serviced client, the present client's request is denied, and the client may be requested to access an alternative multimedia service.

At Step 1478, the multimedia server determines whether allocation of resources can be reallocated to fill the client request. The process then proceeds to Step 1480 where the multimedia server adjusts allocation of the resources to fulfill the client request when the resources can be reallocated. The determination of whether resources can be reallocated is further described in Steps 1482 and 1484. At Step 1482, the multimedia server monitors the use of the resources in comparisons of the capabilities of the resources. The process then proceeds to Step 1484 where the multimedia server adjusts the allocation of resources when the use of at least some of the resources is not optimal. For example, if a particular resource is most efficient when processing compressed video from an HDTV source, satellite source, et cetera and is currently processing audio signals, the resource may be reallocated to process video signals while another resource is used to process the audio signals.

FIG. 65 illustrates a logic diagram of a method for managing resources within a multimedia system. The process begins at Step 1490 where a multimedia server receives a client request for a multimedia service from a client. The multimedia service includes one or more of accessing a video source such as a channel of a satellite connection, channel of a cable connection, DVD player, VCR, and/or an audio source such as a CD player, DVD audio player, et cetera. The process then proceeds to Step 1492 where the multimedia server determines whether the client request is valid. If the client request is not valid as indicated at Step 1494, the process proceeds to Step 1496 where the multimedia server denies the request.

If, however, the request is valid, the process proceeds to Step 1498 where the multimedia server determines whether the multimedia system has sufficient resources available to fulfill the client request. The process then proceeds to Step 1500 where the multimedia server branches based on whether sufficient resources exist. If sufficient resources exist, the process proceeds to Step 1502. At Step 1502, the multimedia server allocates best-matched resources to fulfill a client request. If sufficient resources do not exist, the processing at FIG. 64 is utilized.

To determine the best match resources to fulfill the client request, Steps 1504-1508 may be utilized. At Step 1504, the multimedia server maintains a listing of resource capabilities for each of the plurality of resources. The process then proceeds to Step 1506 where the multimedia server determines the type of resources needed to support the client request. The process then proceeds to Step 1508 where the multimedia server performs a best match analysis to identify the best match resources based on the resource capabilities and the type of resources needed. For example, resources within a tuning module and/or channel mixer may be most efficient when processing compressed video data from a satellite connection while others may be more adept at processing audio signals. As such, when a request for access to compressed video signal is received, the multimedia server attempts to allocate the resources that are best fitted to process the compressed video. Correspondingly, when a request for access to an audio source is received, the multimedia server attempts to allocate the best resources to fulfill the audio request.

The preceding discussion has presented a method and apparatus for a multimedia communication system. The multimedia communication system allows a plurality of clients to have apparent direct access to a variety of audio sources, video sources, the internet, the public switch telephone network, et cetera without the typical receiving and transmitting circuitry associated with conventional direct access to such services. As one of average skill in the art will appreciate, other embodiments may be derived from the teaching of the present invention, without deviating from the scope of the claims.

What is claimed is:

1. A streaming video server comprising
    a network transceiver operably coupled to communicate with a plurality of client devices that each includes a video display, wherein the plurality of client devices include at least one cellphone remotely located from the streaming video server, wherein the network transceiver receives a first video request from a first client device of the plurality of client devices and a second video request from a second client device of the plurality of client devices;
    an interface for coupling the streaming video server to a plurality of video sources, the plurality of video sources including at least one digital video storage module that digitally stores at least one video program, wherein the at least one video storage module responds to the first video request and generates a first video stream from the at least one video program digitally stored in the at least one digital video storage module and responds to the second video request and generates a second video stream from the at least one video program digitally recorded and stored in the video storage module; and
    an encoding module operably coupled to format the first video stream and the second video stream in accordance with a packet format and forms a stream of video data that includes the first video stream and the second video stream, wherein the encoding module controls delivery of the first video stream to the first client device in accordance with a priority associated with real-time transmissions and further in accordance with pause, fast forward and rewind commands from the first client device, while also controlling delivery of the second video stream to the second client device in accordance with a priority associated with the real-time transmissions and further in accordance with pause, fast forward and rewind commands from the second client device; wherein the encoding module adapts video quality of the first video stream based on first data received from the first client device; wherein the encoding module adapts the video quality of the second video stream based on second data received from the second client device, and wherein the video quality of the first video stream differs from the video quality of the second video stream.

2. The streaming video server of claim 1 wherein the encoding module adapts the video quality of the first video stream by adjusting a video resolution.

3. The streaming video server of claim 1 wherein the first client device is a cellphone and wherein the encoding module adapts video quality of the first video stream based on first data received from the cellphone that indicates a video resolution.

4. The streaming video server of claim 1 wherein the first client device is a cellphone and wherein the encoding module adapts video quality of the first video stream based on a bandwidth of communications with the cellphone.

5. The streaming video server of claim 1 further comprising:
    a control module operably coupled to evaluate the first video request, to determine if the first client device is authenticated, to determine if access privileges associated with a user of the first client device permit fulfillment of the first video request, and to authorize the at least one digital video storage module to satisfy the first video request when the first client device is authenticated and also the access privileges associated with the user permit fulfillment of the first video request.

6. The streaming video server of claim 1 further comprising:
a control module operably coupled to evaluate the first video request, to determine if parental controls associated with a user of the first client device permit fulfillment of the first video request, and to authorize the at least one digital video storage module to satisfy the first video request when the parental controls associated with the user permit fulfillment of the first video request.

7. A method comprising
communicating with a plurality of client devices that each includes a video display, wherein the plurality of client devices are remotely located from a streaming video server, wherein the communicating includes receiving a first video request from a first client device of the plurality of client devices and a second video request from a second client device of the plurality of client devices;
coupling the streaming video server to a plurality of video sources, the plurality of video sources including at least one digital video storage module that digitally stores at least one video program;
responding to the first video request to generate a first video stream from the at least one video program digitally stored in the at least one digital video storage module;
responding to the second video request to generate a second video stream from the at least one video program digitally recorded and stored in the at least one digital video storage module;
formatting the first video stream and the second video stream in accordance with a packet format and forming a stream of video data that includes the first video stream and the second video stream; and
controlling delivery of the first video stream to the first client device in accordance with a priority associated with real-time transmissions and further in accordance with pause, fast forward and rewind commands from the first client device, while also controlling delivery of the second video stream to the second client device in accordance with a priority associated with real-time transmissions and further in accordance with pause, fast forward and rewind commands from the second client device, wherein a video quality of the first video stream is adapted based on first data received from the first client device, wherein the video quality of the second video stream is adapted based on second data received from the second client device, and wherein the video quality of the first video stream differs from the video quality of the second video stream.

8. The method of claim 7 wherein the video quality of the first video stream is adapted by adjusting a video resolution.

9. The method of claim 7 wherein the first client device is a cellphone and wherein a video quality of the first video stream is adapted based on first data received from the cellphone that indicates a video resolution.

10. The method of claim 7 wherein the first client device is a cellphone and wherein a video quality of the first video stream is adapted based on a bandwidth of communications with the cellphone.

11. The method of claim 7 further comprising:
determining if the first client device is authenticated; and
determining if access privileges associated with a user of the first client device permit fulfillment of the first video request,
wherein the first video request is satisfied when the first client device is authenticated and also the access privileges associated with the user permit fulfillment of the first video request.

12. A streaming video server comprising
a network transceiver operably coupled to communicate with a plurality of client devices that each includes a video display via a packet data network, wherein the plurality of client devices include at least one cellphone remotely located from the streaming video server, wherein the network transceiver receives a first video request from a first client device of the plurality of client devices and a second video request from a second client device of the plurality of client devices;
an interface for coupling the streaming video server to a plurality of video sources, the plurality of video sources including at least one digital video storage module that digitally stores at least one video program, wherein the at least one video storage module responds to the first video request and generates a first video stream from the at least one video program digitally stored in the at least one digital video storage module and responds to the second video request and generates a second video stream from the at least one video program digitally recorded and stored in the at least one digital video storage module; and
an encoding module operably coupled to format the first video stream and the second video stream in accordance with a packet format if the packet data network and forms a stream of video data that includes the first video stream and the second video stream, wherein the encoding module controls delivery of the first video stream to the first client device in accordance with a priority associated with real-time transmissions and further in accordance with pause, fast forward and rewind commands from the first client device, while also controlling delivery of the second video stream to the second client device in accordance with a priority associated with real-time transmissions and further in accordance with pause, fast forward and rewind commands from the second client device;
wherein the encoding module adapts video quality of the first video stream based on first data received from the first client device and wherein the encoding module adapts the video quality of the first video stream by adjusting a video resolution.

13. The streaming video server of claim 12 wherein the encoding module adapts the video quality of the second video stream based on second data received from the second client device, and wherein the video quality of the first video stream differs from the video quality of the second video stream.

14. The streaming video server of claim 12 wherein the first client device is a cellphone and wherein the encoding module adapts the video quality of the first video stream based on first data received from the cellphone that indicates the video resolution.

15. The streaming video server of claim 12 wherein the first client device is a cellphone and wherein the encoding module adapts the video quality of the first video stream based on a bandwidth of communications with the cellphone.

\* \* \* \* \*